United States Patent
Watanabe

(10) Patent No.: US 6,466,545 B1
(45) Date of Patent: Oct. 15, 2002

(54) APPARATUS AND METHOD FOR TRANSMISSION RATE CONTROL

(75) Inventor: Yoshihiro Watanabe, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/188,587

(22) Filed: Nov. 9, 1998

(30) Foreign Application Priority Data

Mar. 20, 1998 (JP) .......................................... 10-072726

(51) Int. Cl.$^7$ ................................................. H04J 3/14
(52) U.S. Cl. ...................... 370/232; 370/253; 370/395.1
(58) Field of Search ................................. 370/229, 230, 370/231, 232, 233, 234, 235, 236, 253, 395, 396, 397, 398, 399

(56) References Cited

U.S. PATENT DOCUMENTS

| | | | | |
|---|---|---|---|---|
| 5,812,527 A | * | 9/1998 | Kline et al. | 370/232 |
| 5,889,761 A | * | 3/1999 | Yamato | 370/231 |
| 6,137,779 A | * | 10/2000 | Miller et al. | 370/236 |
| 6,144,636 A | * | 11/2000 | Aimoto et al. | 370/229 |
| 6,208,619 B1 | * | 3/2001 | Takeuchi | 370/229 |

FOREIGN PATENT DOCUMENTS

JP          9-181744          7/1997

OTHER PUBLICATIONS

Arulambalam: "An Intelligent Explicit Rate Control Algorithm for ABR Service in ATM Networks", IEEE International Conference on Communications, vol. 1, Jun. 8–12, 1997, pp. 200–204.
Koike A. et al: "ABR Parameter Tuning and Negotiation For A Switched Virtual; Connection", NL Amsterdam, IOS, Oct. 1, 1996, pp. 269–277.

* cited by examiner

Primary Examiner—Hassan Kizou
Assistant Examiner—Tim Spafford
(74) Attorney, Agent, or Firm—Katten Muchin Zavis Rosenman

(57) ABSTRACT

An RM cell extractor extracts an RM cell, and outputs the RM cell to the CPU. The CPU computes a transmission-rate control parameter (for example, ICR) using the PCR, etc. set in the RM cell, and outputs the result to an RM cell inserter. The RM cell, inserter compares the transmission-rate control parameter sen in the RM cell with the transmission-rate control parameter input from the CPU, and rewrites the transmission-rate control parameter in the RM cell when it is larger than the transmission-rate control parameter input from the CPU.

69 Claims, 38 Drawing Sheets

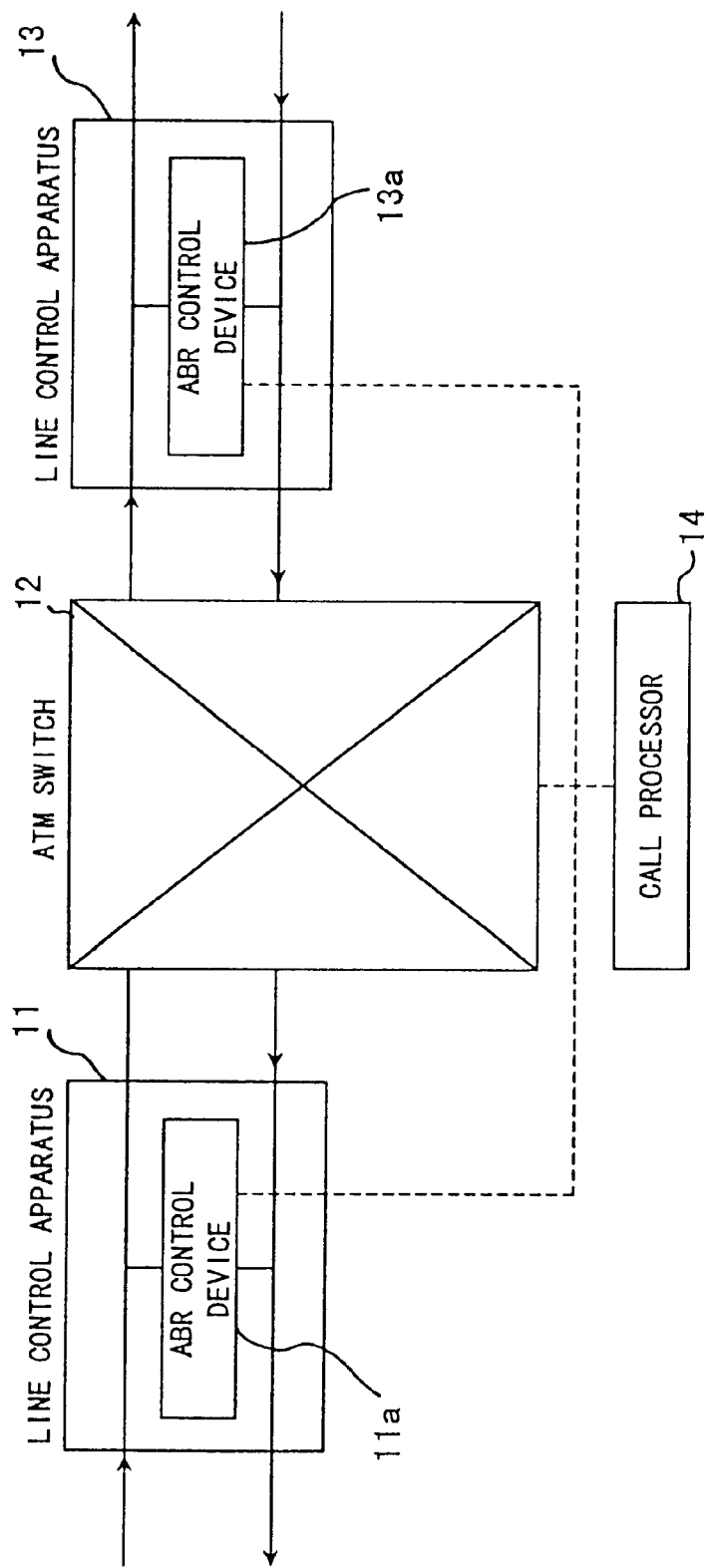
F I G. 2

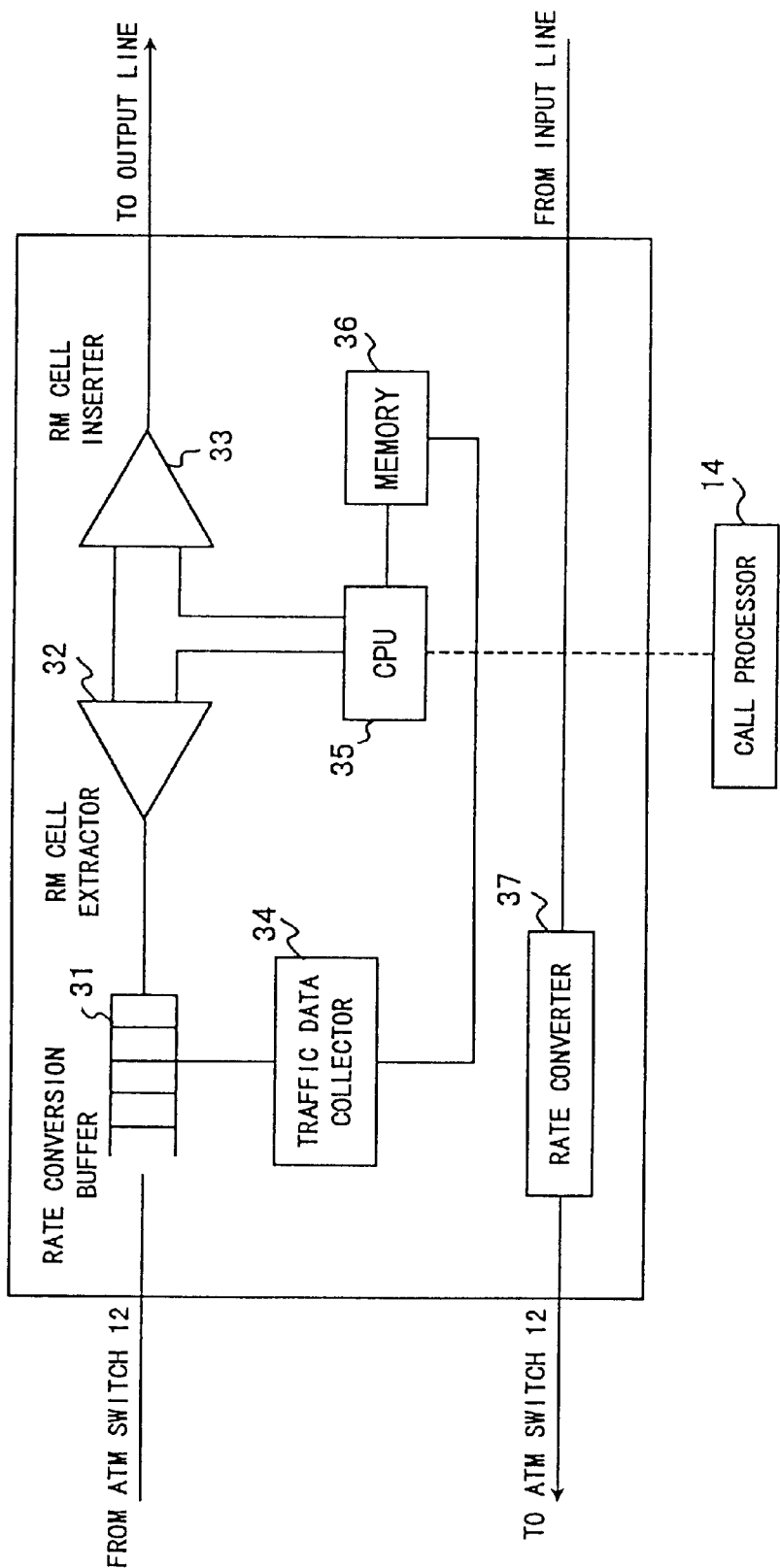
F I G. 3

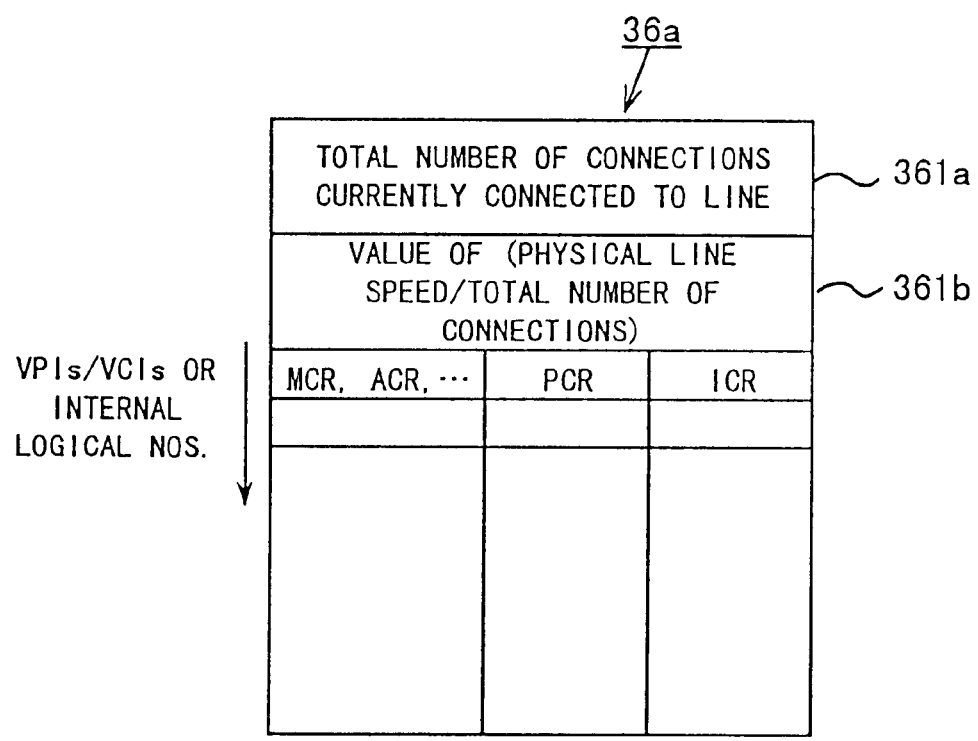
F I G. 4

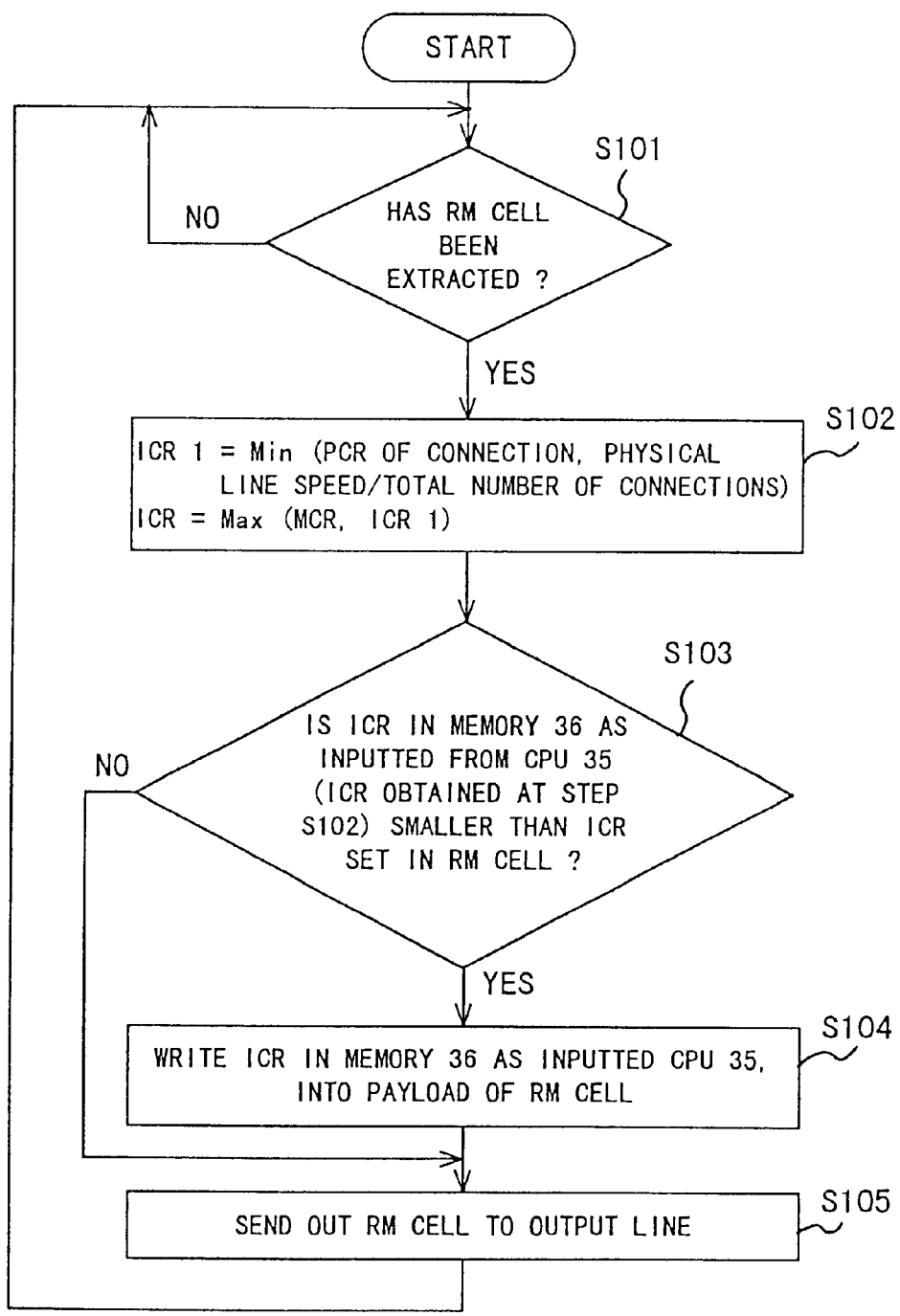
F I G. 5

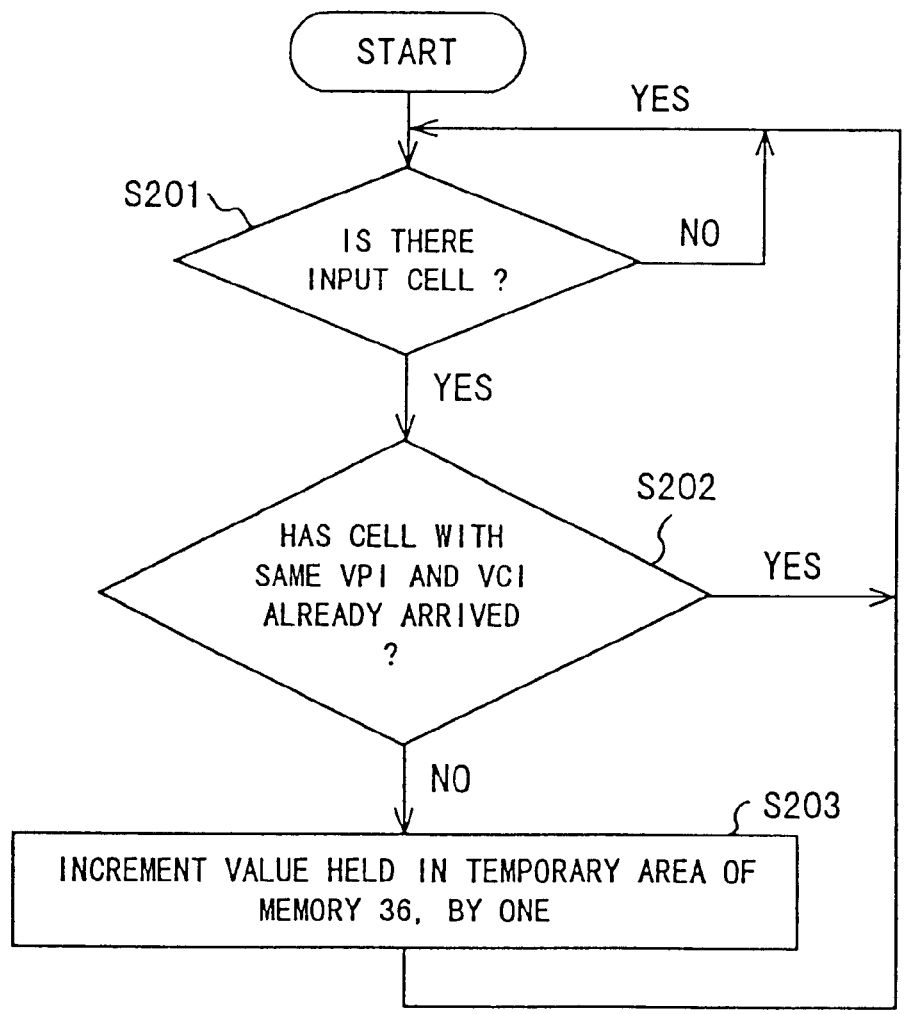
F I G. 7

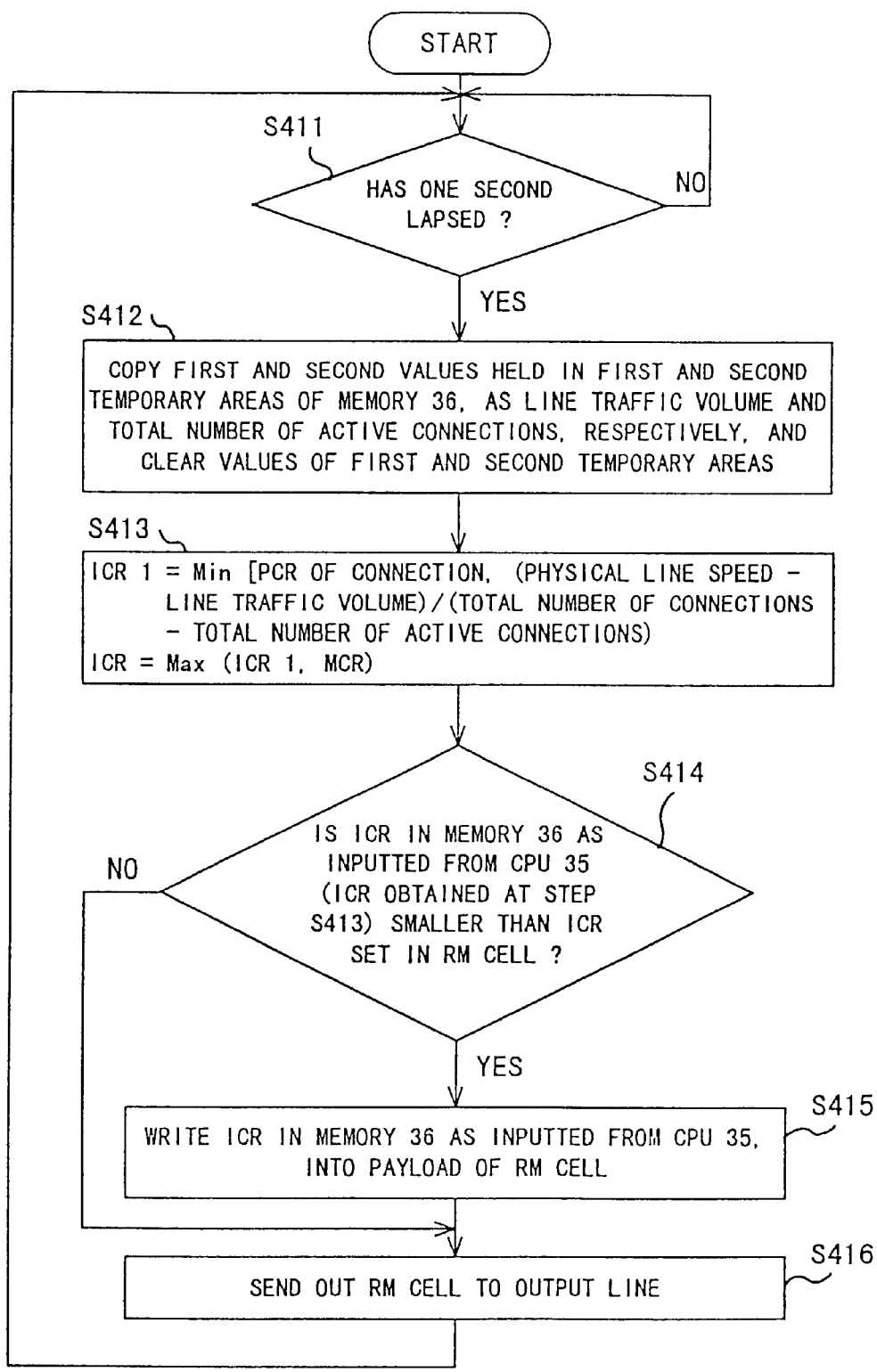
F I G.  1 3

40

| M | N1 |
|---|---|
| 1 | $2^0$ |
| 2 | $2^{-1}$ |
| 4 | $2^{-2}$ |
| ⋮ | ⋮ |
| 32,768 | $2^{-15}$ |

FIG. 14

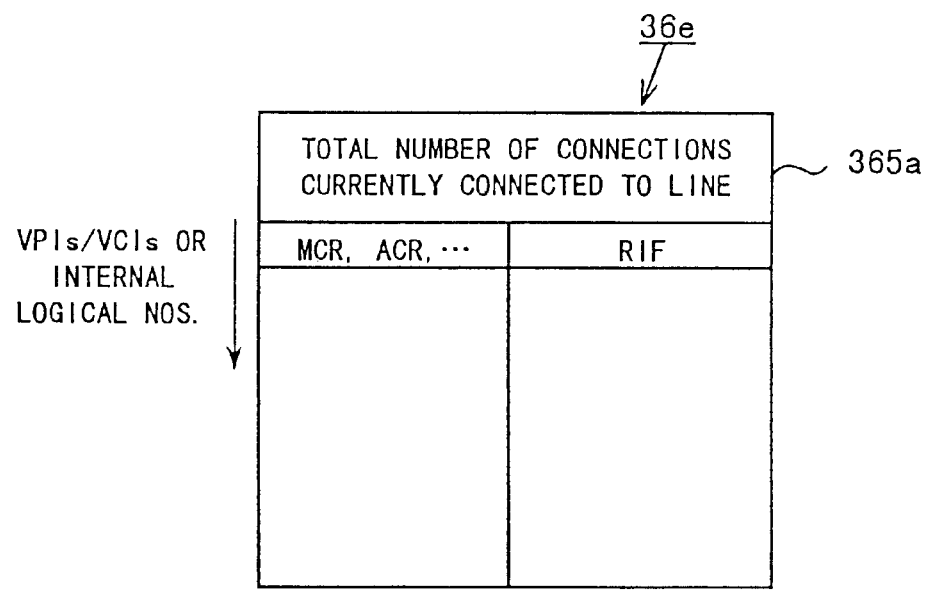
F I G. 1 5

41

| M | N2 |
|---|---|
| 1 | $2^{-15}$ |
| 2 | $2^{-14}$ |
| 4 | $2^{-13}$ |
| 8 | $2^{-12}$ |
| 16 | $2^{-11}$ |
| ⋮ | ⋮ |
| 32,768 | $2^{0}$ |

36d
                                     ↓

| 100 | | | ~ 364a |
|---|---|---|---|
| 100 | | | ~ 364b |
| 100000 cells/sec | | | ~ 364c |
| (353207 − 100000)/900 = 281.34 cells/sec | | | ~ 364d |
| MCR, ACR, ··· | PCR | ICR | |
| MCR=100, ACR=1000 | 3000 | 281 | ~ 364g |
|  |  |  | |

VPIs/VCIs OR INTERNAL LOGICAL NOS. ↓

F I G.   3 7

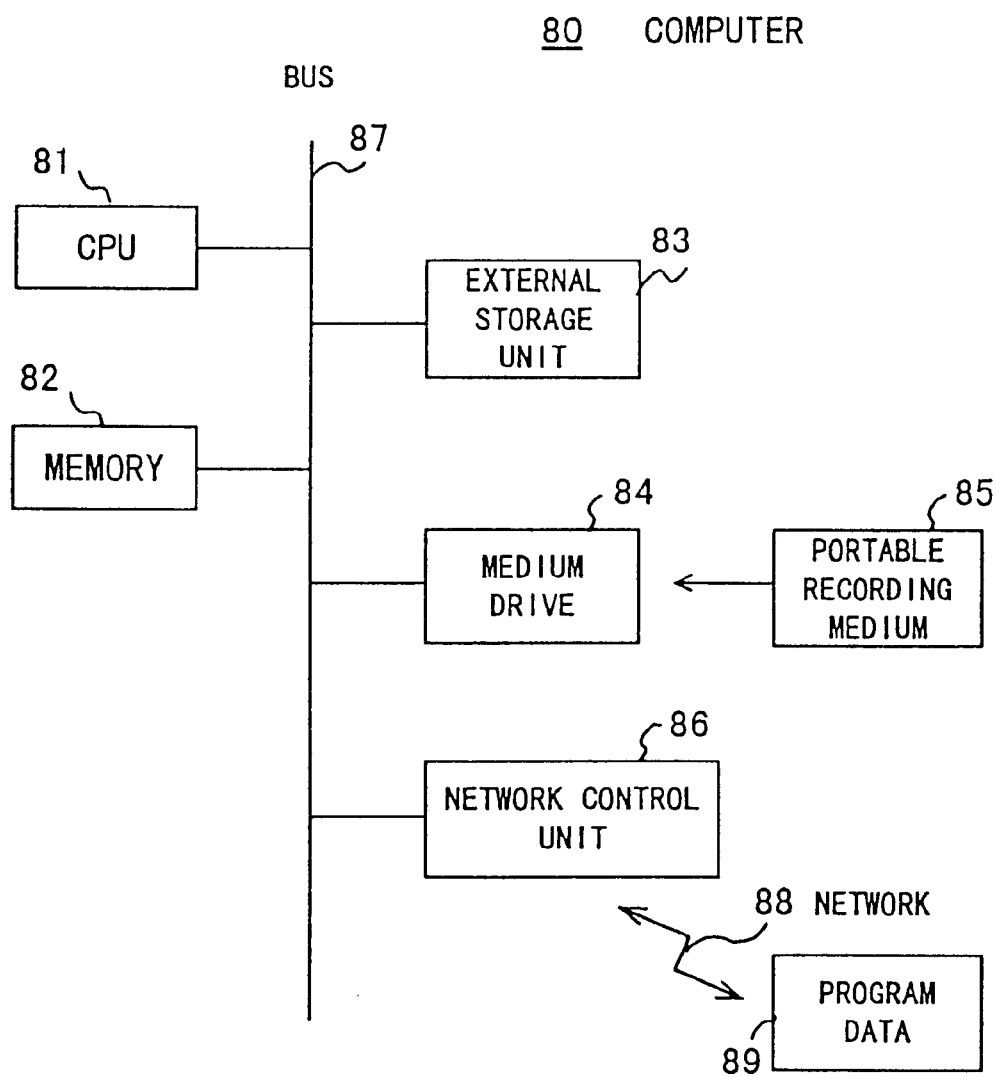
F I G. 3 8

APPARATUS AND METHOD FOR TRANSMISSION RATE CONTROL

BACKGROUND OF THE INVENTION

1. Field of the Invention

The present invention relates to the way how the transmission rate of packets is controlled in a packet transmitting system. More particularly, it relates to an apparatus and a method in which the control parameters of the transmission rate of cells, such as an "initial cell rate" (ICR), a "rate increase factor" (RIF) and a "rate decrease factor" (RDF), are dynamically altered in the ABR (Available Bit Rate) service of an ATM (Asynchronous Transfer Mode) network, thereby to control the transmission rate of the cells of a transmission terminal.

2. Description of the Related Art

At present, in the ATM Forum and the ITU-T (International Telecommunication Union-Telecommunication Standardization Sector), a service called "ABR (Available Bit Rate) service" is under study as a method in which data exchange technology based on the ATM is applied to high-speed data communication networks such as LANs (Local Area Networks) and WANs (Wide Area Networks).

In communications which utilize the ABR service, resource management cells (RM cells) are used for notifying the information items of the resources of the network to terminals. The transmission terminal sends out the RM cell each time it sends out a predetermined number of user data cells. The RM cell arrives via the network at the reception terminal, at which it is looped back to return to the transmission terminal again.

Meanwhile, an ATM switch or exchange included in the network writes the resource information items (bandwidth information, congestion information) from the ATM switch itself, into the RM cell passing therethrough, thereby to notify the information of the network side to the transmission terminal. The transmission terminal which has received the RM cell bearing the bandwidth information and the congestion information, recalculates an "allowed cell rate" (ACR) in accordance with these information items and sends out the cells at a transmission rate not exceeding the ACR.

Besides, in establishing an ABR connection at the start of the communications, the transmission terminal reports to the network a "peak cell rate" (PCR) being the maximum transmission rate, and a "minimum cell rate" (MCR) being the lowest transmission rate, and it negotiates about the values of these rates. Herein, the transmission terminal cannot send out the cells at a rate which is higher than the PCR determined as the result of the negotiations. On the other hand, the network guarantees the transmission terminal that transmission rate of the cells which is not lower than the MCR obtained by the negotiations. In the ABR service, accordingly, the ACR of the transmission terminal fluctuates within a range of the MCR to the PCR both inclusive (MCR$\leq$ACR$\leq$PCR).

Owing to the above operations, the utilization of the ABR service permits the network side to avoid congestion and to recover from congestion, and it also permits the terminal side to transmit the cells at a high transmission rate in a case where the resource of the network is idle.

At present, the operations of the transmission terminal and reception terminal which communicate by utilizing the ABR service are subjects for standardization in the ATM Forum. The main operations of the terminals will be outlined below.

FIG. 1 is a conceptual diagram of a flow control in the ABR service.

Referring to the figure, as indicated by a forward flow A, an ABR transmission terminal 1 sends out cells in a forward direction (from a transmission side to a reception side) at a rate of or below an ACR each time. On that occasion, the ABR transmission terminal 1 sends out one RM cell 4F to a switch (or ATM exchange) 3 each time it sends out a predetermined number of user data cells 2. Besides, in a case where the ABR transmission terminal 1 has received an RM cell 4B from the switch 3, it increases the value of the ACR to the amount of a predetermined constant magnitude (for example, a magnitude of RIF×PCR) by utilizing the RIF, on condition that a "congestion indicator" (CI) bit and a "no increase" (NI) bit, not shown, contained in the RM cell 4B are respectively set at "0" (not congested) and "0" (increase not allowed). In contrast, on condition that the CI bit is set at "1" (congested), the ABR transmission terminal 1 decreases the value of the ACR to the amount of a predetermined constant magnitude (for example, a magnitude of RDF×PCR) by utilizing the RDF. Further, after the above operation, the ABR transmission terminal 1 makes a comparison between the magnitudes of the value of an "explicit cell rate" (ER) written in the RM cell 4B and the value of the ACR obtained by the above calculation, and it sets the value of smaller magnitude as a new ACR. On this occasion, the value of the ACR must fall within a range of MCR$\leq$ACR$\leq$PCR.

As indicated by a backward flow B in FIG. 1, an ABR reception terminal 5 terminates the user data cells 2 sent in from the transmission side. Also, the ABR reception terminal 5 loops back the received RM cell 4F and sends it out toward the ABR transmission terminal 1 in a backward direction (from a reception side to a transmission side). In this case, on condition that an "explicit forward congestion indication" (EFCI) bit expressive of "being congested" is set at "1" in the user data cell 2A received immediately before the reception of the RM cell 4F, the ABR reception terminal 5 sets "1" at the CI bit contained in the RM cell 4F to-be-looped-back, and it sends out the RM cell 4 after the setting, as the RM cell 4B in the backward direction.

Next, the functions of the ATM exchange or switch 3 in the ABR service will be explained.

The operations of the network side or the ATM exchange 3 for implementing the ABR service are broadly divided into two categories, which are respectively called the "EFCI mode" and "ER mode".

In the EFCI mode, subject to the congestion of the network, the ATM exchange 3 sets "1" at an EFCI bit in a user data cell 2 which is to pass through the ATM exchange 3, and it causes this cell 2 to pass therethrough.

In the ER mode, the ATM exchange 3 calculates an ER being an explicit rate which is used for limiting the ACR on the side of the transmission terminal 1, to a specified value in accordance with the internal resources and congested situation of the network, and it writes the calculated value into a forward or backward RM cell 4 which is to pass through the ATM exchange 3. Herein, the ATM exchange 3 compares an ER value already contained in the RM cell 4, with the ER value calculated by itself, and it sets the calculated ER value in the ER field of the pertinent RM cell 4 on condition that this calculated ER value is smaller.

Further, it is possible that the ATM exchange 3 or the reception terminal 5 generates an RM cell separately from an RM cell 4F sent out of the transmission terminal 1, whereupon it sends out the generated RM cell to the side of the transmission terminal 1.

As stated before, the transmission terminal 1 increases or decreases the value of the ACR with reference to the set value of the CI bit or NI bit contained in the RM cell 4B, by utilizing the parameter RIF or RDF. In this regard, it has heretofore been the actual circumstances that the values of the parameters RIF and RDF are determined when a call is set (that is, when an ABR connection is established), and that they cannot be thereafter altered.

Accordingly, the decremental or incremental magnitude of the ACR is constant irrespective of the degree of congestion of the network for the reason that the parameters RIF and RDF are constant. In other words, the decremental magnitudes of the ACR become equal in both a case where the network is excessively congested and a case where it is lightly congested. Likewise, the incremental magnitudes of the ACR are equal without regard to the degrees of non-congestion of the network.

However, the decremental width of the ACR should preferably be made larger in the case of the excessively congested state of the network, whereas it should preferably be made smaller in the case of the lightly congested state of the network. Besides, even in the case of the non-congested state of the network, the incremental width of the ACR should preferably be changed in accordance with the degree of non-congestion.

The parameter ICR mentioned before is a rate to which the transmission terminal 1 must conform in transmitting cells at the start of the transmission, or after having failed to transmit cells at a certain predetermined time interval. The value of the parameter ICR is also determined when the call is set (that is, when the ABR connection is established). In this regard, the transmission terminal 1 lowers the ACR to the ICR on conditions that an inequality ACR>ICR holds before a forward RM cell 4F is sent out, and that an elapsed time since a forward RM cell 4F was sent out last is greater than a predetermined allowable time period. As a parameter expressive of the predetermined allowable time period, an ADTF (ACR Decrease Time Factor) is employed in the ABR service.

Accordingly, in a case where the transmission terminal 1 has failed to send out the forward RM cell 4F in spite of the lapse of the time period ADTF since the last sending-out of the forward RM cell 4F, it cannot but set the value of the ACR at the above ICR of the constant value without regard to the congested state of the network in the case where it was sending out cells. For the transmission terminal 1, however, it is desirable that the network side changes the value of the ICR in accordance with the congested state of the network in the case where this terminal 1 was transmitting the cells. In other words, in the case where the transmission terminal 1 has failed to send out the next forward RM cell 4F in spite of the lapse of the time period ADTF, it should desirably restart its transmission at the ACR of larger value subject to the non-congested state of the network, and conversely, it should desirably restart its transmission at the ACR of smaller value subject to the congested state of the network.

SUMMARY OF THE INVENTION

In view of the problems stated above, the present invention has for its object to provide an apparatus and a method for a transmission rate control in which the transmission rate control parameters of an ABR service, such as the ICR, RIF and RDF, are dynamically changed in accordance with the situations of uses of network resources, whereby the ACR of a transmission terminal is controlled so as to be set at a value reflecting the situation of congestion of a network.

A transmission rate control apparatus in the first aspect of the present invention comprises recalculation means for recalculating a value of a second transmission-rate control parameter on the basis of resource information of a network by using a value of a first transmission-rate control parameter which is set in an inputted RM cell; comparison means for comparing the value of the second transmission-rate control parameter obtained by the recalculation means, with the value of the first transmission-rate control parameter; and parameter resetting means for rewriting the value of the first transmission-rate control parameter set in the input RM cell, into the value of the second transmission-rate control parameter, only when the value of the second transmission-rate control parameter has been decided smaller than the value of the first transmission-rate control parameter by the comparison means.

In operation, the recalculation means recalculates the value of the second transmission-rate control parameter on the basis of the resource information of the network by using the value of the first transmission-rate control parameter which is set in the inputted RM cell. The comparison means compares the value of the second transmission-rate control parameter obtained by the recalculation means, with the value of the first transmission-rate control parameter. The parameter resetting means rewrites the value of the first transmission-rate control parameter set in the input RM cell, into the value of the second transmission-rate control parameter, only when the value of the second transmission-rate control parameter has been decided smaller than the value of the first transmission-rate control parameter by the comparison means.

A transmission rate control apparatus in the second aspect of the present invention comprises recalculation means for recalculating a value of a second transmission-rate control parameter on the basis of resource information of a network by using a value of a first transmission-rate control parameter which is set in an inputted RM cell; comparison means for comparing the value of the second transmission-rate control parameter obtained by the recalculation means, with the value of the first transmission-rate control parameter; and parameter resetting means for rewriting the value of the first transmission-rate control parameter set in the input RM cell, into the value of the second transmission-rate control parameter, only when the value of the second transmission-rate control parameter has been decided larger than the value of the first transmission-rate control parameter by the comparison means.

In operation, the recalculation means recalculates the value of the second transmission-rate control parameter on the basis of the resource information of the network by using the value of the first transmission-rate control parameter which is set in the inputted RM cell. The comparison means compares the value of the second transmission-rate control parameter obtained by the recalculation means, with the value of the first transmission-rate control parameter. The parameter resetting means rewrites the value of the first transmission-rate control parameter set in the input RM cell, into the value of the second transmission-rate control parameter, only when the value of the second transmission-rate control parameter has been decided larger than the value of the first transmission-rate control parameter by the comparison means.

According to the present invention, control parameters for the transmission rate of the ABR, such as the ICR, RIF and RDF, concerning the control of the transmission rate of the cells of the transmission terminal in the ABR service are dynamically changed in accordance with the situations of the resources of the network. It is therefore permitted to appropriately control the transmission rate of the cells of the transmission terminal in accordance with the situations of uses of the network resources, such as the situation of congestion of the network.

BRIEF DESCRIPTION OF THE DRAWINGS

FIG. 2 is a diagram showing the system architecture of each aspect of the embodiment of the present invention;

FIG. 3 is a diagram showing an example of the block arrangement of a line control apparatus depicted in FIG. 2;

FIG. 4 is a diagram showing the contents of a table in the first aspect of the embodiment of the present invention;

FIG. 5 is a diagram showing the operating flow of a line control apparatus in the first aspect of the embodiment of the present invention;

FIG. 7 is a diagram showing the operating flow of a line control apparatus in the second aspect of the embodiment of the present invention;

FIG. 13 is also a diagram showing the operating flow of the line control apparatus in the fourth aspect of the embodiment of the present invention;

FIG. 14 is a diagram showing a table which is utilized for evaluating an RIF and an RDF;

FIG. 15 is a diagram showing the contents of a table in the fifth aspect of the embodiment of the present invention;

FIG. 37 is a diagram showing practicable examples of the contents of the table depicted in FIG. 11; and FIG. 38 is a diagram showing the block arrangement of a computer system which dynamically alters the transmission-rate control parameters of cells.

DESCRIPTION OF THE PREFERRED EMBODIMENTS

Figure 1:
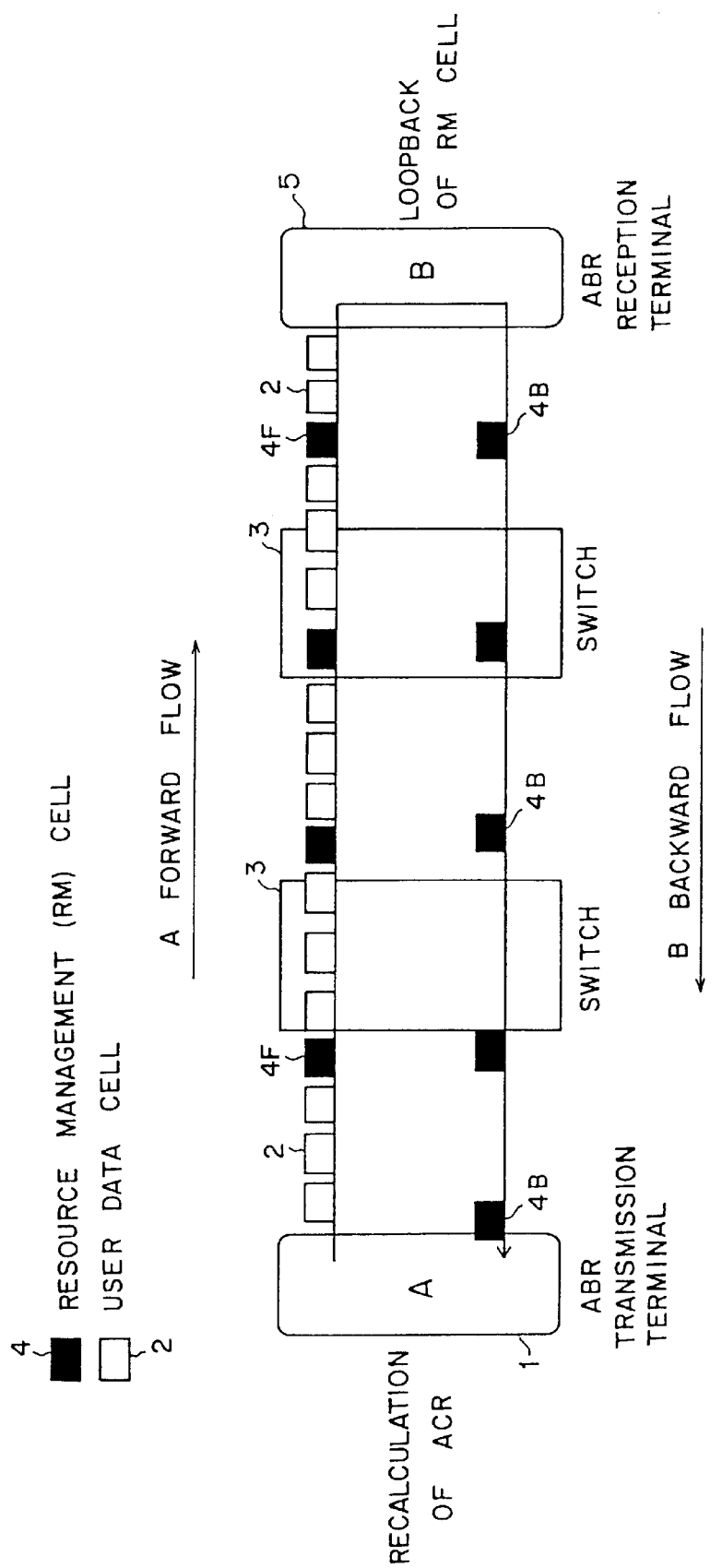
FIG. 1 is a diagram for explaining the flow control of an ABR service.

Now, the aspects of the embodiment of the present invention will be described with reference to the drawings.

FIG. 2 is a diagram showing the architecture of an ATM switching system to which each aspect of the embodiment of the present invention is applied.

Line control apparatuses 11, 13 have ABR control devices 11a, 13a, respectively. Each of the line control apparatuses 11, 13 includes an input line control unit and an output line control unit which are not shown. The input line control unit executes such a process that a virtual path identifier (VPI) and a virtual channel identifier (VCI), which are set in the header of a cell inputted from an unshown transmission terminal, are converted into a routing tag which corresponds to the VPI and VCI, whereupon the routing tag is set in the header of the cell. In contrast, the output line control unit executes such a process that a routing tag, which is set in the header of a cell inputted from an ATM switch or exchange 12, is converted into a VPI and a VCI which correspond to the routing tag, whereupon the route information of the header of the cell is rewritten from the routing tag into the VPI and the VCI. As will be described in detail later, each of the line control apparatuses 11, 13 executes such a process that an RM cell is extracted so as to recalculate the values of cell transmission-rate control parameters including an ICR, an RIF and an RDF, by the use of the corresponding one of the ABR control devices 11a, 13a, and that the recalculated values of the transmission rate control parameters are set in the payload of the RM cell by the use of the output line control unit. Incidentally, since the details of the recalculations of the values of the transmission rate control parameters ICR, RIF and RDF will be explained later, they shall be omitted here.

The ATM switch 12 accepts cells inputted from the input line control units of the line control apparatuses 11, 13, and it delivers the cells to the output line control units of the line control apparatuses 11, 13 corresponding to routing tags set in the headers of the cells, by referring to the routing tags.

A call processor 14 establishes the ABR connection between the transmission terminal and a reception terminal by a connection acceptance control. In establishing the ABR connection, the call processor 14 executes a signalling process for negotiating with the transmission terminal so as to determine the values of transmission rate control parameters such as a PCR, an MCR, the ICR, the RDF and the RIF, and for notifying the determined values of the transmission rate control parameters to the transmission terminal. In addition, the call processor 14 causes the line control apparatuses 11, 13 to set information items about the ABR connection, including the values of the transmission rate control parameters.

The recalculations of the parameters ICR, RIF and RDF in each of the ABR control devices 11a, 13a respectively disposed in the line control apparatuses 11, 13 will be mainly explained in the ensuing description.

FIG. 3 is a block diagram showing the internal arrangement of each of the line control apparatuses 11, 13 in FIG. 2, chiefly the ABR control devices 11a, 13a.

A rate conversion buffer 31 buffers a cell (user data cell or RM cell) inputted from the ATM switch 12. The rate conversion buffer 31 refers to identifiers VPI and VCI set in the header of the cell, and outputs the cell to an RM cell extractor 32 at a rate allotted to an ABR connection having the identifiers VPI and VCI.

The RM cell extractor 32 extracts an RM cell from among the cells inputted from the rate conversion buffer 31. It outputs the RM cell to a CPU 35, and also to an RM cell inserter 33.

The RM cell inserter 33 makes comparisons between the values of transmission rate control parameters (ICR, RIF) which are set in the payload of the RM cell, and those of the transmission rate control parameters (ICR, RIF) in a memory 36 as are inputted from the CPU 35. On condition that the values retained in the memory 36 are smaller, the RM cell inserter 33 rewrites the values of the transmission rate control parameters (ICR, RIF) set in the payload of the RM cell, into the values retained in the memory 36. In addition, the RM cell inserter 33 inserts the resulting RM cell between the user data cells and transmits through an output line to a succeeding office (ATM exchange or ATM cross connect) or a reception terminal, not shown.

A traffic data collector 34 in the first aspect of the embodiment does not operate especially.

The CPU 35 in the first aspect of the embodiment compares the value of the parameter PCR which is set for the ABR connection (hereinbelow, simply stated as "connection") corresponding to the RM cell inputted from the RM cell extractor 32, with a value which is obtained by dividing the physical line speed of the output line for the RM cell by the total number of connections, and it acquires the smaller one (ICR1) of the values (as calculated by a function (1) mentioned below). Further, the CPU 35 compares the value ICR1 with the value of the parameter MCR set in the pertinent connection, and it sets the larger one of the values as the new value of the parameter ICR (as calculated by a function (2) mentioned below). Herein, the CPU 35 writes the new value of the parameter ICR into a table (36a shown in FIG. 4) stored in the memory 36, by reference to the identifiers VPI and VCI of the RM cell, and it outputs the new ICR value to the RM cell inserter 33.

$$ICR1 = \text{Min}(\text{PCR of Connection, Physical line speed/Total number of Connections}) \tag{1}$$

$$ICR = \text{Max}(MCR, ICR1) \tag{2}$$

Here, an equation C=Min (A, B) signifies the calculation of a function Min (A, B) for setting the value of the smaller one of quantities A and B as a quantity C, while an equation C=Max (A, B) signifies the calculation of a function Max (A, B) for setting the value of the larger one of the quantities A and B as the quantity C. The same holds true also in the ensuing description.

The memory 36 in the first aspect of the embodiment stores the table 36a therein. As shown in FIG. 4, the table 36a retains the total number of connections connected to the output line, a value obtained by dividing the physical line speed of the output line by the total number of connections (the value of Physical line speed/Total number of Connections), and such parameters as MCR and ACR, and PCR and ICR corresponding to each of the connections. Incidentally, those entries of the table 36a which hold the parameters ICR etc. are addressed by the VPIs/VCIs of the respective connections or by internal logical Nos. corresponding to route information items in the ATM switch 12. The same holds true also of a table in any other aspect of the embodiment as explained below. Besides, the "total number of connections" set in the entry 361a of the table 36a and the "value of (Physical line speed/Total number of Connections)" set in the entry 361b thereof are rewritten by the CPU 35 each time a connection is set or released anew.

In a case where the cell transmission rate of a subscriber interface or the like differs from the cell input processing rate of the input interface of the ATM switch 12, a rate converter 37 adjusts the transfer rate of cells between both the interfaces.

By the way, the RM cell extractor 32, RM cell inserter 33, traffic data collector 34, CPU 35 and memory 36 which are shown in FIG. 3 correspond to each of the ABR control devices 11a, 13a shown in FIG. 2.

Next, the operating flow of each of the line control apparatuses 11, 13 in the first aspect of the embodiment will be described with reference to FIG. 5.

At a step S101, when a cell (user data cell or RM cell) has been inputted from the ATM switch 12, the rate conversion buffer 31 buffers the cell. The RM cell extractor 32 extracts an RM cell from among cells inputted from the rate conversion buffer 31, by referring to those values of identifiers VCI and PTI (Payload Type Identification) or only the identifier PTI which are set in the headers of the inputted cells. The RM cell is outputted to the RM cell inserter 33 and the CPU 35.

At a step S102, the CPU 35 refers to the identifiers VPI and VCI which are set in the header of the RM cell extracted by the RM cell extractor 32, and it reads out the parameter PCR of a connection which bears these identifiers VPI and VCI, from the table 36a stored in the memory 36. In addition, the CPU 35 reads out of the entry 361b of the table 36a in the memory 36, the "value obtained by dividing the physical line speed by the total number of connections (value of Physical line speed/Total number of Connections)" which has been obtained at the setting of the connection and which is held in the table 36a stored in the memory 36. Besides, the CPU 35 calculates the value ICR1 by the execution of the above function (1) and subsequently calculates the parameter ICR by the execution of the above function (2). Herein, the CPU 35 writes the calculated value of the ICR into the corresponding entry of the table 36a stored in the memory 36, by reference to the identifiers VPI and VCI of the RM cell, and it outputs a the calculated ICR value to the RM cell inserter 33.

At a step S103, the RM cell inserter 33 makes a comparison between the value of the ICR set in the payload of the RM cell as inputted from the RM cell extractor 32 and that of the ICR retained in the table 36a of the memory 36 as inputted from the CPU 35.

On condition that, as the result of the comparison at the step S103, the value of the ICR inputted from the CPU 35 is smaller than that of the ICR set in the payload of the RM cell, the operating flow proceeds to a step S104, at which the RM cell inserter 33 writes the value of the ICR retained in the table 36a of the memory 36 as inputted from the CPU 35, into the payload of the RM cell. At a step S105, the RM cell inserter 33 sends out the resulting RM cell to the output line.

In contrast, on condition that, as the result of the comparison at the step S103, the value of the ICR inputted from the CPU 35 is larger than or equal to that of the ICR set in the payload of the RM cell, the operating flow proceeds to the step S105, at which the RM cell inserter 33 sends out the RM cell to the output line.

Next, the second aspect of the embodiment for recalculating the control parameter ICR will be described.

Figure 6:
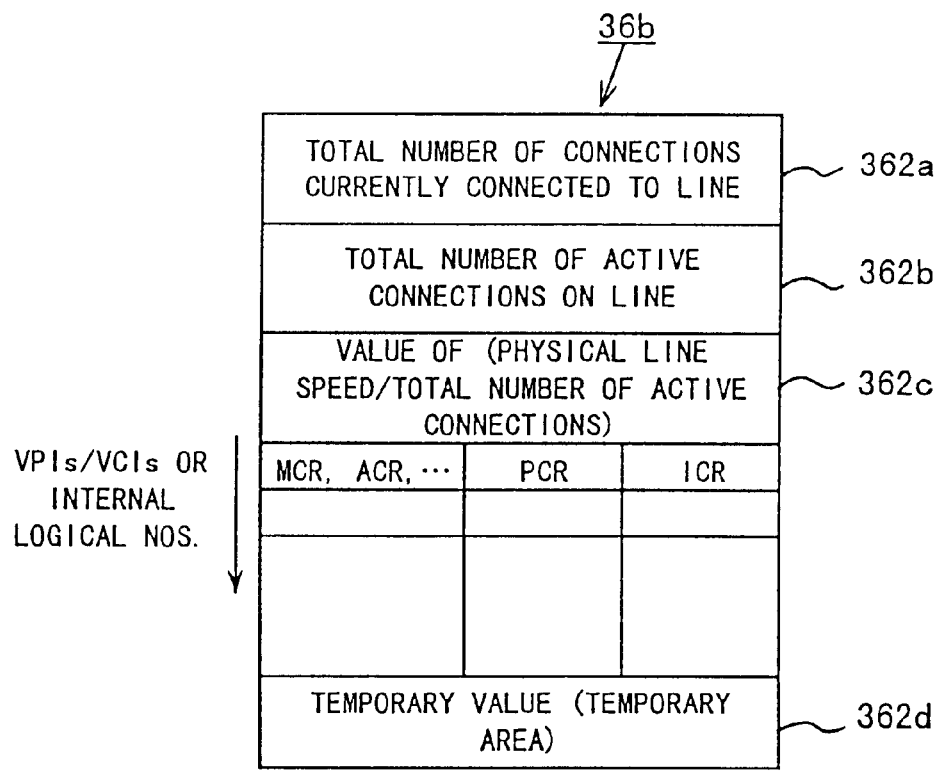
FIG. 6 is a diagram showing the contents of a table in the second aspect of the embodiment of the present invention.

The traffic data collector 34 in the second aspect of the embodiment finds the total number of connections (active connections) connected to the output line as are sending out cells within a unit time (for one second in this aspect of the embodiment), by reference to the identifiers VPIs and VCIs set in the cells. Subsequently, it writes the found total number of active connections into the entry 362b of a table 36b stored in the memory 36 as shown in FIG. 6.

The CPU 35 in the second aspect of the embodiment writes into the entry 362c of the table 36b stored in the memory 36, a value obtained in such a way that the physical line speed of the output line for an RM cell inputted from the RM cell extractor 32 is divided by the "total number of active connections" set in the entry 362b of the table 36b (the value of Physical line speed/Total number of Active connections). Further, the CPU 35 compares the value of the parameter PCR retained in the table 36b in the memory 36 and set for a connection to which the RM cell is to be sent out, with the value set in the entry 362c of the table 36b and obtained by dividing the physical line speed of the output line for the RM cell by the total number of active connections, and it acquires the smaller one (ICR1) of the values (as calculated by a function (3) mentioned below). Subsequently, the CPU 35 compares the value ICR1 with the value of the parameter MCR set for the pertinent connection in the table 366b, and it sets the larger one of the values as the new value of the parameter ICR (as calculated by a function (4) mentioned below). Herein, the CPU 35 writes the new value of the parameter ICR into the corresponding entry of the table 36b stored in the memory 36, by reference to the identifiers VPI and VCI of the RM cell, and it outputs the new ICR value to the RM cell inserter 33.

$$ICR1 = \text{Min}(PCR \text{ of Connection, Physical line speed/Total number of Active connections}) \quad (3)$$

$$ICR = \text{Max}(MCR, ICR1) \quad (4)$$

The memory 36 in the second aspect of the embodiment stores the table 36b therein. As shown in FIG. 6, the table 36b retains the total number of connections connected to the output line, the total number of active connections connected to the output line and being sending out the cells within the unit time, the value obtained by dividing the physical line speed of the output line by the total number of connections (the value of Physical line speed/Total number of Connections), such parameters as MCR and ACR, and PCR and ICR corresponding to each of the connections, and a temporary value (the temporary number of active connections). Besides, the "total number of connections" set in the entry 362a of the table 36b is rewritten by the CPU 35 each time a connection is set or released anew.

Figure 8:
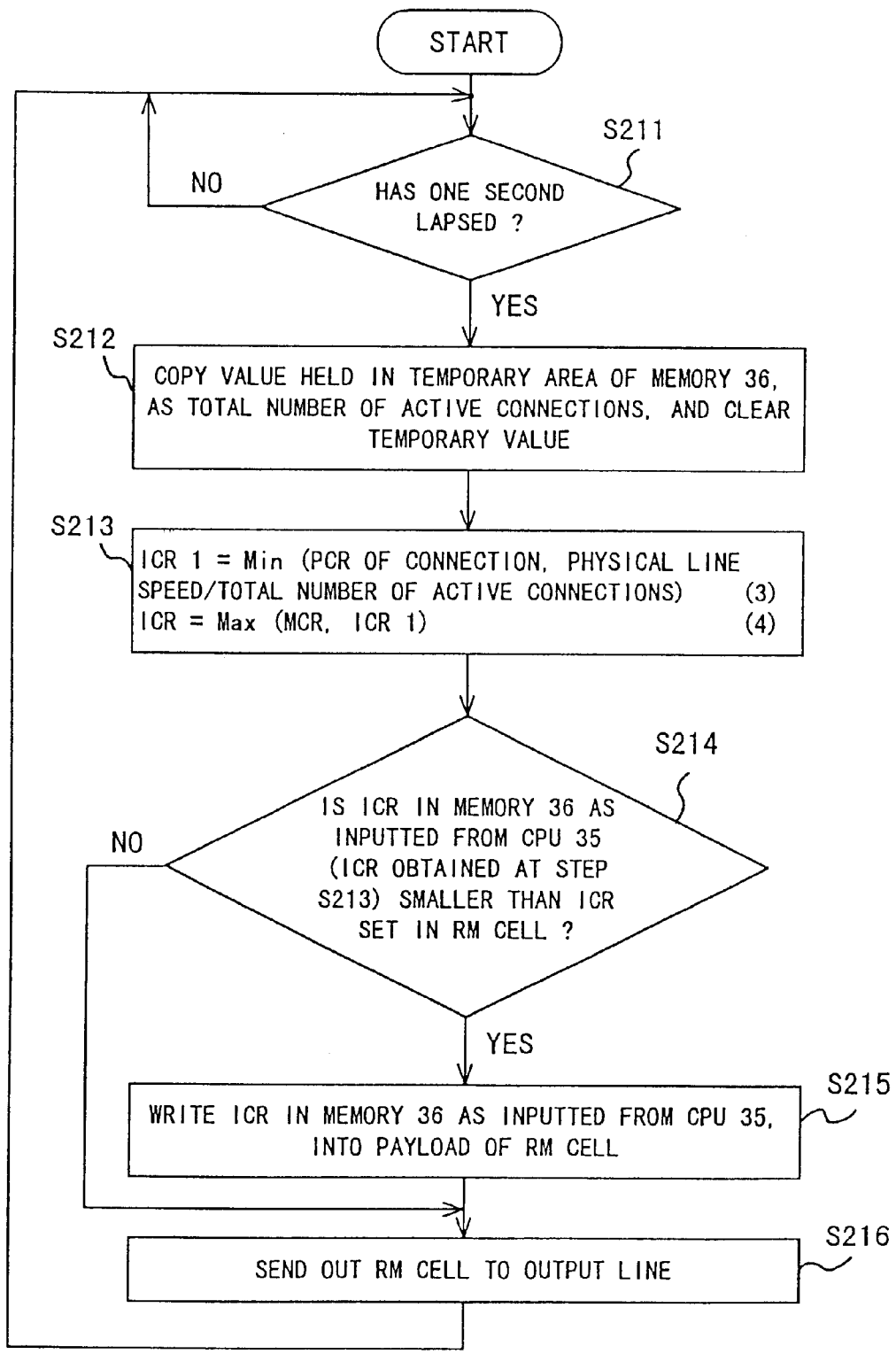
FIG. 8 is also a diagram showing the operating flow of the line control apparatus in the second aspect of the embodiment of the present invention.

Next, the operating flow of each of the line control apparatuses 11, 13 in the second aspect of the embodiment will be described with reference to FIGS. 7 and 8.

In the first place, the operation of the traffic data collector 34 for counting the number of active connections which are sending out cells in a unit time will be explained in conjunction with the flowchart of FIG. 7.

The traffic data collector 34 decides whether or not a cell is inputted, at a step S201. In the presence of the inputted cell, the operating flow proceeds to a step S202, at which the traffic data collector 34 refers to the identifiers VPI and VCI set in the header of the inputted cell and further decides whether or not the cell of a connection bearing the same identifiers VPI and VCI has already arrived. On condition that the cell of such a connection has not arrived yet, a value which is held in the temporary area 362d of the table 36b (refer to FIG. 6) stored in the memory 36 is incremented by one at a step S203. Incidentally, the temporary area 362d is initialized to "0" when it is reserved.

Secondly, the operation of rewriting the control parameter ICR set in the payload of the RM cell will be explained in conjunction with the flowchart of FIG. 8.

At a step S211, the CPU 35 decides whether or not one second has lapsed since it read out the total number of active connections from the entry 362b of the table 36b stored in the memory 36. On condition that one second has lapsed, the operating flow proceeds to a step S212. Here at the step S212, the CPU 35 copies a value (temporary value) retained in the temporary area 362d of the table 36b stored in the memory 36, as the total number of active connections retained in the entry 362b of the table 366b, and it clears the temporary value in the entry 362d of the table 36b to "0". Besides, the CPU 35 divides the physical line speed of the output line for the RM cell by the total number of active connections, and it writes the result of the division into the entry 362c of the table 36b stored in the memory 36.

At a step S213, the CPU 35 refers to the identifiers VCI and VPI set in the header of the RM cell as inputted from the RM cell extractor 32 and reads out the control parameter PCR of a connection bearing the same VCI and VPI, from the table 36b stored in the memory 36. In addition, the CPU 35 reads out the "value found by dividing the physical line speed of the output line for the RM cell by the total number of active connections" as obtained at the step S212, from the entry 362c of the table 36b stored in the memory 36. Besides, the CPU 35 calculates the value ICR1 by the execution of the above function (3) and also calculates the parameter ICR by the execution of the above function (4). Herein, the CPU 35 writes the calculated value of the ICR into the corresponding entry of the table 36a stored in the memory 36, by reference to the above identifiers VPI and VCI, and it outputs the calculated ICR value to the RM cell inserter 33.

At a step S214, the RM cell inserter 33 makes a comparison between the value of the ICR set in the payload of the RM cell and that of the ICR retained in the table 36a of the memory 36 as inputted from the CPU 35.

On condition that, as the result of the comparison at the step S214, the value of the ICR inputted from the CPU 35 is smaller than that of the ICR set in the payload of the RM cell, the operating flow proceeds to a step S215, at which the RM cell inserter 33 writes the value of the ICR inputted from the CPU 35, into the payload of the RM cell. At a step S216, the RM cell inserter 33 sends out the resulting RM cell to the output line.

In contrast, on condition that, as the result of the comparison at the step S214, the value of the ICR inputted from the CPU 35 is larger than or equal to that of the ICR set in the payload of the RM cell, the operating flow proceeds to the step S216, at which the RM cell inserter 33 sends out the RM cell to the output line.

Further, the third aspect of the embodiment for recalculating the control parameter ICR will be described.

Figure 9:
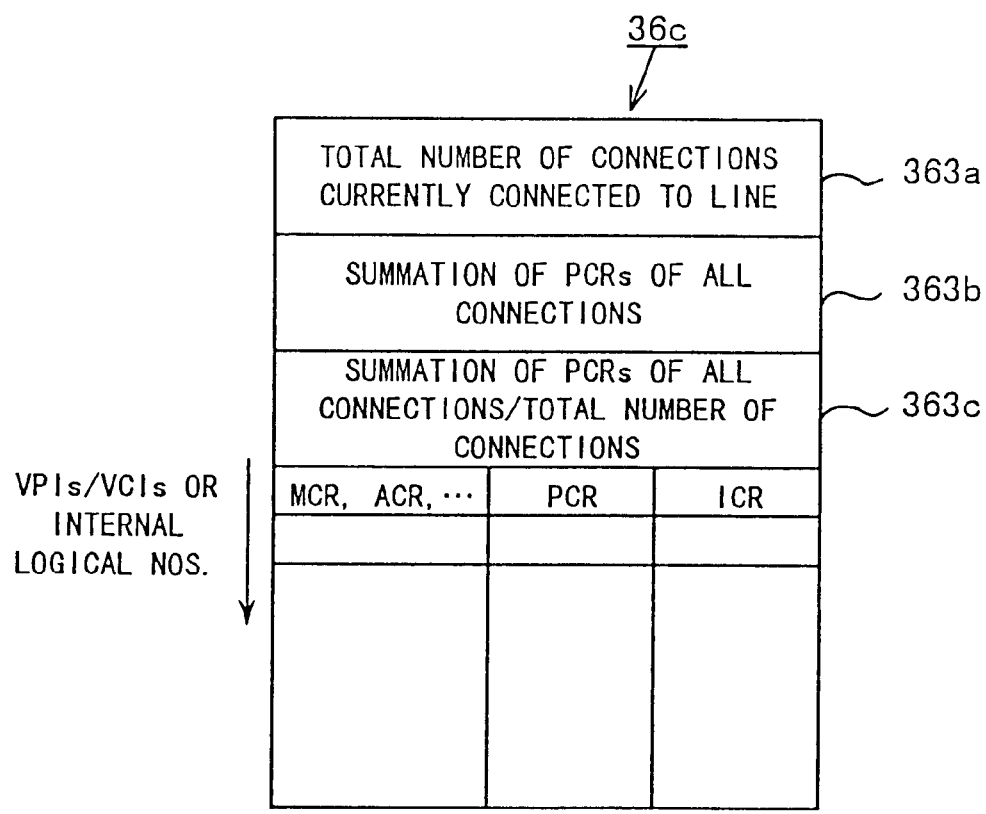
FIG. 9 is a diagram showing the contents of a table in the third aspect of the embodiment of the present invention.

The CPU 35 in the third aspect of the embodiment finds the summation of the control parameters PCRs set in each connection connected to the output line for an RM cell, and it writes the summation into the entry 363b of a table 36c stored in the memory 36 and shown in FIG. 9. In addition, the CPU 35 divides the found summation by the "total number of connections connected to the output line" retained in the entry 363a of the table 36c shown in FIG. 9, and it writes the result of the division into the entry 363c of the table 36c stored in the memory 36. Besides, the CPU 35 compares the value of the parameter PCR retained in the table 36c of the memory 36 and set for a connection to which the RM cell is to be transferred, with the value of the result of the division set in the entry 363c of the table 36c stored in the memory 36, and it acquires the smaller one (ICR1) of the values (as calculated by a function (5) mentioned below). Further, the CPU 35 compares the value ICR1 with the value of the parameter MCR set for the pertinent connection in the table 36b, and it sets the larger one of the values as the new value of the parameter ICR (as calculated by a function (6) mentioned below). Herein, the CPU 35 writes the new value of the parameter ICR into the corresponding entry of the table 36c stored in the memory 36, by reference to the identifiers VPI and VCI of the RM cell, and it outputs the new ICR value to the RM cell inserter 33.

$$ICR1=Min(PCR \text{ of Connection, Summation of PCRs of All connections/Total number of Connections}) \quad (5)$$

$$ICR=Max(MCR, ICR1) \quad (6)$$

The memory 36 in the third aspect of the embodiment stores the table 36c therein. As shown in FIG. 9, the table 36c retains the total number of connections connected to the output line, the summation of the control parameters PCRs set in the respective connections connected to the output line, the value obtained by dividing the summation of the PCRs by the total number of connections connected to the output line [the value of (Summation of PCRs of All connections/Total number of Connections)], and such parameters as MCR and ACR, and PCR and ICR corresponding to each of the connections. Besides, the "total number of connections" set in the entry 363a of the table 36c is rewritten by the CPU 35 each time a connection is set or released anew.

Figure 10:
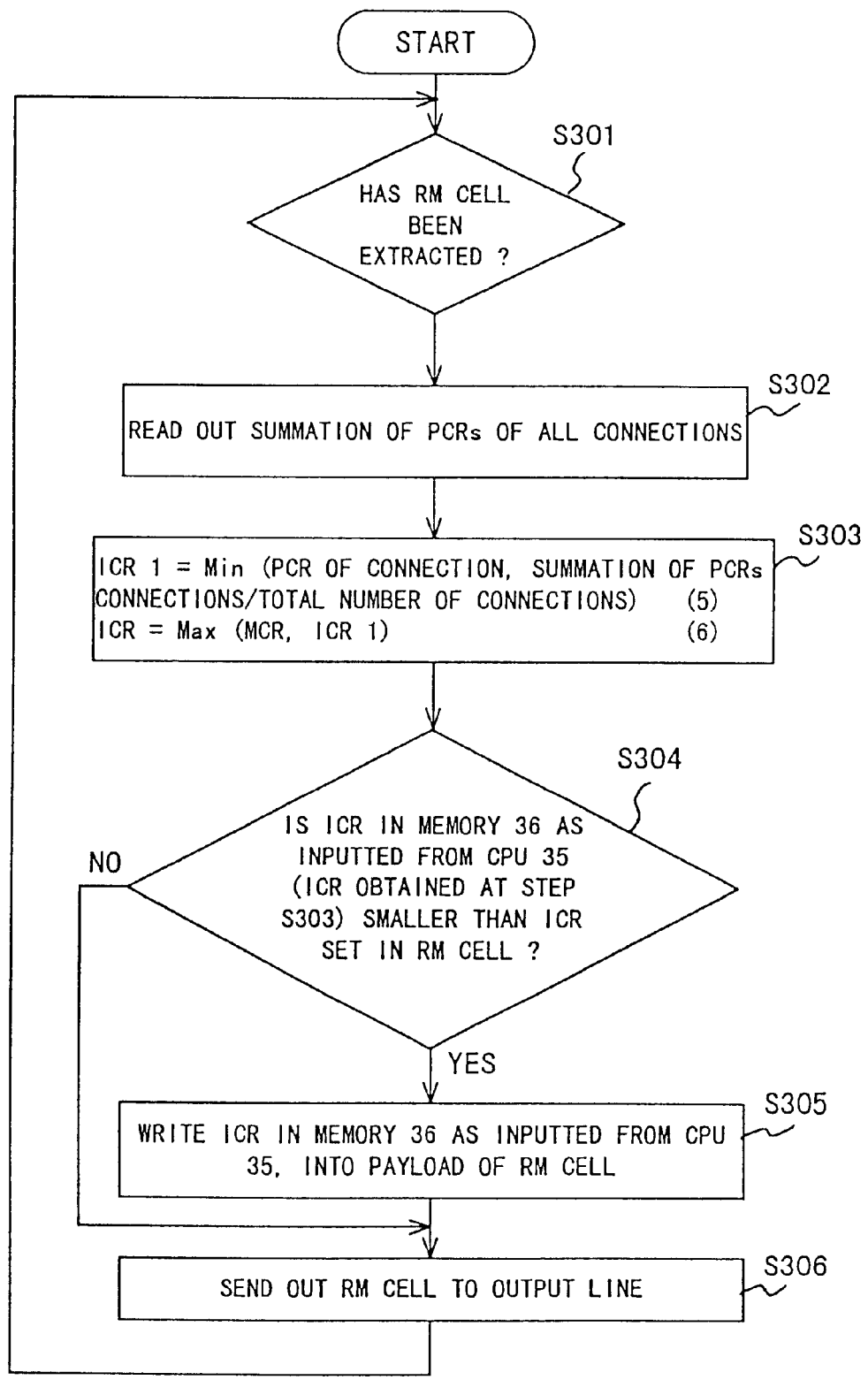
FIG. 10 is a diagram showing the operating flow of a line control apparatus in the third aspect of the embodiment of the present invention.

Next, the operating flow of each of the line control apparatuses 11, 13 in the third aspect of the embodiment will be described with reference to FIG. 10.

At a step S301, the RM cell extractor 32 extracts an RM cell and outputs the RM cell to the RM cell inserter 33 and the CPU 35. Then, at a step S302, the CPU 35 reads out of the entry 363b of the table 36c stored in the memory 36, the "summation of PCRs set for respective connections connected to the output line for the RM cell" calculated by the CPU 35 beforehand and retained in the above entry 363b.

At a step S303, the CPU 35 divides the summation of the PCRs read out at the step S302, by the "total number of connections connected to the output line to which the RM cell is to be sent out", and it writes the result of the division into the entry 363c of the table 36c stored in the memory 36. Besides, the CPU 35 calculates the value ICR1 by the execution of the above function (5) and further calculates the parameter ICR by the execution of the above function (6). Herein, the CPU 35 writes the calculated value of the ICR into the corresponding entry of the table 36c stored in the memory 36, by reference to the identifiers VPI and VCI of the RM cell, and it outputs the calculated ICR value to the RM cell inserter 33.

At a step S304, the RM cell inserter 33 makes a comparison between the value of the ICR set in the payload of the RM cell and that of the ICR retained in the table 36c of the memory 36 as inputted from the CPU 35.

On condition that, as the result of the comparison at the step S304, the value of the ICR inputted from the CPU 35 is smaller than that of the ICR set in the payload of the RM cell, the operating flow proceeds to a step S305, at which the RM cell inserter 33 writes the value of the ICR inputted from the CPU 35, into the payload of the RM cell. At a step S306, the RM cell inserter 33 sends out the resulting RM cell to the output line.

In contrast, on condition that, as the result of the comparison at the step S304, the value of the ICR inputted from the CPU 35 is larger than or equal to that of the ICR set in the payload of the RM cell, the operating flow proceeds to the step S306, at which the RM cell inserter 33 sends out the RM cell to the output line.

Still further, the fourth aspect of the embodiment for recalculating the control parameter ICR will be described.

Figure 11:
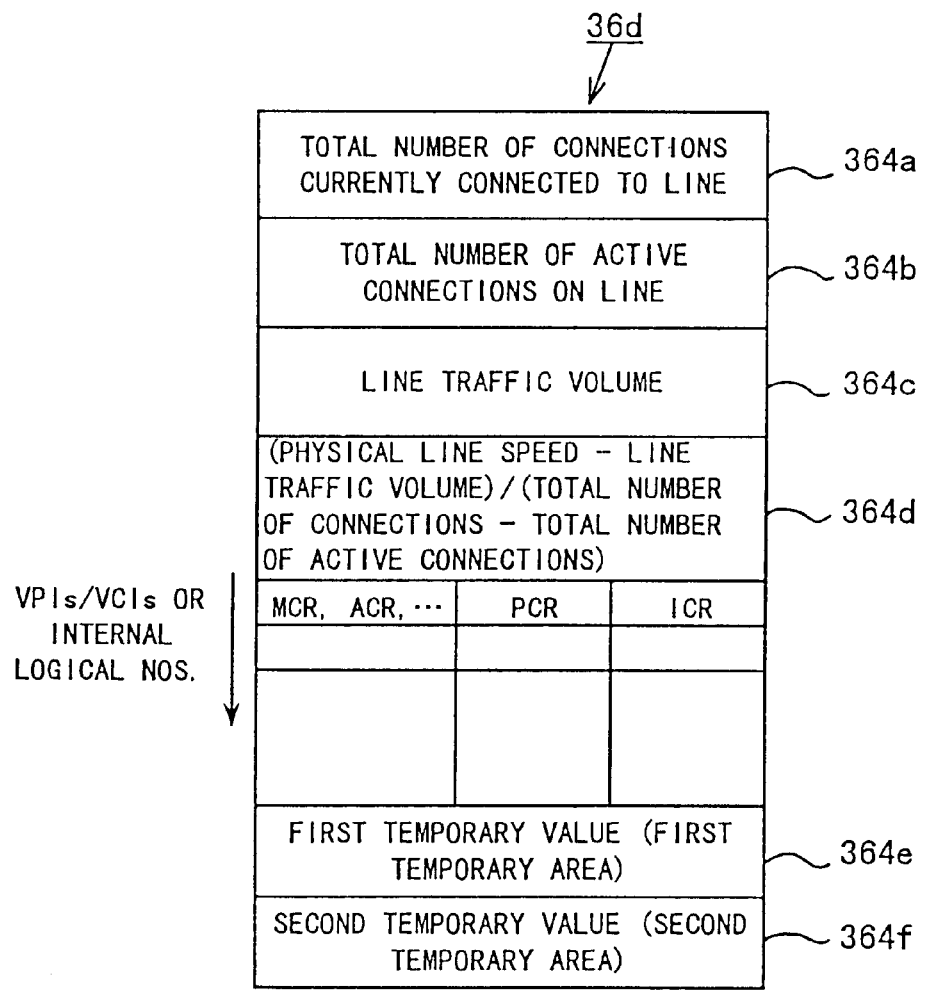
FIG. 11 is a diagram showing the contents of a table in the fourth aspect of the embodiment of the present invention.

The traffic data collector 34 in the fourth aspect of the embodiment observes the number of cells arriving per second (hereinbelow, termed the "line traffic volume") and writes the line traffic volume into the entry 364c of a table 36d stored in the memory 36 as shown in FIG. 11. That is, the traffic data collector 34 writes the line traffic volume obtained every second, into the entry 364c of the table 36d stored in the memory 36. Besides, the traffic data collector 34 finds the number of connections which are sending out cells onto the line within a unit time, namely, within one second in this aspect of the embodiment (as the total number of active connections on the line), by reference to the identifiers VPIs and VCIs set in the cells, and it writes the found number of active connections into the entry 364b of the table 36d stored in the memory 36.

The CPU 35 in the fourth aspect of the embodiment obtains a value in such a way that the traffic volume of the output line for an RM cell is subtracted from the physical line speed of the output line (obtaining the difference of the first subtraction), while the total number of active connections mentioned above is subtracted from the total number of connections connected to the output line (obtaining the total number of non-active connections) or (obtaining the difference of the second subtraction). The difference of the first subtraction is divided by the difference of the second subtraction. Thereafter, the CPU 35 writes the result of the division into the entry 364d of the table 36d stored in the memory 36. Besides, the CPU 35 compares the value of the parameter PCR set for a connection to which the RM cell inputted from the RM cell extractor 32 is to be sent out, with the value of the result of the division set in the entry 364d of the table 36d stored in the memory 36, and it acquires the smaller one (ICR1) of the values (as calculated by a function (7) mentioned below). Further, the CPU 35 compares the value ICR1 with the value of the parameter MCR, and it sets the larger one of the values as the new value of the parameter ICR (as calculated by a function (8) mentioned below). Herein, the CPU 35 writes the new value of the parameter ICR into the corresponding entry of the table 36d stored in the memory 36, by reference to the identifiers VPI and VCI of the RM cell, and it outputs the new ICR value to the RM cell inserter 33.

$$ICR1=\text{Min}[\text{PCR of Connection}, (\text{Physical line speed}-\text{Line traffic volume})/(\text{Total number of Connections}-\text{Total number of Active connections})] \quad (7)$$

$$ICR=\text{Max}(MCR, ICR1) \quad (8)$$

The memory 36 in the fourth aspect of the embodiment stores the table 36d therein. As shown in FIG. 11, the table 36d retains the total number of connections connected to the output line, the total number of active connections connected to the output line and being sending out cells in a unit time, the traffic volume of the output line (line traffic volume), the value obtained in the way that the physical line speed of the output line with the traffic volume of the output line subtracted therefrom is divided by the total number of connections with the total number of active connections subtracted therefrom, namely, by the number of non-active connections [(Physical line speed−Line traffic volume)/(Total number of Connections−Total number of Active connections)], such parameters as MCR and ACR, and PCR and ICR corresponding to each of the connections, a first temporary value (a temporary line traffic volume), and a second temporary value (the temporary number of active connections). Besides, the "total number of connections" set in the entry 364a of the table 36d is rewritten by the CPU 35 each time a connection is set or released anew.

Figure 12:
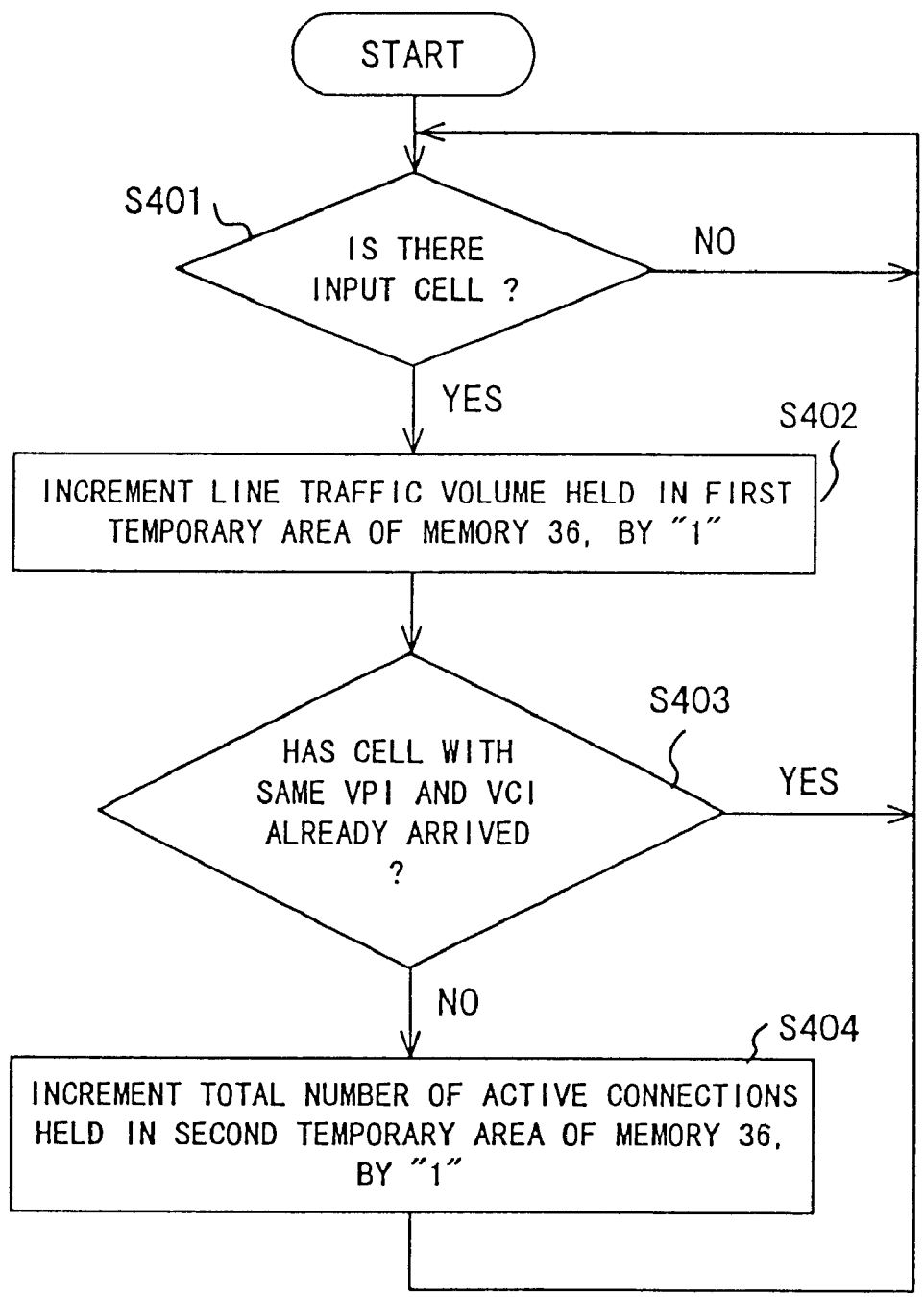
FIG. 12 is a diagram showing the operating flow of a line control apparatus in the fourth aspect of the embodiment of the present invention.

Next, the operating flow of each of the line control apparatuses 11, 13 in the fourth aspect of the embodiment will be described with reference to FIGS. 12 and 13.

In the first place, the operation of the traffic data collector 34 for counting the traffic volume of the output line per unit time and the total number of connections (active connections), which are sending out cells in the unit time, will be explained in conjunction with the flowchart of FIG. 12.

The traffic data collector 34 decides whether or not a cell is inputted, at a step S401. In the presence of the inputted cell, the operating flow proceeds to a step S402, at which a value held in the first temporary area 364e of the table 36d stored in the memory 36 is incremented by one. Incidentally, the first temporary area 364e is initialized to "0" when it is reserved.

At a step S403, the traffic data collector 34 refers to the identifiers VPI and VCI set in the header of the inputted cell and then decides whether or not the cell of a connection bearing the same identifiers VPI and VCI has already arrived. On condition that the cell of such a connection has not arrived yet, a value which is held in the second temporary area 364f of the table 36d stored in the memory 36 is incremented by one at a step S404. Incidentally, the second temporary area 364f is initialized to "0" when it is reserved.

Secondly, the operation of rewriting the control parameter ICR set in the payload of the RM cell will be explained in conjunction with the flowchart of FIG. 13.

At a step S411, the CPU 35 decides whether or not one second has lapsed since it read out the total number of active connections from the entry 364b of the table 36d stored in the memory 36. On condition that one second has lapsed, the operating flow proceeds to a step S412. Here at the step S412, the CPU 35 copies values retained in the first and second temporary areas 364e, 364f of the table 36d stored in the memory 36, as the line traffic volume in the entry 364c of the table 36d and the total number of active connections in the entry 364b of the table 36d, respectively. Simultaneously, the CPU 35 clears the values in the first and second temporary areas 364e, 364f of the table 36d to "0"s. Besides, the CPU 35 refers to the entries 364a to 364c of the table 36d and divides the physical line speed of the output line with the line traffic volume subtracted therefrom, by the total number of active connections with the total number of active connections subtracted therefrom. The calculated result of the division is written into the entry 364d of the table 36d stored in the memory 36.

At a step S413, the CPU 35 reads out of the entry 364d of the table 36d in the memory 36, the value obtained in the way that the physical line speed of the output line with the traffic volume of this output line subtracted therefrom is divided by the total number of connections connected to the output line with the total number of active connections currently connected to this output line subtracted therefrom. Besides, the CPU 35 calculates the value ICR1 by the execution of the above function (7) and subsequently calculates the parameter ICR by the execution of the above function (8). Herein, the CPU 35 writes the calculated value of the ICR into the corresponding entry of the table 36d stored in the memory 36, by reference to the above identifiers VPI and VCI of the RM cell.

At a step S414, the RM cell inserter 33 makes a comparison between the value of the ICR set in the payload of the RM cell as inputted from the RM cell extractor 32 and that of the ICR retained in the table 36d of the memory 36 as inputted from the CPU 35.

On condition that, as the result of the comparison at the step S414, the value of the ICR inputted from the CPU 35 is smaller than that of the ICR set in the payload of the RM cell, the operating flow proceeds to a step S415, at which the RM cell inserter 33 writes the value of the ICR inputted from the CPU 35, into the payload of the RM cell. At a step S416, the RM cell inserter 33 sends out the resulting RM cell to the output line.

In contrast, on condition that, as the result of the comparison at the step S414, the value of the ICR inputted from the CPU 35 is larger than or equal to that of the ICR set in the payload of the RM cell, the operating flow proceeds to the step S416, at which the RM cell inserter 33 sends out the RM cell to the output line.

In each of the first through fourth aspects of the embodiment, the control parameter ICR is dynamically altered to a value conforming to the situation of use of the network. Therefore, the transmission rate of the cells of the transmission terminal can be controlled so as to reflect the congestion state of the network, while the network resources are being effectively utilized. More specifically, the transmission terminal calculates the control parameter ACR on the basis of the value of the ICR set in the backward RM cell. Besides, the transmission terminal sets the ICR determined in establishing the ABR connection, in the forward RM cell which is to be thereafter sent out.

Next, the fifth aspect of the embodiment for recalculating the rate increase factor RIF will be described.

Figure 14:
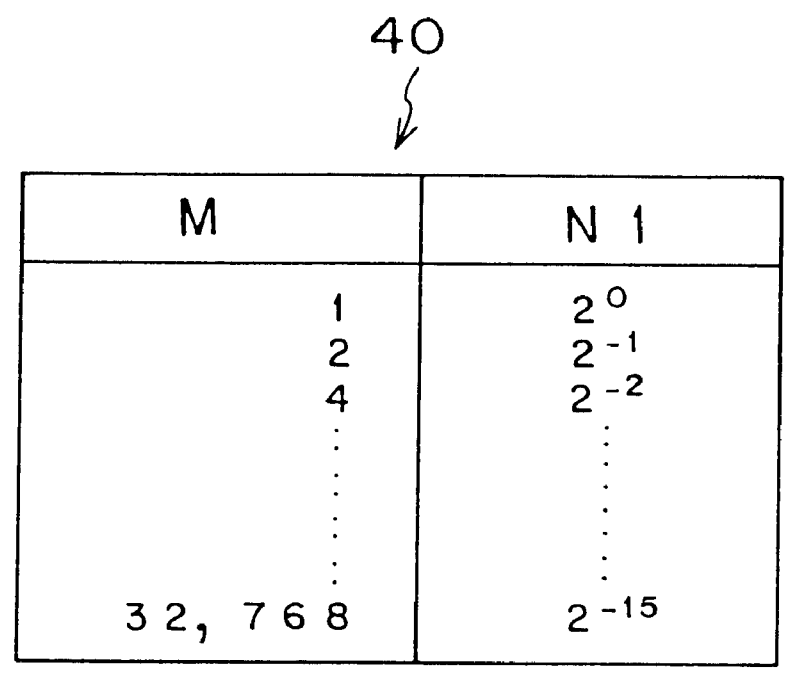

The CPU 35 in the fifth aspect of the embodiment finds the parameter RIF satisfying a formula (9) mentioned below, in such a way that a table 40 stored in the memory 36 as shown in FIG. 14 is searched by, for example, a dichotomizing search. Subsequently, the CPU 35 writes the found value of the RIF into the corresponding entry of a table 36e stored in the memory 36 as shown in FIG. 15, by reference to the identifiers VPI and VCI of an RM cell, and it outputs the RIF value to the RM cell inserter 33.

$$N1 \approx 2^{-LogM} \qquad (9)$$

Here, symbol M denotes the total number of connections, and symbol N1 denotes the value of the parameter RIF. By the way, all logarithmic bases shall be "2" in this specification.

The memory 36 in the fifth aspect of the embodiment stores the table 36e therein. As shown in FIG. 15, the table 36e retains the total number of connections connected to the output line, and such parameters as MCR and ACR, and RIF corresponding to each of the connections. Besides, the "total number of connections" set in the entry 365a of the table 36e is rewritten by the CPU 35 each time a connection is set or released anew.

Figure 16:
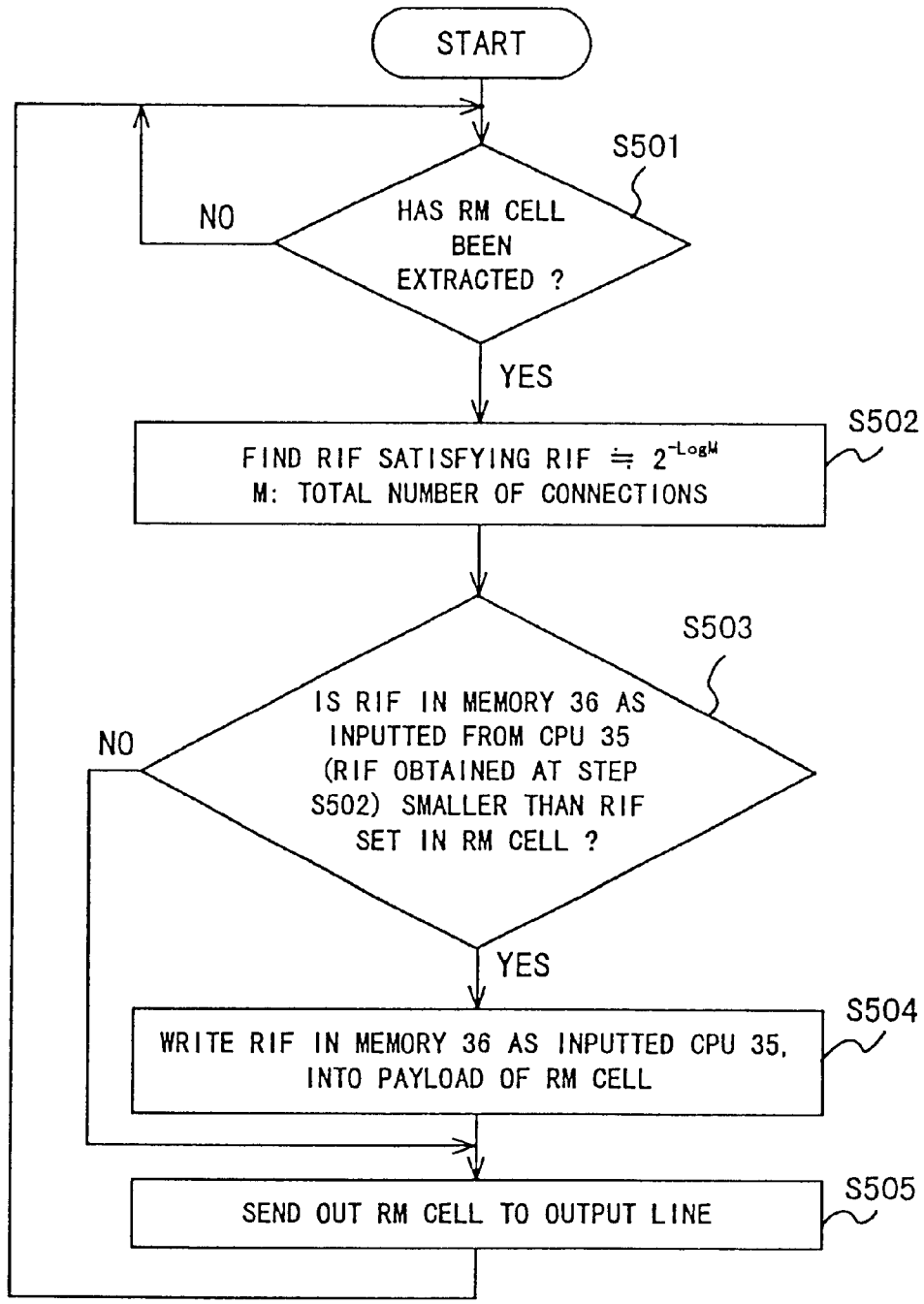
FIG. 16 is a diagram showing the operating flow of a line control apparatus in the fifth aspect of the embodiment of the present invention.

Next, the operating flow of each of the line control apparatuses 11, 13 in the fifth aspect of the embodiment will be described with reference to FIG. 16.

At a step S501, the RM cell extractor 32 extracts an RM cell and outputs the RM cell to the RM cell inserter 33 and the CPU 35. Then, at a step S502, the CPU 35 obtains the parameter RIF meeting the above equation (9), in the way that the table 40 shown in FIG. 14 is searched by, for example, the dichotomizing search. Besides, the CPU 35 writes the obtained value of the RIF into the corresponding entry of the table 36e stored in the memory 36 as shown in FIG. 15, by reference to the identifiers VPI and VCI set in the header of the RM cell, and it outputs the RIF value to the RM cell inserter 33.

At a step S503, the RM cell inserter 33 makes a comparison between the value of the RIF set in the payload of the RM cell as inputted from the RM cell extractor 32 and that of the RIF retained in the table 36e of the memory 36 as inputted from the CPU 35.

On condition that, as the result of the comparison at the step S503, the value of the RIF inputted from the CPU 35 is smaller than that of the RIF set in the payload of the RM cell, the operating flow proceeds to a step S504, at which the RM cell inserter 33 writes the value of the RIF inputted from the CPU 35, into the payload of the RM cell. At a step S505, the RM cell inserter 33 sends out the resulting RM cell to the output line.

In contrast, on condition that, as the result of the comparison at the step S503, the value of the RIF inputted from the CPU 35 is larger than or equal to that of the RIF set in the payload of the RM cell, the operating flow proceeds to the step S505, at which the RM cell inserter 33 sends out the RM cell to the output line.

Further, the sixth aspect of the embodiment for recalculating the control parameter RIF will be described.

Figure 17:
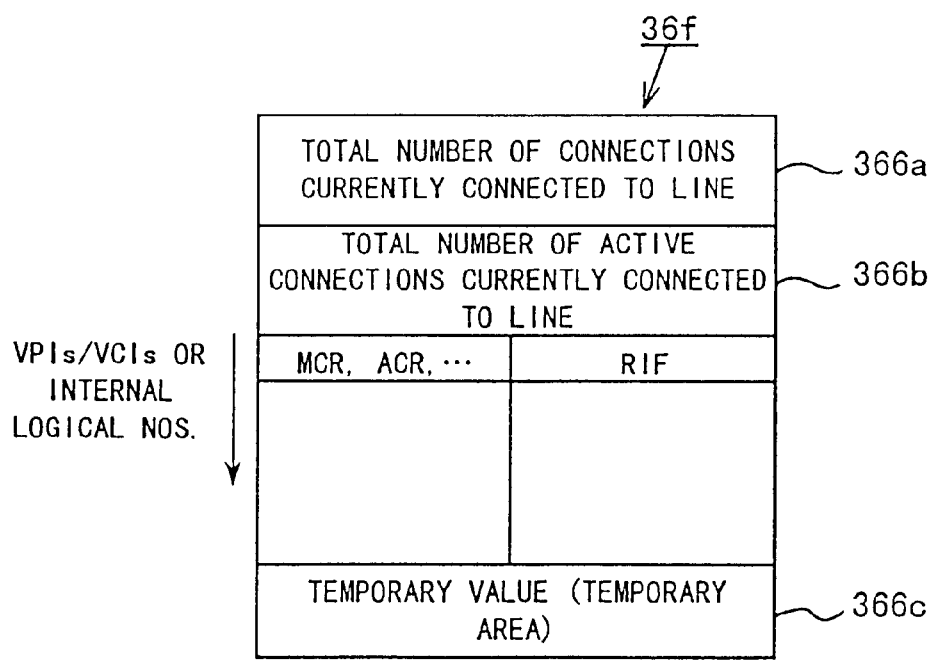
FIG. 17 is a diagram showing the contents of a table in the sixth aspect of the embodiment of the present invention.

The traffic data collector 34 in the sixth aspect of the embodiment finds the total number of connections (active connections) which are connected to the output line and which are sending out cells within a unit time, namely, within one second in this aspect of the embodiment, by reference to the identifiers VPIs and VCIs set in the cells, and it writes the found total number of active connections into the entry 366b of a table 36f stored in the memory 36 and shown in FIG. 17.

The CPU 35 in the sixth aspect of the embodiment finds the parameter RIF satisfying a formula (10) mentioned below, in such a way that the table 40 stored in the memory 36 as shown in FIG. 14 is searched by, for example, the dichotomizing search. Subsequently, the CPU 35 writes the found value of the RIF into the corresponding entry of the table 36f stored in the memory 36 as shown in FIG. 17, and it outputs the RIF value to the RM cell inserter 33.

$$N1 \approx 2^{-LogM} \qquad (10)$$

Here, symbol M denotes the total number of active connections, and symbol N1 denotes the value of the parameter RIF.

The memory 36 in the sixth aspect of the embodiment stores the table 36f therein. As shown in FIG. 17, the table 36f retains the total number of connections connected to the output line, the total number of active connections connected to the output line and being sending out the cells within the unit time, such parameters as MCR and ACR, and RIF corresponding to each of the connections, and a temporary value (the temporary number of active connections). Besides, the "total number of connections" set in the entry 366a of the table 36f in FIG. 17 is rewritten by the CPU 35 each time a connection is set or released anew.

Figure 18:
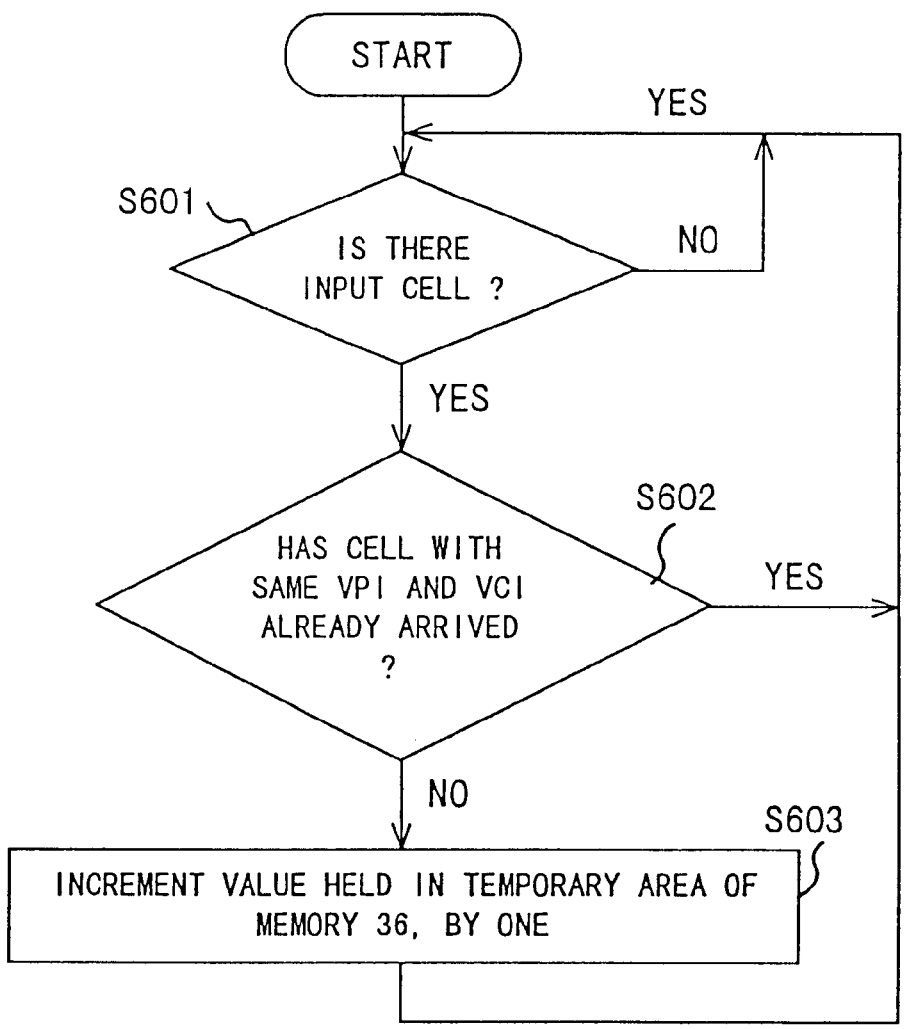
FIG. 18 is a diagram showing the operating flow of a line control apparatus in the sixth aspect of the embodiment of the present invention.

Regarding the sixth aspect of the embodiment, the operation of the traffic data collector 34 for counting the number of active connections, which are connected to the output line and which are sending out cells in the unit time, will be first explained in conjunction with the flowchart of FIG. 18.

The traffic data collector 34 decides whether or not a cell is inputted, at a step S601. In the presence of the inputted cell, the operating flow proceeds to a step S602, at which the traffic data collector 34 refers to the identifiers VPI and VCI set in the header of the inputted cell and further decides whether or not a cell bearing the same identifiers VPI and VCI has already arrived. On condition that such a cell has not arrived yet, a value which is held in the temporary area 366c of the table 36f stored in the memory 36 is incremented by one at a step 5603. Incidentally, the temporary area 366c is initialized to "0" when it is reserved.

Figure 19:
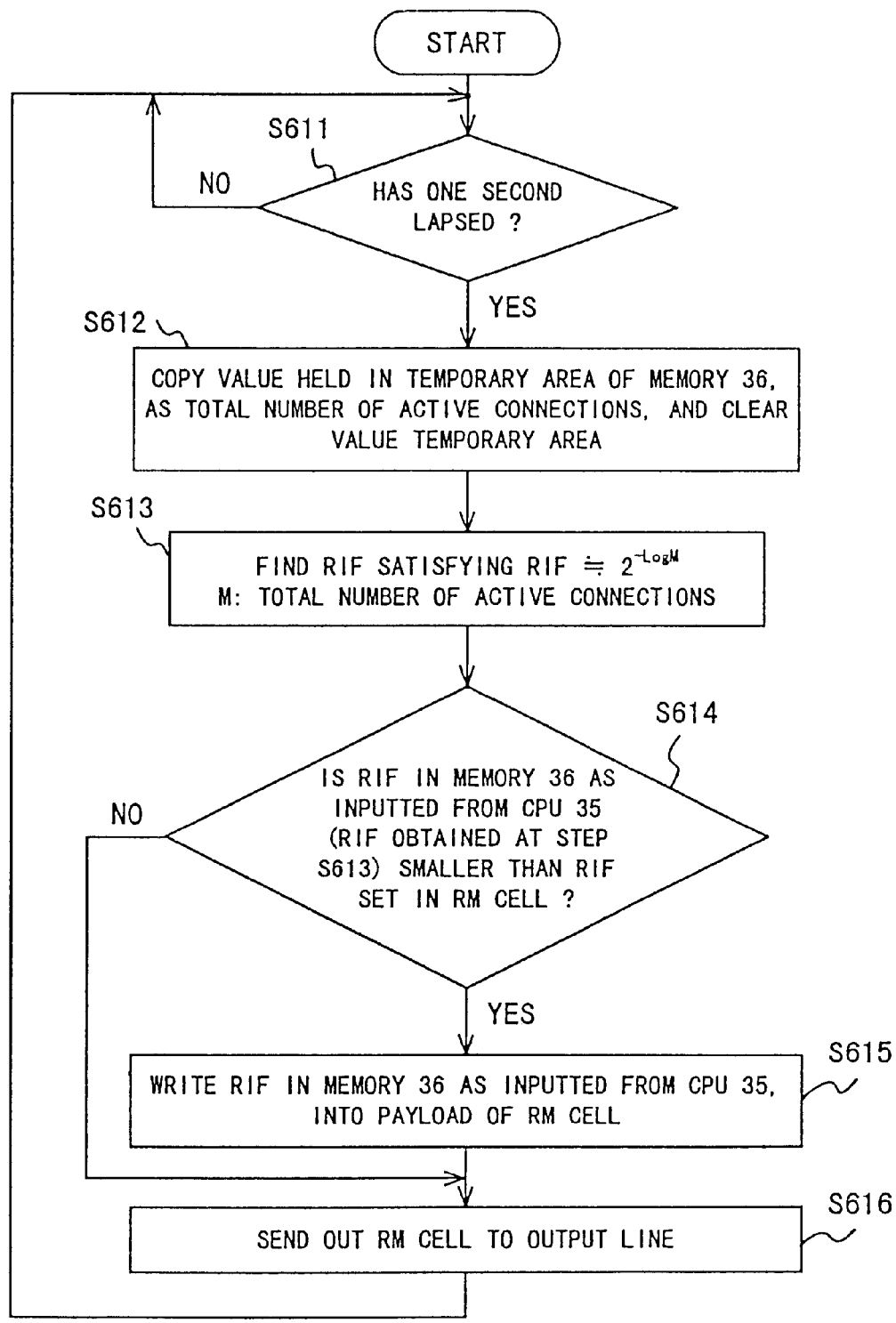
FIG. 19 is also a diagram showing the operating flow of the line control apparatus in the sixth aspect of the embodiment of the present invention.

Secondly, the operation of rewriting the control parameter RIF set in the payload of an RM cell will be explained in conjunction with the flowchart of FIG. 19.

At a step S611, the CPU 35 decides whether or not one second has lapsed since it read out the total number of active connections from the entry 366b of the table 36f stored in the memory 36. On condition that one second has lapsed, the operating flow proceeds to a step S612. Here at the step S612, the CPU 35 copies a value retained in the temporary area 366c of the table 36f stored in the memory 36, as the total number of active connections in the entry 366b of the table 36f, and it clears the temporary value in the entry 366c of the table 36f to "0".

At a step S613, the CPU 35 obtains the parameter RIF meeting the above equation (10), in the way that the table 40 is searched by, for example, the dichotomizing search. Besides, the CPU 35 writes the obtained value of the RIF into the corresponding entry of the table 36f stored in the memory 36, by reference to the identifiers VPI and VCI set in the header of the RM cell, and it outputs the RIF value to the RM cell inserter 33.

At a step S614, the RM cell inserter 33 makes a comparison between the value of the RIF set in the payload of the RM cell as inputted from the RM cell extractor 32 and that of the RIF retained in the corresponding entry of the table 36f of the memory 36 as inputted from the CPU 35.

On condition that, as the result of the comparison at the step S614, the value of the RIF inputted from the CPU 35 is smaller than that of the RIF set in the payload of the RM cell, the operating flow proceeds to a step S615, at which the RM cell inserter 33 writes the value of the RIF inputted from the CPU 35, into the payload of the RM cell. At a step S616, the RM cell inserter 33 sends out the resulting RM cell to the output line.

In contrast, on condition that, as the result of the comparison at the step S614, the value of the RIF inputted from the CPU 35 is larger than or equal to that of the RIF set in the payload of the RM cell, the operating flow proceeds to the step S616, at which the RM cell inserter 33 sends out the RM cell to the output line.

Further, the seventh aspect of the embodiment for recalculating the control parameter RIF will be described.

Figure 20:
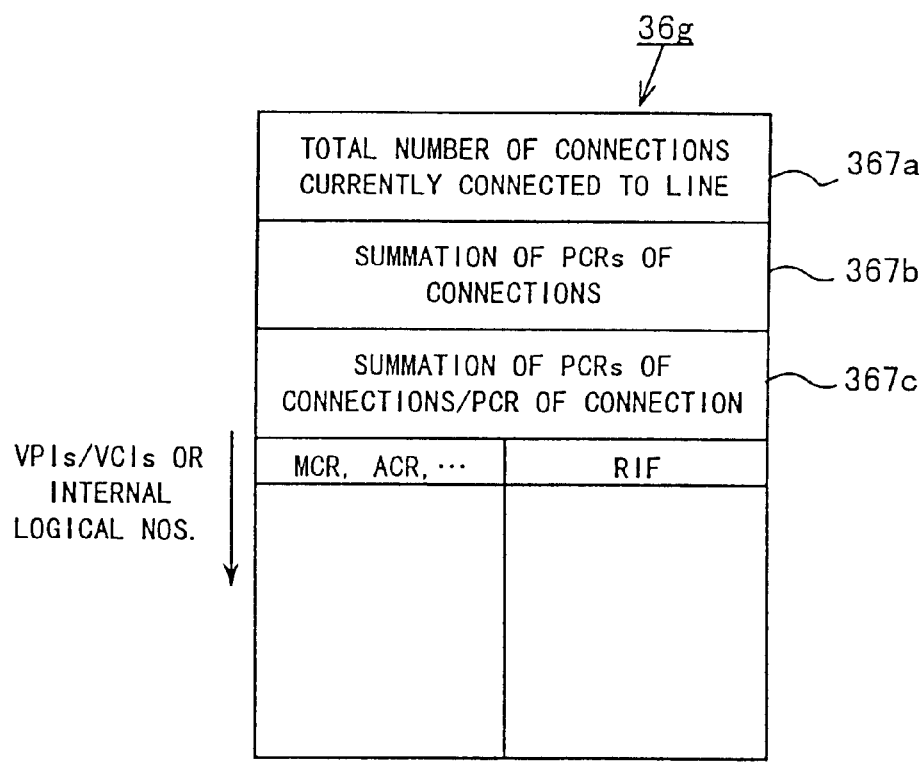
FIG. 20 is a diagram showing the contents of a table in the seventh aspect of the embodiment of the present invention.

The CPU 35 in the seventh aspect of the embodiment finds the summation of the control parameters PCRs set in respective connections connected to the output line for an RM cell, and it writes the summation into the entry 367b of a table 36g stored in the memory 36 and shown in FIG. 20. Further, the CPU 35 divides the found summation by the PCR of the connection to which the RM cell is to be sent out, and it writes the result of the division into the entry 367c of the table 36g stored in the memory 36. Still further, the CPU 35 finds the parameter RIF satisfying a formula (11) mentioned below, in such a way that the table 40 shown in FIG. 14 is searched by, for example, the dichotomizing search. Subsequently, the CPU 35 writes the found value of the RIF into the corresponding entry of the table 36g stored in the memory 36 as shown in FIG. 20, by reference to the identifiers VPI and VCI of the RM cell, and it outputs the RIF value to the RM cell inserter 33.

$$N1 \approx 2^{-LogM} \quad (11)$$

Here, symbol M denotes the value obtained by dividing the summation of the PCRs of all the connections by the PCR of the pertinent connection, and symbol N1 denotes the value of the parameter RIF.

The memory 36 in the seventh aspect of the embodiment stores the table 36g therein. As shown in FIG. 20, the table 36g retains the total number of connections connected to the output line, the summation of the PCRs set in the respective connections, the value obtained by dividing the summation of the PCRs by the PCR set in the pertinent connection to which the RM cell is to be sent out (Summation of PCRs of Connections/PCR of Connection), and such parameters as MCR and ACR, and RIF corresponding to each of the connections. Besides, the "total number of connections" set in the entry 367a of the table 36g is rewritten by the CPU 35 each time a connection is set or released anew.

Figure 21:
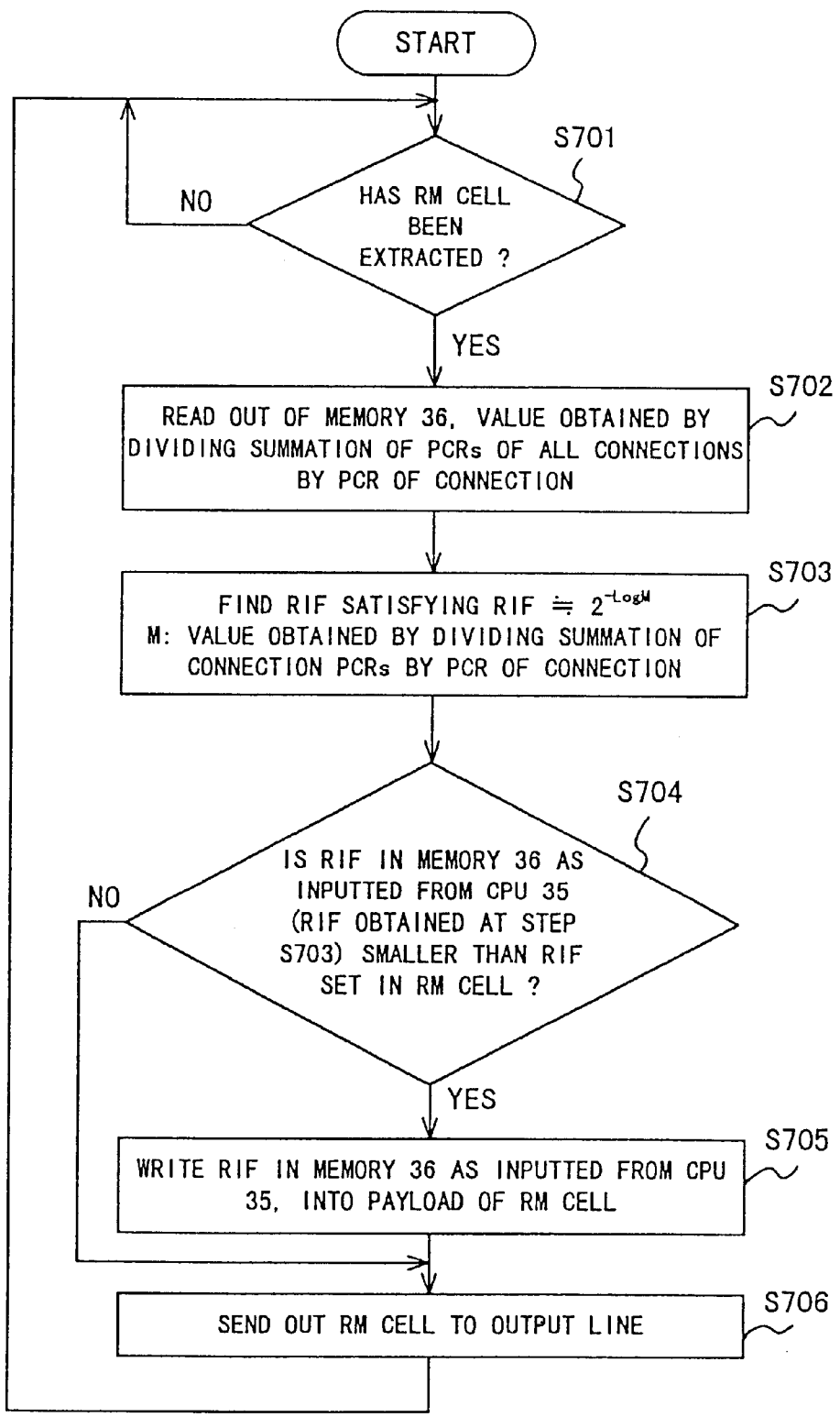
FIG. 21 is a diagram showing the operating flow of a line control apparatus in the seventh aspect of the embodiment of the present invention.

Next, the operating flow of each of the line control apparatuses 11, 13 in the seventh aspect of the embodiment will be described with reference to FIG. 21.

At a step S701, the RM cell extractor 32 extracts an RM cell and outputs the RM cell to the RM cell inserter 33 and the CPU 35. Then, at a step S702, the CPU 35 reads out of the entry 367c of the table 36g stored in the memory 36, the "value obtained by dividing the summation of the PCRs set for all connections connected to the output line for the RM cell (the summation having been calculated beforehand and kept held in the entry 367b of the table 36g in the memory 36), by the PCR set in the pertinent connection to which the RM cell is to be sent out (Summation of PCRs of Connections/PCR of Connection)".

At a step S703, the CPU 35 obtains the parameter RIF meeting the above equation (11), in the way that the table 40 shown in FIG. 14 is searched by, for example, the dichotomizing search. Besides, the CPU 35 writes the obtained value of the RIF into the corresponding entry of the table 36g stored in the memory 36 as shown in FIG. 20, by reference to the identifiers VPI and VCI set in the header of the RM cell, and it outputs the RIF value to the RM cell inserter 33.

At a step S704, the RM cell inserter 33 makes a comparison between the value of the RIF set in the payload of the RM cell as inputted from the RM cell extractor 32 and that of the RIF set in the table 36g of the memory 36 as inputted from the CPU 35.

On condition that, as the result of the comparison at the step S704, the value of the RIF inputted from the CPU 35 is smaller than that of the RIF set in the payload of the RM cell, the operating flow proceeds to a step S705, at which the RM cell inserter 33 writes the value of the RIF inputted from the CPU 35, into the payload of the RM cell. At a step S706, the RM cell inserter 33 sends out the resulting RM cell to the output line.

In contrast, on condition that, as the result of the comparison at the step S704, the value of the RIF inputted from the CPU 35 is larger than or equal to that of the RIF set in the payload of the RM cell, the operating flow proceeds to the step S706, at which the RM cell inserter 33 sends out the RM cell to the output line.

Further, the eighth aspect of the embodiment for recalculating the control parameter RIF will be described.

Figure 22:
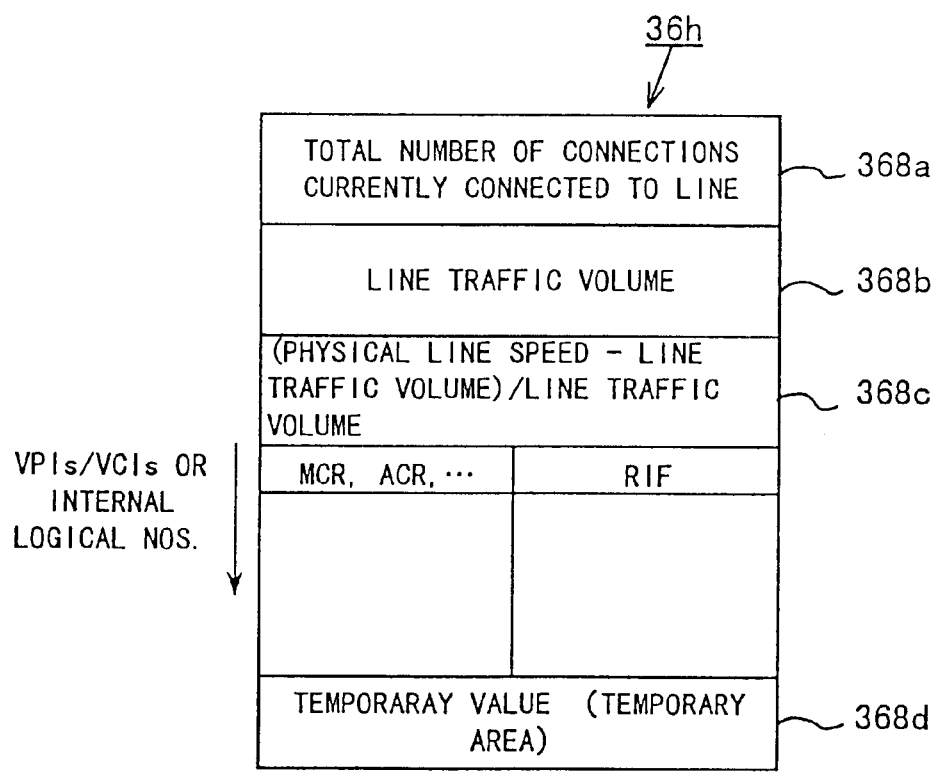
FIG. 22 is a diagram showing the contents of a table in the eighth aspect of the embodiment of the present invention.

The traffic data collector 34 in the eighth aspect of the embodiment observes the number of cells arriving per second (the "line traffic volume") and writes the line traffic volume into the entry 368b of a table 36h stored in the memory 36 as shown in FIG. 22. That is, the traffic data collector 34 writes the line traffic volume observed every second, into the entry 368b of the table 36h stored in the memory 36.

Figure 25:
FIG. 25 is a diagram showing a table which is utilized for evaluating an RIF and an RDF.

The CPU 35 in the eighth aspect of the embodiment obtains a value in such a way that the line traffic volume of the output line for an RM cell inputted from the RM cell extractor 32 is subtracted from the physical line speed of the pertinent output line, and that the difference of the subtraction is divided by the line traffic volume. The result of the division is written into the entry 368c of the table 36h stored in the memory 36. Further, the CPU 35 finds the parameter RIF satisfying a formula (12) mentioned below, in such a way that a table 41 shown in FIG. 25 is searched by, for example, the dichotomizing search. Subsequently, the CPU 35 writes the found value of the RIF into the corresponding entry of the table 36h stored in the memory 36 as shown in FIG. 22, by reference to the identifiers VPI and VCI of the RM cell, and it outputs the RIF value to the RM cell inserter 33.

$$N2 \approx 2^{-(15-LogM)} \quad (12)$$

Here, symbol M denotes the value obtained by dividing the physical line speed of the output line with the line traffic volume thereof subtracted therefrom, by this line traffic volume, and symbol N2 denotes the value of the parameter RIF.

The memory 36 in the eighth aspect of the embodiment stores the table 36h therein. As shown in FIG. 22, the table 36h retains the total number of connections connected to the output line, the traffic volume of the output line (the line traffic volume), the value obtained by dividing the physical line speed of the output line with the line traffic volume thereof subtracted therefrom, by this line traffic volume [(Physical line speed−Line traffic volume)/Line traffic volume], such parameters as MCR and ACR, and RIF corresponding to each of the connections, and a temporary value (a temporary line traffic volume).

Figure 23:
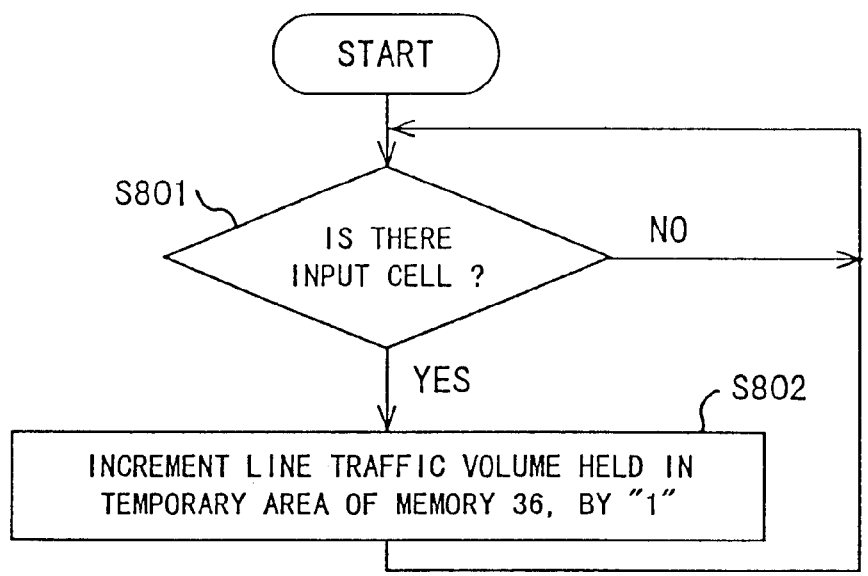
FIG. 23 is a diagram showing the operating flow of a line control apparatus in the eighth aspect of the embodiment of the present invention.
Figure 24:
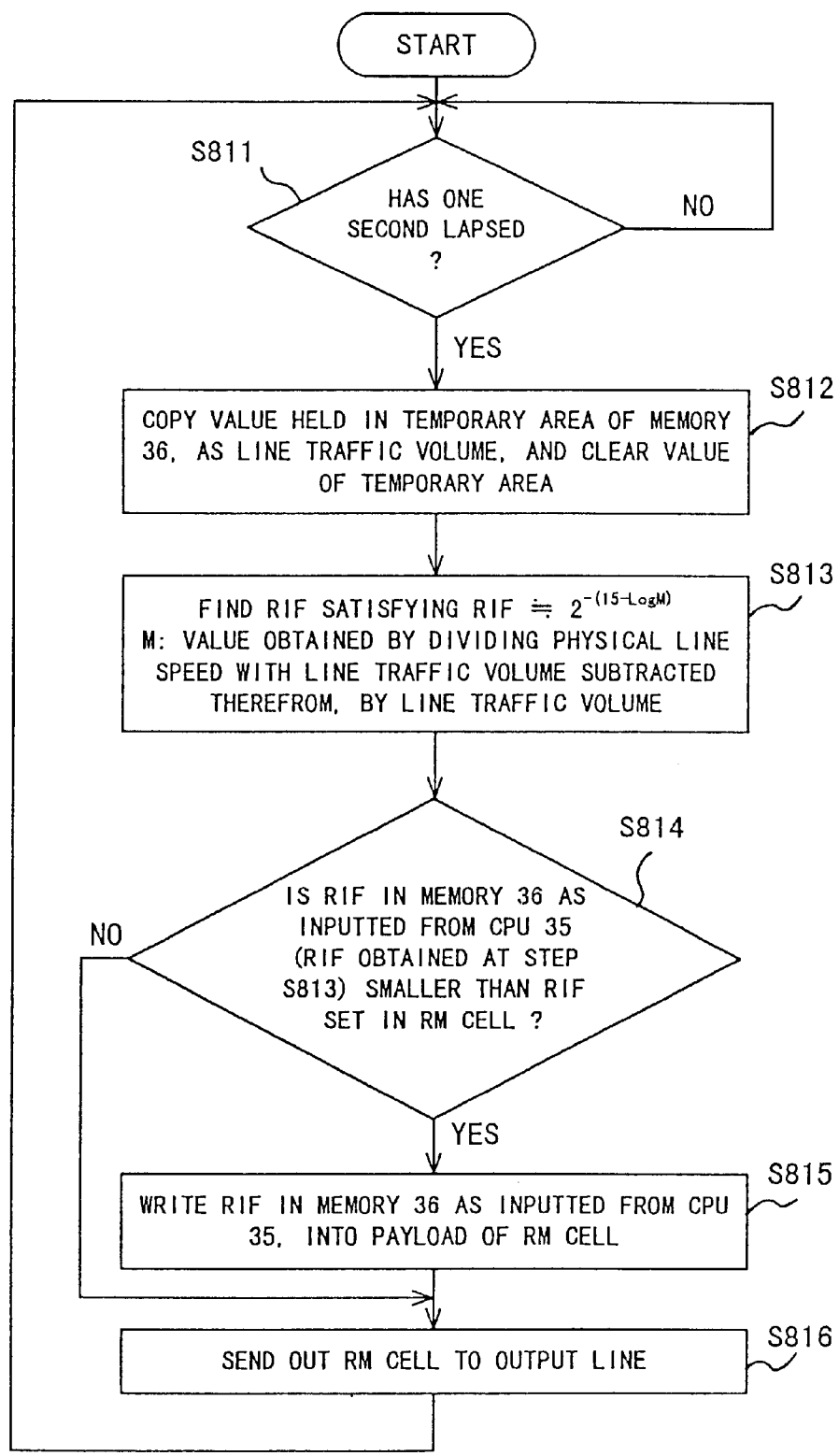
FIG. 24 is also a diagram showing the operating flow of the line control apparatus in the eighth aspect of the embodiment of the present invention.

Next, the operating flow of each of the line control apparatuses 11, 13 in the eighth aspect of the embodiment will be described with reference to FIGS. 23 and 24.

In the first place, the operation of the traffic data collector 34 for counting the traffic volume of the output line per unit time will be explained in conjunction with the flowchart of FIG. 23.

The traffic data collector 34 decides whether or not a cell is inputted, at a step S801. In the presence of the inputted cell, the operating flow proceeds to a step S802, at which a value held in the entry or temporary area 368d of the table 36h stored in the memory 36 is incremented by one. Incidentally, the temporary area 368d is set to "0" when it is reserved.

Secondly, the operation of rewriting the control parameter RIF set in the payload of an RM cell will be explained in conjunction with the flowchart of FIG. 24.

At a step S811, the CPU 35 decides whether or not one second has lapsed since it read out the temporary line traffic volume from the entry 368d of the table 36h stored in the memory 36. On condition that one second has lapsed, the operating flow proceeds to a step S812. Here at the step S812, the CPU 35 copies a value retained in the entry or temporary area 368d of the table 36h stored in the memory 36, as the line traffic volume in the entry 368b of the table 36h, and it clears the temporary value in the entry or temporary area 368d to "0".

At a step S813, the CPU 35 reads out of the entry 368c of the table 36h stored in the memory 36, a value obtained in such a way that the traffic volume of the output line for the RM cell (the line traffic volume) is subtracted from the physical line speed of the pertinent output line, and that the difference of the subtraction is divided by the traffic volume of the pertinent output line (the value having been calculated beforehand and kept held in the entry 368c of the table 36h). Subsequently, the CPU 35 obtains the parameter RIF meeting the above equation (12), in the way that the table 41 shown in FIG. 25 is searched by, for example, the dichotomizing search. Besides, the CPU 35 writes the obtained value of the RIF into the corresponding entry of the table 36h stored in the memory 36, by reference to the identifiers VPI and VCI set in the header of the RM cell, and it outputs the RIF value to the RM cell inserter 33.

At a step S814, the RM cell inserter 33 makes a comparison between the value of the RIF set in the payload of the RM cell as inputted from the RM cell extractor 32 and that of the RIF retained in the corresponding entry of the table 36h of the memory 36 as inputted from the CPU 35.

On condition that, as the result of the comparison at the step S814, the value of the RIF inputted from the CPU 35 is smaller than that of the RIF set in the payload of the RM cell, the operating flow proceeds to a step S815, at which the RM cell inserter 33 writes the value of the RIF inputted from the CPU 35, into the payload of the RM cell. At a step S816, the RM cell inserter 33 sends out the resulting RM cell to the output line.

In contrast, on condition that, as the result of the comparison at the step S814, the value of the RIF inputted from the CPU 35 is larger than or equal to that of the RIF set in the payload of the RM cell, the operating flow proceeds to the step S816, at which the RM cell inserter 33 sends out the RM cell to the output line.

In each of the fifth through eighth aspects of the embodiment, the control parameter RIF is dynamically altered to a value conforming to the situation of use of the network. Therefore, the transmission rate of the cells of the transmission terminal can be controlled so as to reflect the congestion state of the network, while the network resources are being effectively utilized. More specifically, in a case where the transmission terminal has received the backward RM cell of CI=0 and NI=0, it increases the parameter ACR to the amount of, for example, RIF×PCR on the basis of the value of the parameter RIF set in the backward RM cell. Besides, the transmission terminal sets the parameter RIF determined in establishing the ABR connection, in the forward RM cell which is to be thereafter sent out.

Next, the ninth aspect of the embodiment for recalculating the rate decrease factor RDF will be described.

Figure 26:
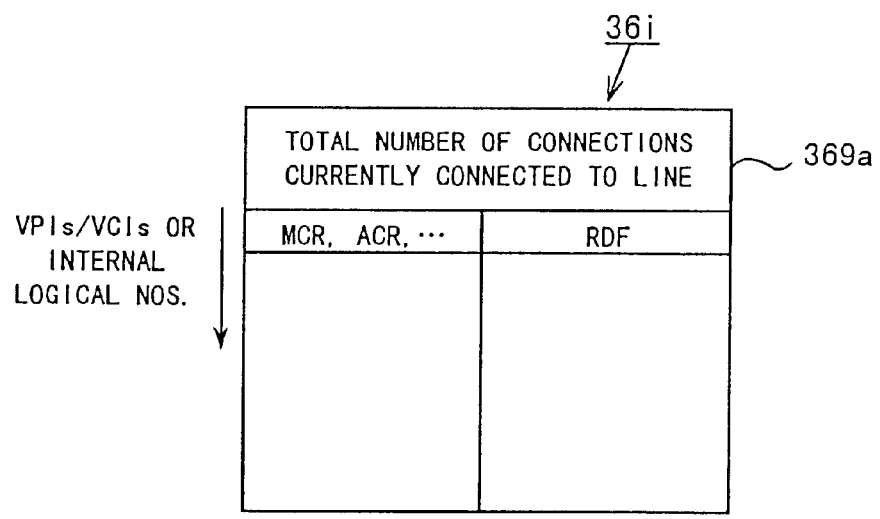
FIG. 26 is a diagram showing the contents of a table in the ninth aspect of the embodiment of the present invention.

The CPU 35 in the ninth aspect of the embodiment finds the parameter RDF satisfying a formula (13) mentioned below, in such a way that the table 41 stored in the memory 36 as shown in FIG. 25 is searched by, for example, the dichotomizing search. Subsequently, the CPU 35 writes the found value of the RDF into the corresponding entry of a table 36i stored in the memory 36 as shown in FIG. 26, by reference to the identifiers VPI and VCI of the RM cell, and it outputs the RDF value to the RM cell inserter 33.

$$N2 \approx 2^{-(15-LogM)} \tag{13}$$

Here, symbol M denotes the total number of connections, and symbol N2 denotes the value of the parameter RDF.

The memory 36 in the ninth aspect of the embodiment stores the table 36i therein. As shown in FIG. 26, the table 36i retains the total number of connections connected to the output line, and such parameters as MCR and ACR, and RDF corresponding to each of the connections. Besides, the "total number of connections" set in the entry 369a of the table 36i is rewritten by the CPU 35 each time a connection is set or released anew.

Figure 27:
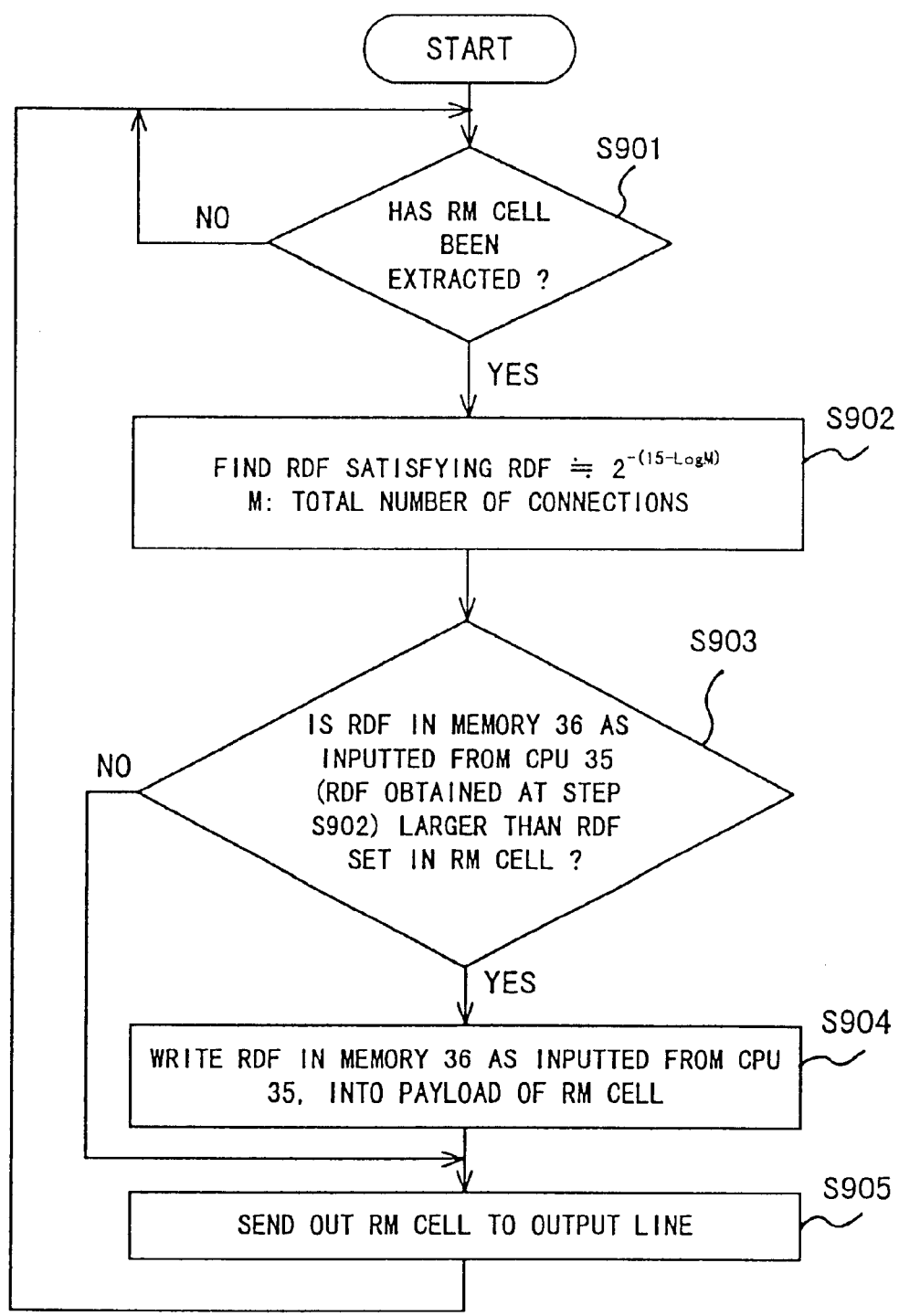
FIG. 27 is a diagram showing the operating flow of a line control apparatus in the ninth aspect of the embodiment of the present invention.

Next, the operating flow of each of the line control apparatuses 11, 13 in the ninth aspect of the embodiment will be described with reference to FIG. 27.

At a step S901, the RM cell extractor 32 extracts an RM cell and outputs the RM cell to the RM cell inserter 33 and the CPU 35. Then, at a step S902, the CPU 35 obtains the parameter RDF meeting the above equation (13), in the way that the table 41 shown in FIG. 25 is searched by, for example, the dichotomizing search. Besides, the CPU 35 writes the obtained value of the RDF into the corresponding entry of the table 36i stored in the memory 36 as shown in FIG. 26, by reference to the identifiers VPI and VCI set in the header of the RM cell, and it outputs the RDF value to the RM cell inserter 33.

At a step S903, the RM cell inserter 33 makes a comparison between the value of the RDF set in the payload of the RM cell as inputted from the RM cell extractor 32 and that of the RDF set in the table 36i of the memory 36 as inputted from the CPU 35.

On condition that, as the result of the comparison at the step S903, the value of the RDF inputted from the CPU 35 is larger than that of the RDF set in the payload of the RM cell, the operating flow proceeds to a step S904, at which the RM cell inserter 33 writes the value of the RDF inputted from the CPU 35, into the payload of the RM cell. At a step S905, the RM cell inserter 33 sends out the resulting RM cell to the output line.

In contrast, on condition that, as the result of the comparison at the step S903, the value of the RDF inputted from the CPU 35 is smaller than or equal to that of the RDF set in the payload of the RM cell, the operating flow proceeds to the step S905, at which the RM cell inserter 33 sends out the RM cell to the output line.

Further, the tenth aspect of the embodiment for recalculating the control parameter RDF will be described.

Figure 28:
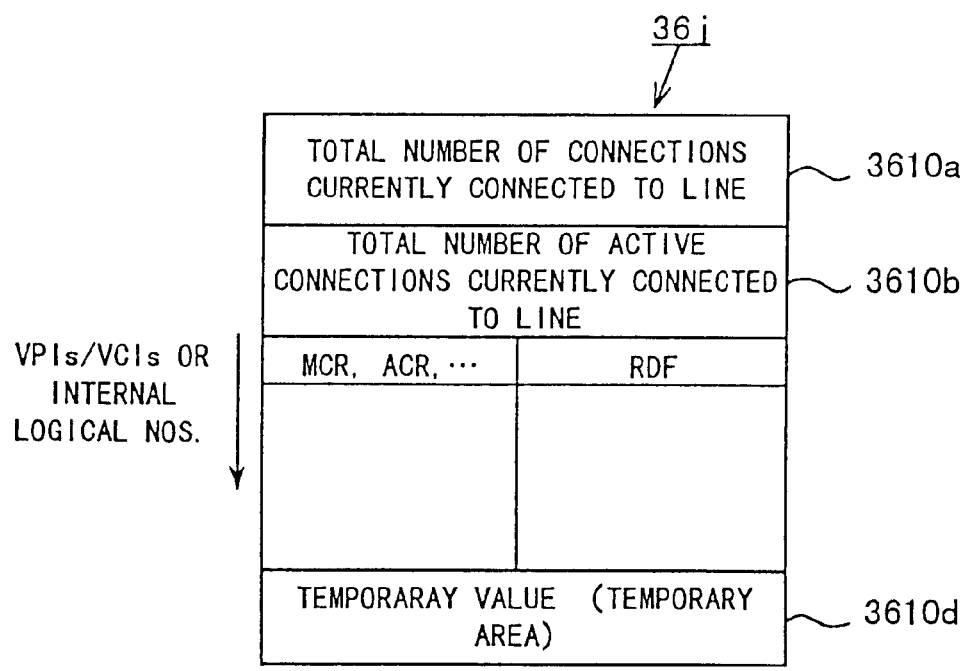
FIG. 28 is a diagram showing the contents of a table in the tenth aspect of the embodiment of the present invention.

The traffic data collector 34 in the tenth aspect of the embodiment finds the total number of connections (active connections) which are sending out cells within a unit time, namely, within one second in this aspect of the embodiment, by reference to the identifiers VCIs and VPIs set in the cells, and it writes the found total number of active connections into the corresponding entry of a table 36*j* stored in the memory 36 and shown in FIG. 28.

The CPU 35 in the tenth aspect of the embodiment finds the parameter RDF satisfying a formula (14) mentioned below, in such a way that the table 41 stored in the memory 36 as shown in FIG. 25 is searched by, for example, the dichotomizing search. Subsequently, the CPU 35 writes the found value of the RDF into the corresponding entry of the table 36*j* stored in the memory 36 as shown in FIG. 28, and it outputs the RDF value to the RM cell inserter 33.

$$N2 \approx 2^{-(15-LogM)} \quad (14)$$

Here, symbol M denotes the total number of active connections, and symbol N2 denotes the value of the parameter RDF.

The memory 36 in the tenth aspect of the embodiment stores the table 36*j* therein. As shown in FIG. 28, the table 36*j* retains the total number of connections connected to the output line, the total number of active connections connected to the output line and being sending out the cells within the unit time, such parameters as MCR and ACR, and RDF corresponding to each of the connections, and a temporary value (the temporary number of active connections). Besides, the "total number of connections" set in the entry 3610*a* of the table 36*j* in FIG. 28 is rewritten by the CPU 35 each time a connection is set or released anew.

Figure 29:
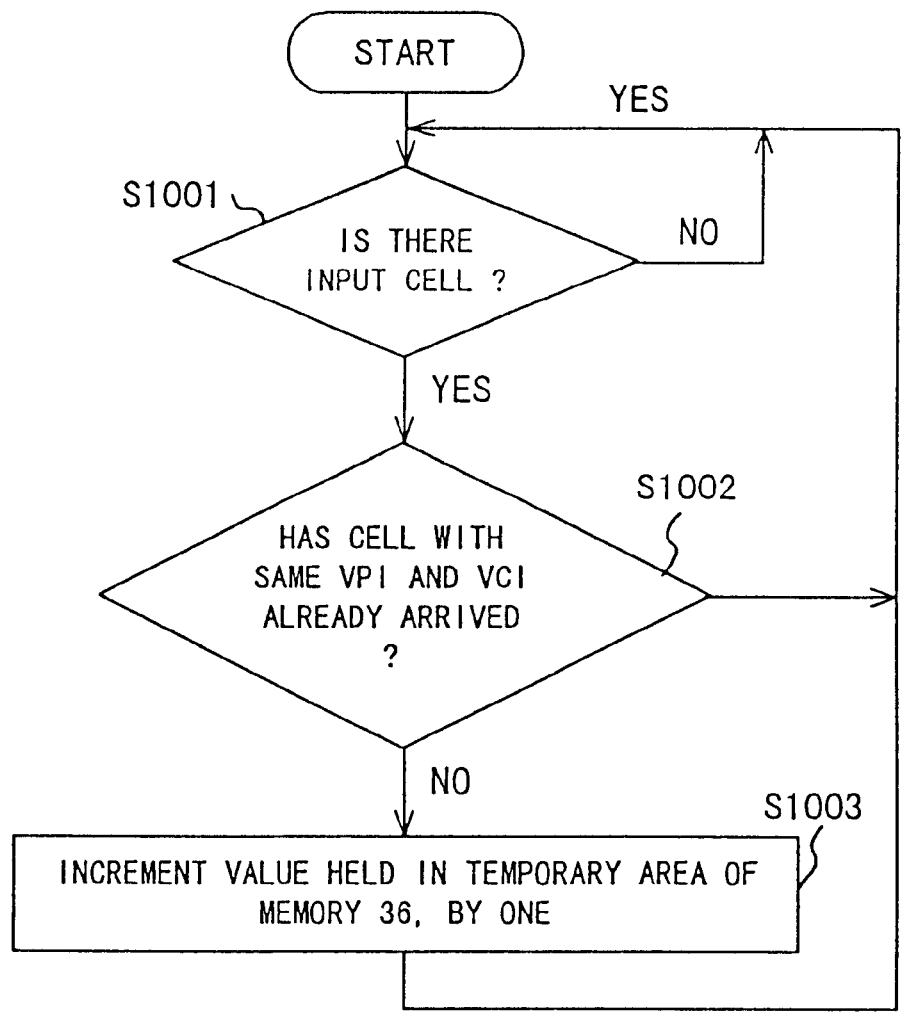
FIG. 29 is a diagram showing the operating flow of a line control apparatus in the tenth aspect of the embodiment of the present invention.

Regarding the tenth aspect of the embodiment, the operation of the traffic data collector 34 for counting the number of active connections, which are sending out cells in the unit time, will be first explained in conjunction with the flowchart of FIG. 29.

The traffic data collector 34 decides whether or not a cell is inputted, at a step S1001. In the presence of the inputted cell, the operating flow proceeds to a step S1002, at which the traffic data collector 34 refers to the identifiers VPI and VCI set in the header of the inputted cell and further decides whether or not a cell bearing the same identifiers VPI and VCI has already arrived. On condition that such a cell has not arrived yet, a value which is held in the temporary area or entry 3610*c* of the table 36*j* stored in the memory 36 is incremented by one at a step S1003. Incidentally, the temporary area 3610*c* is initialized to "0" when it is reserved.

Figure 30:
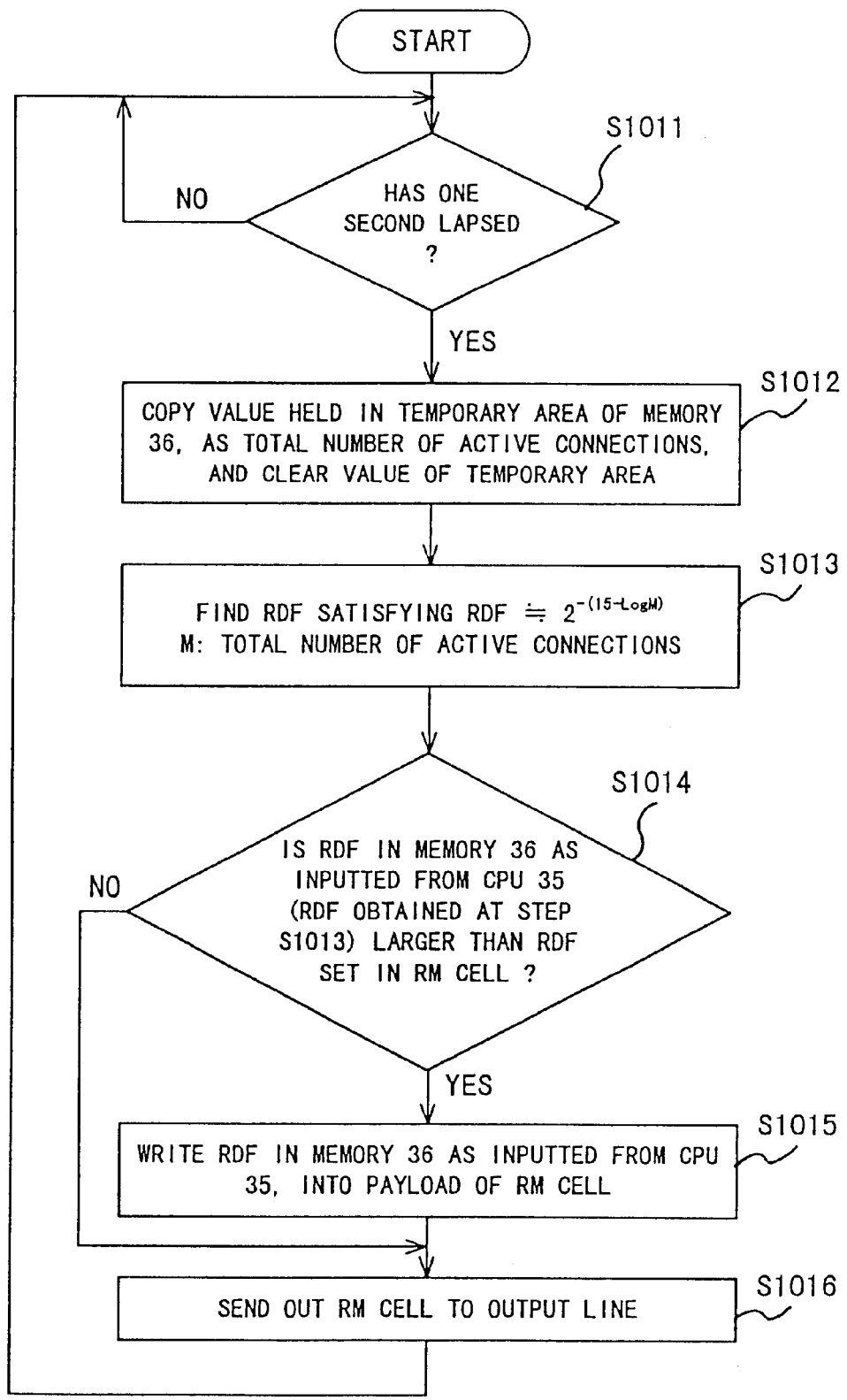
FIG. 30 is also a diagram showing the operating flow of the line control apparatus in the tenth aspect of the embodiment of the present invention.

Secondly, the operation of rewriting the control parameter RDF set in the payload of an RM cell will be explained in conjunction with the flowchart of FIG. 30.

At a step S1011, the CPU 35 decides whether or not one second has lapsed since it read out the total number of active connections from the entry 3610*b* of the table 36*j* stored in the memory 36. On condition that one second has lapsed, the operating flow proceeds to a step S1012. Here at the step S1012, the CPU 35 copies a value retained in the temporary area on entry 3610*c* of the table 36*j* stored in the memory 36, as the total number of active connections in the entry 3610*b* of the table 36*j*, and it clears the above temporary value in the entry 3610*c* of the table 36*j* to "0".

At a step S1013, the CPU 35 obtains the parameter RDF meeting the above equation (14), in the way that the table 41 shown in FIG. 25 is searched by, for example, the dichotomizing search. Besides, the CPU 35 writes the obtained value of the RDF into the corresponding entry of the table 36*j* stored in the memory 36, by reference to the identifiers VPI and VCI set in the header of the RM cell, and it outputs the RDF value to the RM cell inserter 33.

At a step S1014, the RM cell inserter 33 makes a comparison between the value of the RDF set in the payload of the RM cell as inputted from the RM cell extractor 32 and that of the RDF set in the corresponding entry of the table 36*j* of the memory 36 as inputted from the CPU 35.

On condition that, as the result of the comparison at the step S1014, the value of the RDF inputted from the CPU 35 is larger than that of the RDF set in the payload of the RM cell, the operating flow proceeds to a step S1015, at which the RM cell inserter 33 writes the value of the RDF inputted from the CPU 35, into the payload of the RM cell. At a step S1016, the RM cell inserter 33 sends out the resulting RM cell to the output line.

In contrast, on condition that, as the result of the comparison at the step S1014, the value of the RDF inputted from the CPU 35 is smaller than or equal to that of the RDF set in the payload of the RM cell, the operating flow proceeds to the step S1016, at which the RM cell inserter 33 sends out the RM cell to the output line.

Further, the eleventh aspect of the embodiment for recalculating the control parameter RDF will be described.

Figure 31:
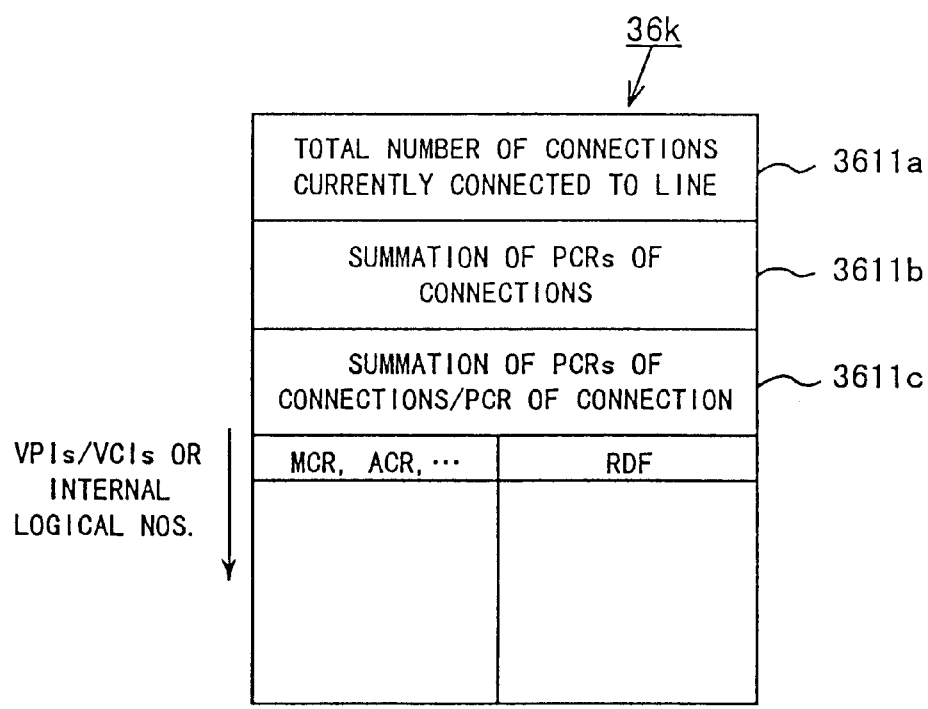
FIG. 31 is a diagram showing the contents of a table in the eleventh aspect of the embodiment of the present invention.

The CPU 35 in the eleventh aspect of the embodiment finds the summation of the control parameters PCRs set in all connections connected to the output line for an RM cell, and it writes the summation into the entry 3611*b* of a table 36*k* stored in the memory 36 and shown in FIG. 31. Further, the CPU 35 divides the found summation by the PCR of the connection to which the RM cell is to be sent out, and it writes the result of the division into the entry 3611*c* of the table 36*k* stored in the memory 36. Still further, the CPU 35 finds the parameter RDF satisfying a formula (15) mentioned below, in such a way that the table 40 shown in FIG. 14 is searched by, for example, the dichotomizing search. Subsequently, the CPU 35 writes the found value of the RDF into the corresponding entry of the table 36*k* stored in the memory 36 as shown in FIG. 20, by reference to the identifiers VPI and VCI of the RM cell, and it outputs the RDF value to the RM cell inserter 33.

$$N1 \approx 2^{-LogM} \quad (15)$$

Here, symbol M denotes the value obtained by dividing the summation of the PCRs of all the connections by the PCR of the pertinent connection, and symbol N1 denotes the value of the parameter RDF.

The memory 36 in the eleventh aspect of the embodiment stores the table 36*k* therein. As shown in FIG. 31, the table 36*k* retains the total number of connections connected to the output line, the summation of the PCRs set in the respective connections, the value obtained by dividing the summation of the PCRs by the PCR set in the pertinent connection to which the RM cell is to be sent out (Summation of PCRs of Connections/PCR of Connection), and such parameters as MCR and ACR, and RDF corresponding to each of the connections. Besides, the "total number of connections" set in the entry 3611*a* of the table 36*k* is rewritten by the CPU 35 each time a connection is set or released anew.

Figure 32:
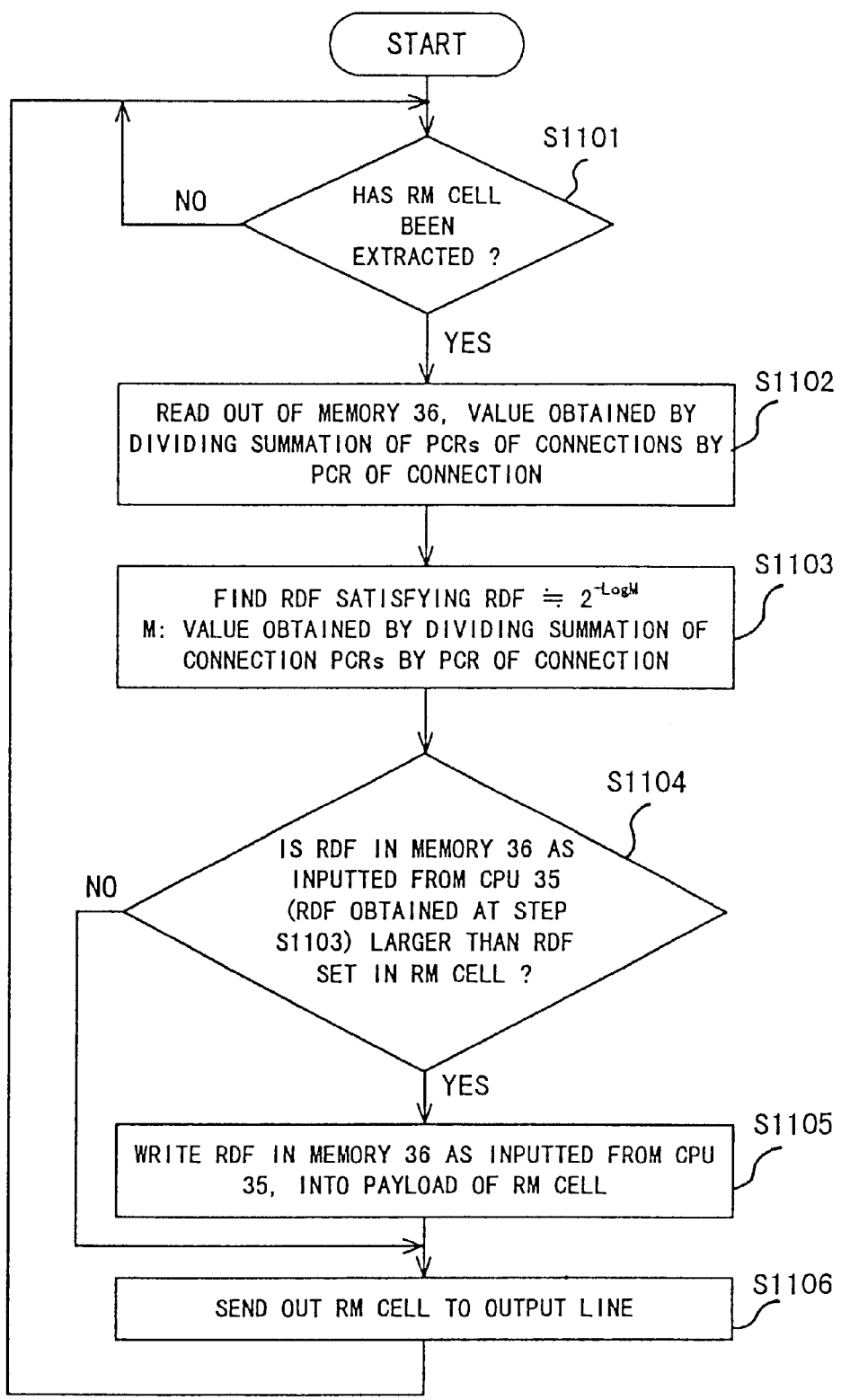
FIG. 32 is a diagram showing the operating flow of a line control apparatus in the eleventh aspect of the embodiment of the present invention.

Next, the operating flow of each of the line control apparatuses 11, 13 in the eleventh aspect of the embodiment will be described with reference to FIG. 32.

At a step S1101, the RM cell extractor 32 extracts an RM cell and outputs the RM cell to the RM cell inserter 33 and the CPU 35. Then, at a step S1102, the CPU 35 reads out of the entry 3611*c* of the table 36*k* stored in the memory 36, the "value obtained by dividing the summation of the PCRs set for all connections connected to the output line for the RM cell (the summation having been calculated beforehand and kept held in the entry 3611b of the table 36k stored in the memory 36), by the PCR set in the pertinent connection to which the RM cell is to be sent out (Summation of PCRs of Connections/PCR of Connection)".

At a step S1103, the CPU 35 obtains the parameter RDF meeting the above equation (15), in the way that the table 40 shown in FIG. 14 is searched by, for example, the dichotomizing search. Besides, the CPU 35 writes the obtained value of the RDF into the corresponding entry of the table 36k stored in the memory 36 as shown in FIG. 31, by reference to the identifiers VPI and VCI set in the header of the RM cell, and it outputs the RDF value to the RM cell inserter 33.

At a step S1104, the RM cell inserter 33 makes a comparison between the value of the RDF set in the payload of the RM cell as inputted from the RM cell extractor 32 and that of the RDF set in the table 36k of the memory 36 as inputted from the CPU 35.

On condition that, as the result of the comparison at the step S1104, the value of the RDF inputted from the CPU 35 is larger than that of the RDF set in the payload of the RM cell, the operating flow proceeds to a step S1105, at which the RM cell inserter 33 writes the value of the RDF inputted from the CPU 35, into the payload of the RM cell. At a step S1106, the RM cell inserter 33 sends out the resulting RM cell to the output line.

In contrast, on condition that, as the result of the comparison at the step S1104, the value of the RDF inputted from the CPU 35 is smaller than or equal to that of the RDF set in the payload of the RM cell, the operating flow proceeds to the step S1106, at which the RM cell inserter 33 sends out the RM cell to the output line.

Further, the twelfth aspect of the embodiment for recalculating the control parameter RDF will be described.

Figure 33:
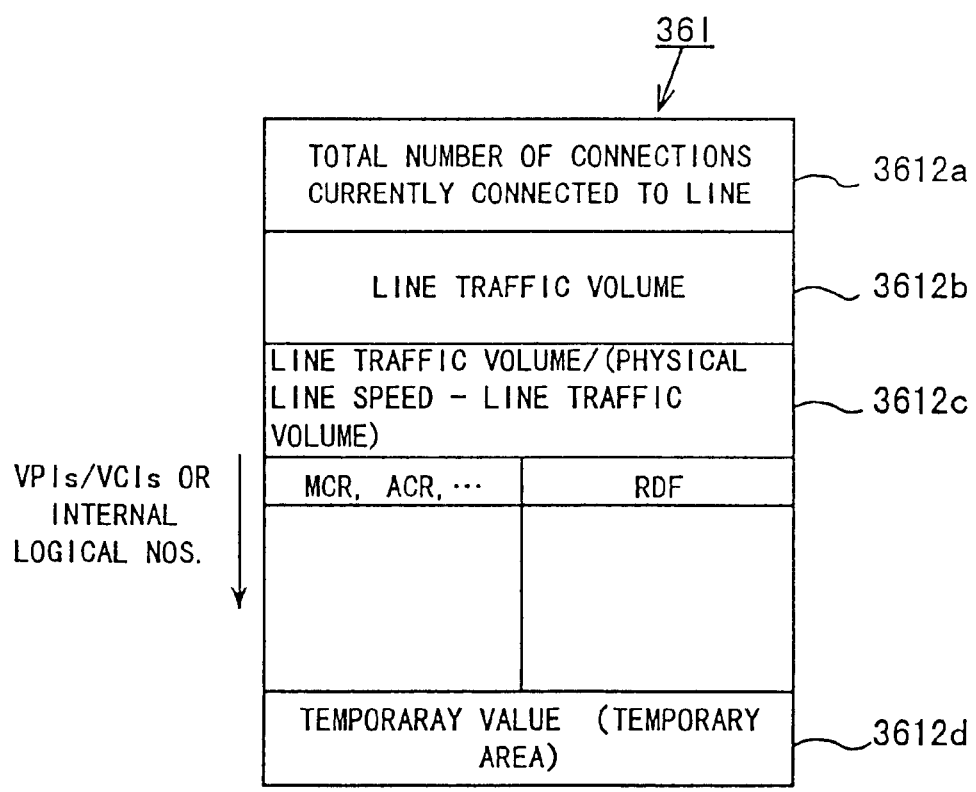
FIG. 33 is a diagram showing the contents of a table in the twelfth aspect of the embodiment of the present invention.

The traffic data collector 34 in the twelfth aspect of the embodiment observes the number of cells arriving per second ("line traffic volume") and writes the line traffic volume into the entry 3612b of a table 361 stored in the memory 36 as shown in FIG. 33. That is, the traffic data collector 34 writes the line traffic volume observed every second, into the entry 3612b of the table 361 stored in the memory 36.

The CPU 35 in the twelfth aspect of the embodiment obtains a value in such a way that the line traffic volume of the output line for an RM cell inputted from the RM cell extractor 32 is subtracted from the physical line speed of the pertinent output line, and that the line traffic volume is divided by the difference of the subtraction. The result of the division is written into the entry 3612c of the table 361 stored in the memory 36. Further, the CPU 35 finds the parameter RDF satisfying a formula (16) mentioned below, in such a way that the table 41 shown in FIG. 25 is searched by, for example, the dichotomizing search. Subsequently, the CPU 35 writes the found value of the RDF into the corresponding entry of the table 361 stored in the memory 36 as shown in FIG. 33, by reference to the identifiers VPI and VCI of the RM cell, and it outputs the RDF value to the RM cell inserter 33.

$$N2 \approx 2^{-(15-\text{Log}M)} \quad (16)$$

Here, symbol M denotes the value obtained in the way that the line traffic volume of the output line is divided by the physical line speed of this output line with the line traffic volume thereof subtracted therefrom, and symbol N2 denotes the value of the parameter RDF.

The memory 36 in the twelfth aspect of the embodiment stores the table 361 therein. As shown in FIG. 33, the table 361 retains the total number of connections connected to the output line, the traffic volume of the output line (the line traffic volume), the value obtained by dividing the traffic volume of the output line by the physical line speed of this output line with the line traffic volume thereof subtracted therefrom [Line traffic volume/(Physical line speed Line traffic volume)], such parameters as MCR and ACR, and RDF corresponding to each of the connections, and a temporary value (a temporary line traffic volume).

Figure 34:
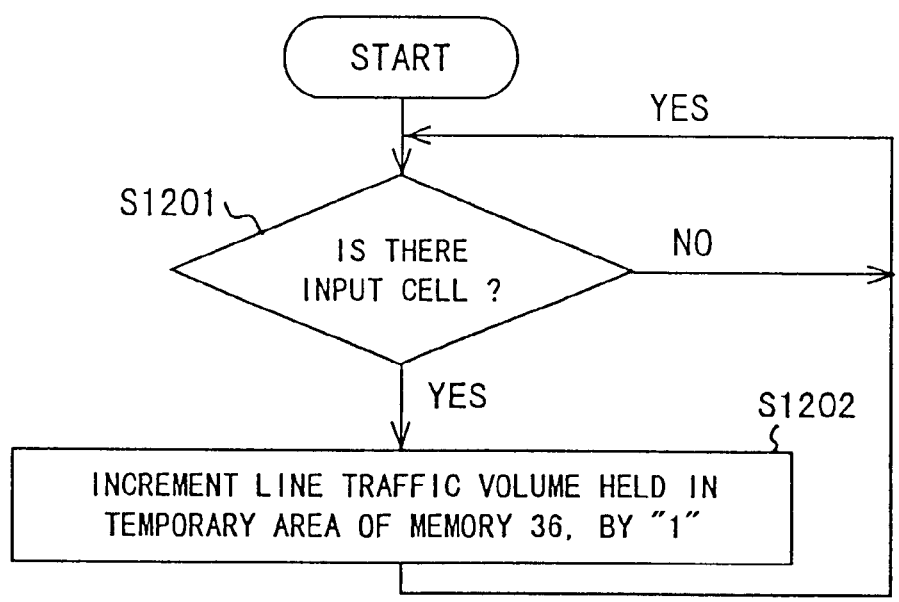
FIG. 34 is a diagram showing the operating flow of a line control apparatus in the twelfth aspect of the embodiment of the present invention.
Figure 35:
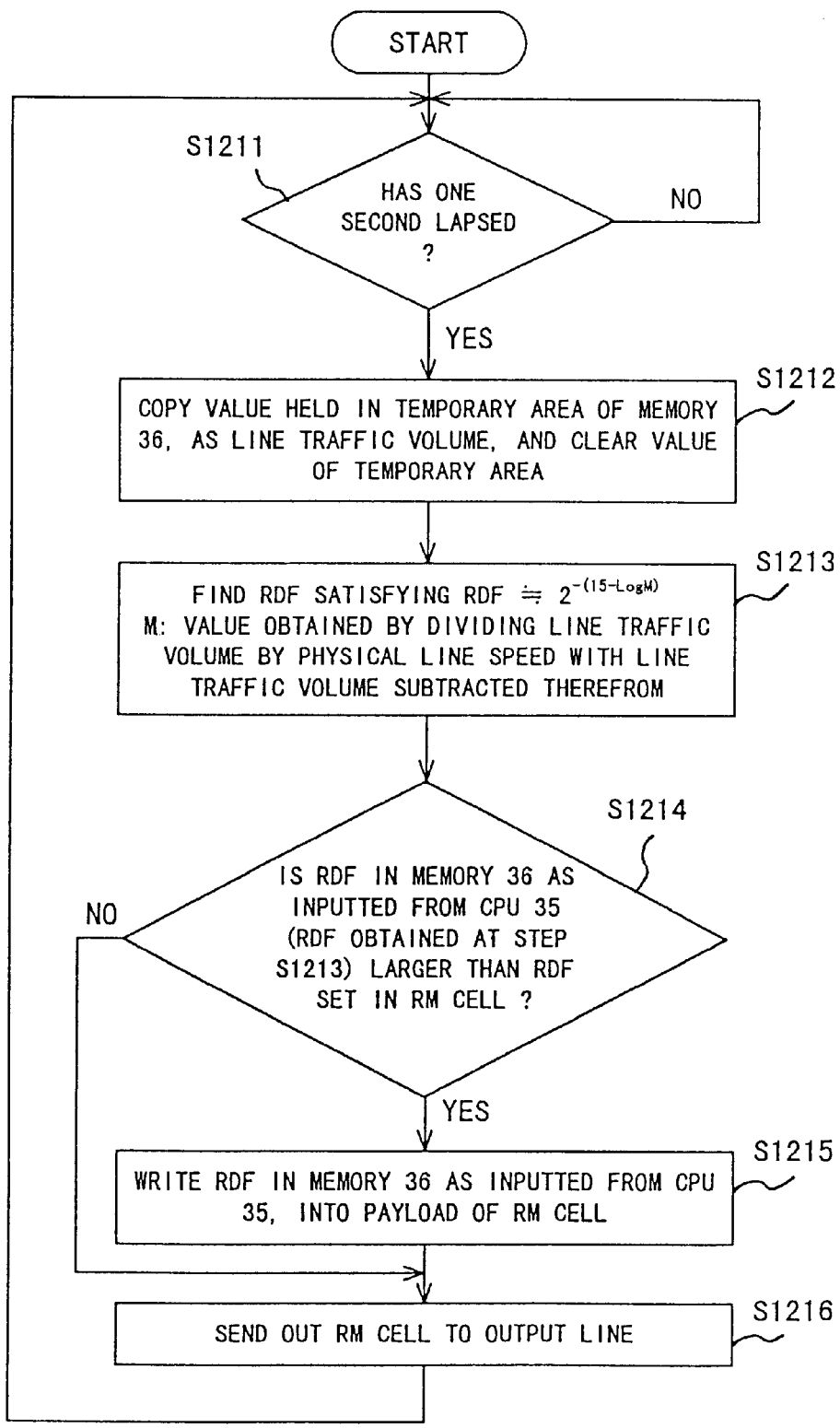
FIG. 35 is also a diagram showing the operating flow of the line control apparatus in the twelfth aspect of the embodiment of the present invention.

Next, the operating flow of each of the line control apparatuses 11, 13 in the twelfth aspect of the embodiment will be described with reference to FIGS. 34 and 35.

In the first place, the operation of the traffic data collector 34 for counting the traffic volume of the output line per unit time will be explained in conjunction with the flowchart of FIG. 34.

The traffic data collector 34 decides whether or not a cell is inputted, at a step S1201. In the presence of the inputted cell, the operating flow proceeds to a step S1202, at which a value held in the temporary area 3612d of the table 361 stored in the memory 36 is incremented by one. Incidentally, the temporary area 3612d is set to "0" when it is reserved.

Secondly, the operation of rewriting the control parameter RDF set in the payload of an RM cell will be explained in conjunction with the flowchart of FIG. 35.

At a step S1211, the CPU 35 decides whether or not one second has lapsed since it read out the line traffic volume from the temporary area 3612d of the table 361 stored in the memory 36. On condition that one second has lapsed, the operating flow proceeds to a step S1212. Here at the step S1212, the CPU 35 copies a temporary value retained in the temporary area 3612d of the table 361, as the line traffic volume in the entry 3612b of the table 361, and it clears the value in the temporary area 3612b to "0".

At a step S1213, the CPU 35 reads out of the entry 3612c of the table 361 stored in the memory 36, a value obtained in the way that the traffic volume of the output line (the line traffic volume) to which the RM cell is to be sent out (the value having been calculated beforehand and kept held in the entry 3612b of the table 361 stored in the memory 36) is divided by the physical line speed of the pertinent output line with the traffic volume of this output line subtracted therefrom. Subsequently, the CPU 35 obtains the parameter RDF meeting the above equation (16), in the way that the table 41 shown in FIG. 25 is searched by, for example, the dichotomizing search. Besides, the CPU 35 writes the obtained value of the RDF into the corresponding entry of the table 361 stored in the memory 36, by reference to the identifiers VPI and VCI set in the header of the RM cell, and it outputs the RDF value to the RM cell inserter 33.

At a step S1214, the RM cell inserter 33 makes a comparison between the value of the RDF set in the payload of the RM cell as inputted from the RM cell extractor 32 and that of the RDF set in the corresponding entry of the table 361 of the memory 36 as inputted from the CPU 35.

On condition that, as the result of the comparison at the step S1214, the value of the RDF inputted from the CPU 35 is larger than that of the RDF set in the payload of the RM cell, the operating flow proceeds to a step S1215, at which the RM cell inserter 33 writes the value of the RDF inputted from the CPU 35, into the payload of the RM cell. At a step S1216, the RM cell inserter 33 sends out the resulting RM cell to the output line.

In contrast, on condition that, as the result of the comparison at the step S1214, the value of the RDF inputted from the CPU 35 is smaller than or equal to that of the RDF set in the payload of the RM cell, the operating flow proceeds to the step S1216, at which the RM cell inserter 33 sends out the RM cell to the output line.

In each of the ninth through twelfth aspects of the embodiment, the control parameter RDF is dynamically altered to a value conforming to the situation of use of the network. Therefore, the transmission rate of the cells of the transmission terminal can be controlled so as to reflect the congestion state of the network, while the network resources are being effectively utilized. More specifically, in a case where the transmission terminal has received the backward RM cell of CI=0 and NI=1, it decreases the parameter ACR to the amount of, for example, at least ACR×RDF on the basis of the value of the parameter RDF set in the backward RM cell. Besides, the transmission terminal sets the parameter RDF determined in establishing the ABR connection, in the forward RM cell which is to be thereafter sent out.

By the way, in each of the seventh through eleventh aspects of the embodiment, the factors RIFs or RDFs may well be altered for only a predetermined number of connections, for example, ten connections whose parameters PCRs are greater, among all the connections.

Figure 36:
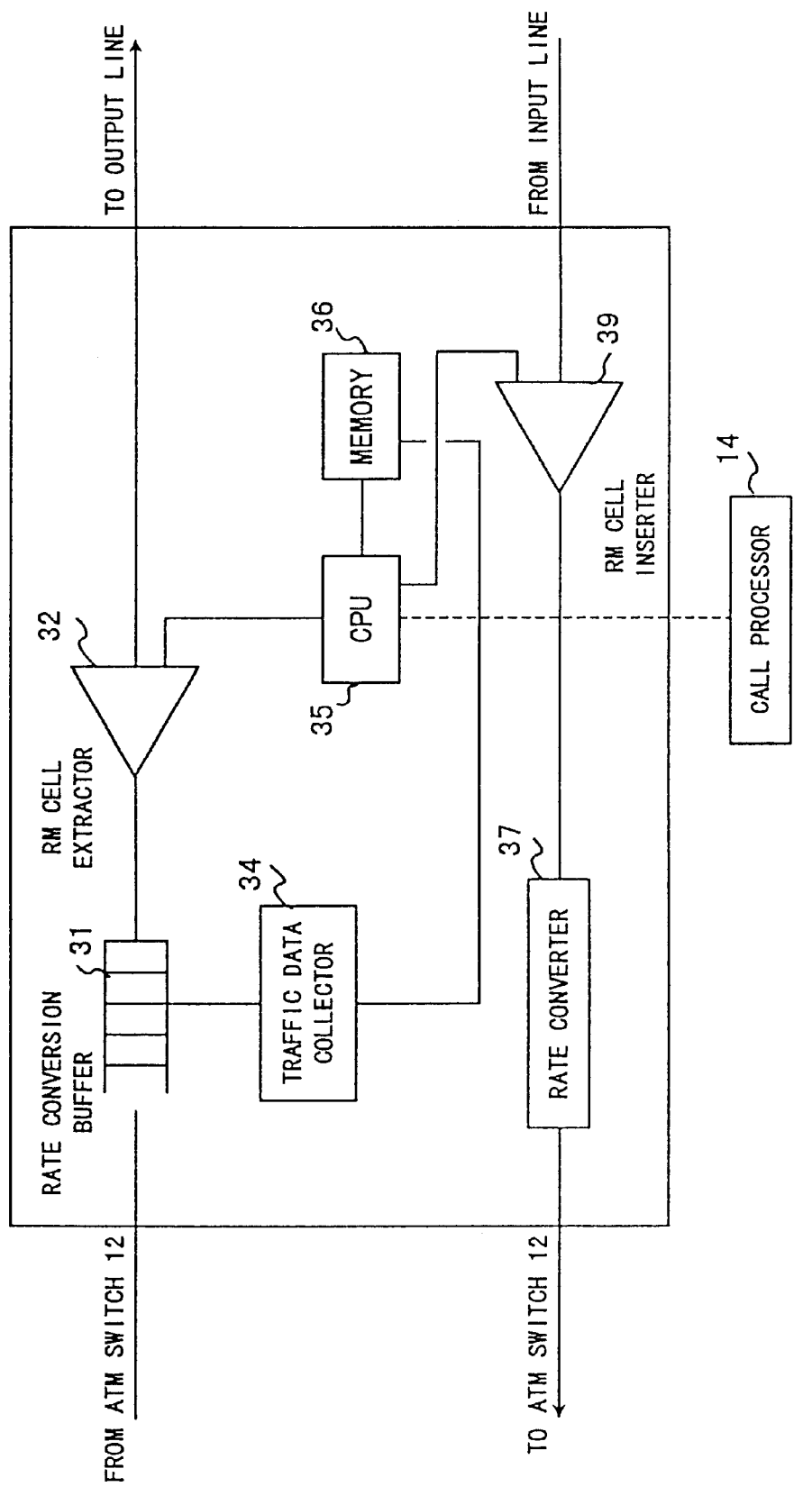
FIG. 36 is a diagram showing another construction of the line control apparatus depicted in FIG. 2.

FIG. 36 is a block diagram showing another example of the internal arrangement of each of the line control apparatuses 11, 13 in FIG. 2.

In FIG. 36, respective components given the same appellations and reference numerals as in FIG. 3 have functions equivalent to the functions in each of the first through twelfth aspects of the embodiment stated above, so that they shall be omitted from detailed description.

An RM cell inserter 39 compares the values of transmission rate control parameters set in the payload of an RM cell as inputted from the CPU 35, with those of the transmission rate control parameters held in the memory 36 as similarly inputted from the CPU 35. Likewise to the RM cell inserter 33 in each of the first through twelfth aspects of the embodiment stated above, the RM cell inserter 39 rewrites the transmission rate control parameters, such as ICR, RIF and RDF, set in the payload of the RM cell, on the basis of the results of the comparisons and as may be needed. Thereafter, the RM cell inserter 39 outputs the resulting RM cell to the rate converter 37.

FIG. 37 is a diagram showing a practicable example of the table 36d in the fourth aspect of the embodiment as depicted in FIG. 11.

In the table 36d shown in FIG. 37, the total number of connections connected to the output line is 1000, the total number of active connections connected to the output line and being sending out cells in the unit time is 100, and the traffic volume of the output line (the line traffic volume) is 100000 cells/sec. A value of 281.34 cells/sec is found as [(Physical line speed−Line traffic volume)/(Total number of Connections−Total number of Active connections)] in the way that a difference obtained by subtracting the traffic volume of the output line from the physical line speed thereof is divided by a difference (the number of non-active connections) obtained by subtracting the total number of active connections from the total number of connections. The parameter MCR set for the connection through which the RM cell to be processed flows is 100 cells/sec, the parameter ACR set therefor is 1000 cells/sec, and the parameter PCR set therefor is 3000 cells/sec. Further, a value of 281 cells/sec is obtained by rounding off the result of the division (281.34 cells/sec) retained in the entry 364d of the table 36d, and it is written as the parameter ICR in the entry 364g of the table 36d. Here in this example, on condition that the value of the parameter ICR set in the payload of the RM cell is larger than "281", the parameter ICR of this RM cell is rewritten into "281". Incidentally, the first temporary value (the temporary line traffic volume) and the second temporary value (the temporary number of active connections) are omitted from the example of FIG. 37.

FIG. 38 is a diagram exemplifying the block arrangement of a computer 80 which incarnates the dynamic alteration system for the transmission rate control parameters in each of the foregoing aspects of the embodiment of the present invention. The computer 80 is constituted by a CPU 81, a memory 82 such as ROM or RAM, an external storage unit 83, a medium drive 84 for a portable recording medium 85, and a network control unit 86 being a network interface connected to a network 88, and these components are interconnected by a bus 87.

Program data 89, the contents of which are the program codes of software for implementing each of the foregoing aspects of the embodiment, are downloaded into the external storage unit 83 through the network 88 as well as the network control unit 86 and are further downloaded into the portable recording medium 85 through the medium drive 84, by way of example.

The CPU 81 runs the program data 89 read out of the external storage unit 83 or out of the portable recording medium 85 through the medium drive 84 and loaded into the memory 82, and it rewrites such transmission rate control parameters as the ICR, RIF and RDF, set in the payload of an inputted RM cell, at need by the various algorithms elucidated in the foregoing aspects of the embodiment.

Alternatively, the program data 89 may be previously stored in the external storage unit 83 or the portable recording medium 85, instead of being downloaded into the component 83 or 85 through the network 88 as stated above.

In the system illustrated in FIG. 38, the program data 89 themselves actualize the novel functions in the aspects of the embodiment of the present invention. Therefore, also the memory 82, external storage unit 83, portable recording medium 85, etc. in which the program data 89 are stored form the aspects of the embodiment of the present invention.

Usable as the portable recording medium 85 is any of, for example, a floppy disk, a hard disk, an optical disk, a magneto-optical disk, a CD-ROM, a CD-R, a CD-RW, a DVD, a magnetic tape, a nonvolatile memory card, and a ROM card.

As described above, according to the present invention, at least one of control parameters for the transmission rates of cells, such as the ICR, RIF and RDF, can be dynamically changed in accordance with the situation of utilization of a network. Therefore, the transmission rate of the cells of a transmission terminal can be controlled so as to reflect the congestion state of the network, while network resources are being effectively utilized.

It will be understood from the foregoing description that various modifications and changes may be made in the preferred embodiments of the present invention without departing from its true spirit. This description is intended for the purpose of illustration only and should not be construed in a limiting sense. The scope of this invention should be limited only by the language of the following claims.

What is claimed is:

1. A transmission rate control apparatus, comprising:
   calculation means for calculating a value of a second transmission-rate control parameter on the basis of resource information of a network in accordance with a first transmission-rate control parameter which is set in an input management packet;

comparison means for comparing the value of the second transmission-rate control parameter obtained by said calculation means, with the value of the first transmission-rate control parameter; and parameter resetting means for rewriting said value of said first transmission-rate control parameter set in the input management packet, into said value of said second transmission-rate control parameter, when said value of said second transmission-rate control parameter has been decided smaller than said value of said first transmission-rate control parameter in said comparison means.

2. A transmission rate control apparatus as defined in claim 1, further comprising:

transmission means for transmitting an output management packet obtained by the processing of said parameter resetting means, in a forward direction.

3. A transmission rate control apparatus as defined in claim 1, further comprising:

transmission means for transmitting an output management packet obtained by the processing of said parameter resetting means, in a backward direction.

4. A transmission rate control apparatus as defined in claim 1, wherein said calculation means includes:

first calculation means for comparing a value of a peak packet rate set for a connection along which said input management packet and an output management packet obtained by the processing of said parameter resetting means are transferred, with a value obtained in such a way that a physical line speed of an output line for the pertinent connection is divided by the total number of connections connected to the output line, and for obtaining a smaller one of the values; and second calculation means for comparing the smaller value obtained by said first calculation means, with said value of said first transmission-rate control parameter, and for setting a larger one of the compared values as said value of said second transmission-rate control parameter.

5. A transmission rate control apparatus as defined in claim 1, wherein said calculation means includes:

observation means for observing the total number of active connections being sending out packets within a unit time, among all connections connected to an output line to which an output management packet obtained by the processing of said parameter resetting means is to be sent out;

first calculation means for comparing a value of a peak packet rate set for that one of the connections along which said input management packet and the output management packet are transferred, with a value obtained in such a way that a physical line speed of the output line is divided by said total number of active connections obtained by said observation means, and for obtaining a smaller one of the values; and second calculation means for comparing the smaller value obtained by said first calculation means, with said value of said first transmission-rate control parameter, and for setting a larger one of the compared values as said value of said second transmission-rate control parameter.

6. A transmission rate control apparatus as defined in claim 1, wherein said calculation means includes:

first calculation means for finding a summation of peak packet rates set for all connections connected to an output line to which an output management packet obtained by the processing of said parameter resetting means is to be sent out, and for dividing the found summation by the total number of the connections connected to the output line;

second calculation means for comparing a value of the peak packet rate set for that one of the connections along which said input management packet and the output management packet are transferred, with a value obtained by the division of said first calculation means, and for obtaining a smaller one of the values; and third calculation means for comparing the smaller value obtained by said second calculation means, with said value of said first transmission-rate control parameter, and for setting a larger one of the compared values as said value of said second transmission-rate control parameter.

7. A transmission rate control apparatus as defined in claim 1, wherein said recalculation means includes:

first calculation means for observing active connections being sending out packets within a unit time, among all connections connected to an output line to which an output management packet obtained by the processing of said parameter resetting means is to be sent out, and for calculating the total number of non-active connections not being sending out packets within the unit time, on the basis of a result of the observation;

second calculation means for observing the number of packets flowing per second through the output line, and for calculating a traffic volume of said output line from said number of the flow rate packets;

third calculation means for dividing a value by said total number of the non-active connections calculated by said first calculation means, the value being obtained in such a way that the traffic volume of said output line calculated by said second calculation means is subtracted from a physical line speed of said output line; and fourth calculation means for comparing a value obtained by the division of said third calculation means, with said value of said first transmission-rate control parameter, and for setting a larger one of the values as said value of said second transmission-rate control parameter.

8. A transmission rate control apparatus as defined in claim 4, wherein the first and second transmission-rate control parameters correspond to an initial packet rate of a transmission terminal.

9. A transmission rate control apparatus as defined in claim 1, wherein said calculation means finds said value (N) of said second transmission-rate control parameter as a value satisfying $N \approx 2^{-LogM}$ (where the base of "LogM" is 2), by using the total number (M) of connections connected to an output line to which an output management packet obtained by the processing of said parameter resetting means is to be sent out.

10. A transmission rate control apparatus as defined in claim 1, wherein said calculation means includes:

observation means for observing the total number of active connections being sending out packets within a unit time, among all connections connected to an output line to which an output management packet obtained by the processing of said parameter resetting means is to be sent out; and calculation means for finding said value (N) of said second transmission-rate control parameter as a value satisfying $N \approx 2^{-LogM}$ (where the base of "LogM" is 2), by using said total number (M) of the active connections obtained by said observation means.

11. A transmission rate control apparatus as defined in claim 1, wherein said calculation means includes:
    first calculation means for calculating a summation of peak packet rates set for all connections connected to an output line to which an output management packet obtained by the processing of said parameter resetting means is to be sent out;
    second calculation means for dividing the value obtained by said first calculation means, by the peak packet rate set for that one of the connections along which said input management packet and the output management packet are transferred; and
    third calculation means for finding said value (N) of said second transmission-rate control parameter as a value satisfying $N \approx 2^{-LogM}$ (where the base of "LogM" is 2), by using the value (M) obtained by said second calculation means.

12. A transmission rate control apparatus as defined in claim 11, wherein a predetermined number of connections the set peak packet rates of which are greater are selected from among all said connections connected to the output line, and the processing of each of said means is executed for only the selected connections.

13. A transmission rate control apparatus as defined in claim 1, wherein said calculation means includes:
    first calculation means for observing the number of packets flowing per second through an output line to which an output management packet obtained by the processing of said parameter resetting means is to be sent out, and for calculating a traffic volume of the output line from said number of the flow rate packets;
    second calculation means for dividing a value by the traffic volume of said output line, the value being obtained in such a way that said traffic volume of said output line obtained by said first calculation means is subtracted from a physical line speed of said output line; and
    third calculation means for finding said value (N) of said second transmission-rate control parameter as a value satisfying $N \approx 2^{-(15-LogM)}$ (where the base of "LogM" is 2), by using the value (M) obtained by said second calculation means.

14. A transmission rate control apparatus as defined in any of claim 9, wherein the transmission rate control parameters correspond to a rate increase factor.

15. A transmission rate control apparatus, comprising:
    calculation means for calculating a value of a second transmission-rate control parameter on the basis of resource information of a network in accordance with a first transmission-rate control parameter which is set in an input management packet;
    comparison means for comparing the value of the second transmission-rate control parameter obtained by said calculation means, with the value of the first transmission-rate control parameter; and
    parameter resetting means for rewriting said value of said first transmission-rate control parameter set in the input management packet, into said value of said second transmission-rate control parameter, only when said value of said second transmission-rate control parameter has been decided larger than said value of said first transmission-rate control parameter in said comparison means.

16. A transmission rate control apparatus as defined in claim 15, further comprising:
    transmission means for transmitting an output management packet obtained by the processing of said parameter resetting means, in a forward direction.

17. A transmission rate control apparatus as defined in claim 15, further comprising:
    transmission means for transmitting an output management packet obtained by the processing of said parameter resetting means, in a backward direction.

18. A transmission rate control apparatus as defined in claim 15, wherein said calculation means finds said value (N) of said second transmission-rate control parameter as a value satisfying $N \approx 2^{-(15-LogM)}$ (where the base of "LogM" is 2), by using the total number (M) of connections connected to an output line to which an output management packet obtained by the processing of said parameter resetting means is to be sent out.

19. A transmission rate control apparatus as defined in claim 15, wherein said calculation means includes:
    observation means for observing the total number of active connections being sending out packets within a unit time, among all connections connected to an output line to which an output management packet obtained by the processing of said parameter resetting means is to be sent out; and
    calculation means for finding said value (N) of said second transmission-rate control parameter as a value satisfying $N \approx 2^{-(15-LogM)}$ (where the base of "LogM" is 2), by using said total number (M) of the active connections obtained by said observation means.

20. A transmission rate control apparatus as defined in claim 15, wherein said calculation means includes:
    first calculation means for calculating a summation of peak packet rates set for all connections connected to an output line to which an output management packet obtained by the processing of said parameter resetting means is to be sent out;
    second calculation means for dividing the value obtained by said first calculation means, by the peak packet rate set for that one of the connections along which said input management packet and the output management packet are transferred; and
    third calculation means for finding said value (N) of said second transmission-rate control parameter as a value satisfying $N \approx 2^{-LogM}$ (where the base of "LogM" is 2), by using the value (M) obtained by said second calculation means.

21. A transmission rate control apparatus as defined in claim 20, wherein a predetermined number of connections the set peak packet rates of which are greater are selected from among all said connections connected to the output line, and the processing of each of said means is executed for only the selected connections.

22. A transmission rate control apparatus as defined in claim 15, wherein said calculation means includes:
    first calculation means for observing the number of packets flowing per second through an output line to which an output management packet obtained by the processing of said parameter resetting means is to be sent out, and for calculating a traffic volume of the output line from said number of the flow rate packets;
    second calculation means for dividing a value by the traffic volume of said output line, the value being obtained in such a way that said traffic volume of said output line obtained by said first calculation means is subtracted from a physical line speed of said output line; and third calculation means for finding said value (N) of said second transmission-rate control parameter as a value satisfying $N \approx 2^{-(15-LogM)}$ (where the base of "LogM" is 2), by using the value (M) obtained by said second calculation means.

23. A transmission rate control apparatus as defined in any of claim 18, wherein the transmission rate control parameters correspond to a rate decrease factor.

24. A transmission rate control method, comprising the steps of:
(a) calculating a value of a second transmission-rate control parameter on the basis of resource information of a network in accordance with a first transmission-rate control parameter which is set in an input management packet;
(b) comparing the value of the second transmission-rate control parameter obtained by the calculating step (a), with the value of the first transmission-rate control parameter; and
(c) rewriting said value of said first transmission-rate control parameter set in the input management packet, into said value of said second transmission-rate control parameter, when said value of said second transmission-rate control parameter has been decided to be smaller than said value of said first transmission-rate control parameter at the comparing step (b).

25. A transmission rate control method as defined in claim 24, further comprising the step of:
(d) transmitting an output management packet obtained by the processing of the parameter rewriting step (c), in a forward direction.

26. A transmission rate control method as defined in claim 24, further comprising the step of:
(e) transmitting an output management packet obtained by the processing of the parameter rewriting step (c), in a backward direction.

27. A transmission rate control method as defined in claim 24, wherein said calculating step (a) includes the steps of:
(a11) comparing a value of a peak packet rate set for a connection along which said input management packet and an output management packet obtained by the processing of the parameter rewriting step (c) are transferred, with a value obtained in such a way that a physical line speed of an output line for the pertinent connection is divided by the total number of connections connected to the output line, and then obtaining a smaller one of the values; and
(a12) comparing the smaller value obtained by the first calculating step (a11), with said value of said first transmission-rate control parameter, and then setting a larger one of the compared values as said value of said second transmission-rate control parameter.

28. A transmission rate control method as defined in claim 24, wherein said calculating step (a) includes:
(a21) observing the total number of active connections being sending out packets within a unit time, among all connections connected to an output line to which an output management packet obtained by the processing of the parameter rewriting step (c) is to be sent out;
(a22) comparing a value of a peak packet rate set for that one of the connections along which said input management packet and the output management packet are transferred, with a value obtained in such a way that a physical line speed of the output line is divided by said total number of active connections obtained by the observing step (a21), and then obtaining a smaller one of the values; and (a23) comparing the smaller value obtained by the first calculating step (a22), with said value of said first transmission-rate control parameter, and then setting a larger one of the compared values as said value of said second transmission-rate control parameter.

29. A transmission rate control method as defined in claim 24, wherein said calculating step (a) includes the steps of:
(a31) finding a summation of peak packet rates set for all connections connected to an output line to which an output management packet obtained by the processing of the parameter rewriting step (c) is to be sent out, and then dividing the found summation by the total number of the connections connected to the output line;
(a32) comparing a value of the peak packet rate set for that one of the connections along which said input management packet and the output management packet are transferred, with a value obtained by the division of said step (a31), and then obtaining a smaller one of the values; and
(a33) comparing the smaller value obtained by said step (a32), with said value of said first transmission-rate control parameter, and then setting a larger one of the compared values as said value of said second transmission-rate control parameter.

30. A transmission rate control method as defined in claim 24, wherein said calculating step (a) includes the steps of:
(a41) observing active connections being sending out packets within a unit time, among all connections connected to an output line to which an output management packet obtained by the processing of the parameter rewriting step (c) is to be sent out, and then calculating the total number of non-active connections not being sending out packets within the unit time, on the basis of a result of the observation;
(a42) observing the number of packets flowing per second through the output line, and then calculating a traffic volume of said output line from said number of the flow rate packets;
(a43) dividing a value by said total number of the non-active connections calculated by said step (a41), the value being obtained in such a way that the traffic volume of said output line calculated by said step (a42) is subtracted from a physical line speed of said output line; and
(a44) comparing a value obtained by the division of said step (a43), with said value of said first transmission-rate control parameter, and then setting a larger one of the values as said value of said second transmission-rate control parameter.

31. A transmission rate control method as defined in claim 27, wherein the first and second transmission-rate control parameters correspond to an initial packet rate of a transmission terminal.

32. A transmission rate control method as defined in claim 24, wherein said calculating step (a) finds said value (N) of said second transmission-rate control parameter as a value satisfying $N \approx 2^{-LogM}$ (where the base of "LogM" is 2), by using the total number (M) of connections connected to an output line to which an output management packet obtained by the processing of the parameter rewriting step (c) is to be sent out.

33. A transmission rate control method as defined in claim 24, wherein said calculating step (a) includes the steps of:
(a51) observing the total number of active connections being sending out packets within a unit time, among all connections connected to an output line to which an output management packet obtained by the processing of the parameter rewriting step (c) is to be sent out; and (a52) finding said value (N) of said second transmission-rate control parameter as a value satisfying $N \approx 2^{-LogM}$ (where the base of "LogM" is 2), by using said total number (M) of the active connections obtained by the observing step (a51).

34. A transmission rate control method as defined in claim 24, wherein said calculating step (a) includes the steps of:

(a61) calculating a summation of peak packet rates set for all connections connected to an output line to which an output management packet obtained by the processing of the parameter rewriting step (c) is to be sent out;

(a62) dividing the value obtained by the first calculating step (a61), by the peak packet rate set for that one of the connections along which said input management packet and the output management packet are transferred; and (a63) finding said value (N) of said second transmission-rate control parameter as a value satisfying $N \approx 2^{-LogM}$ (where the base of "LogM" is 2), by using the value (M) obtained by the second calculating step (a62).

35. A transmission rate control method as defined in claim 34, wherein a predetermined number of connections the set peak packet rates of which are greater are selected from among all said connections connected to the output line, and the processing of each of said steps is executed for only the selected connections.

36. A transmission rate control method as defined in claim 24, wherein said calculating step (a) includes the steps of:

(a71) observing the number of packets flowing per second through an output line to which an output management packet obtained by the processing of the parameter rewriting step (c) is to be sent out, and then calculating a traffic volume of the output line from said number of the flow rate packets;

(a72) dividing a value by the traffic volume of said output line, the value being obtained in such a way that said traffic volume of said output line obtained by the first calculating step (a71) is subtracted from a physical line speed of said output line; and (a73) finding said value (N) of said second transmission-rate control parameter as a value satisfying $N \approx 2^{-(15-LogM)}$ (where the base of "LogM" is 2), by using the value (M) obtained by the second calculation step (a72).

37. A transmission rate control method as defined in any of claim 33, wherein the transmission rate control parameters correspond to a rate increase factor.

38. A transmission rate control method, comprising the steps of:

(a) calculating a value of a second transmission-rate control parameter on the basis of resource information of a network in accordance with a first transmission-rate control parameter which is set in an input management packet;

(b) comparing the value of the second transmission-rate control parameter obtained by the calculation step (a), with the value of the first transmission-rate control parameter; and (c) rewriting said value of said first transmission-rate control parameter set in the input management packet, into said value of said second transmission-rate control parameter, only when said value of said second transmission-rate control parameter has been decided larger than said value of said first transmission-rate control parameter at the comparing step (b).

39. A transmission rate control method as defined in claim 38, further comprising the step of:

(d) transmitting an output management packet obtained by the processing of the parameter rewriting step (c), in a forward direction.

40. A transmission rate control method as defined in claim 38, further comprising the step of:

(e) transmitting an output management packet obtained by the processing of the parameter rewriting step (c), in a backward direction.

41. A transmission rate control method as defined in claim 38, wherein said calculating step (a) finds said value (N) of said second transmission-rate control parameter as a value satisfying $N \approx 2^{-(15-LogM)}$ (where the base of "LogM" is 2), by using the total number (M) of connections connected to an output line to which an output management packet obtained by the processing of the parameter rewriting step (c) is to be sent out.

42. A transmission rate control method as defined in claim 38, wherein said calculating step (a) includes:

(a11) observing the total number of active connections being sending out packets within a unit time, among all connections connected to an output line to which an output management packet obtained by the processing of the parameter rewriting step (c) is to be sent out; and (a12) finding said value (N) of said second transmission-rate control parameter as a value satisfying $N \approx 2^{-(15-LogM)}$ (where the base of "LogM" is 2), by using said total number (M) of the active connections obtained by the observing step (a11).

43. A transmission rate control method as defined in claim 38, wherein said calculating step (a) includes:

(a21) calculating a summation of peak packet rates set for all connections connected to an output line to which an output management packet obtained by the processing of the parameter rewriting step (c) is to be sent out;

(a22) dividing the value obtained by the first calculating step (a21), by the peak packet rate set for that one of the connections along which said input management packet and the output management packet are transferred; and (a23) finding said value (N) of said second transmission-rate control parameter as a value satisfying $N \approx 2^{-LogM}$ (where the base of "LogM" is 2), by using the value (M) obtained by the second calculating step (a22).

44. A transmission rate control method as defined in claim 43, wherein a predetermined number of connections the set peak packet rates of which are greater are selected from among all said connections connected to the output line, and the processing of each of said steps is executed for only the selected connections.

45. A transmission rate control method as defined in claim 38, wherein said calculating step (a) includes the steps of:

(a31) observing the number of packets flowing per second through an output line to which an output management packet obtained by the processing of the parameter rewriting step (c) is to be sent out, and then calculating a traffic volume of the output line from said number of the flow rate packets;

(a32) dividing the traffic volume of said output line obtained by the first calculating step (a31), by a value obtained in such a way that said traffic volume of said output line is subtracted from a physical line speed of said output line; and (a33) finding said value (N) of said second transmission-rate control parameter as a value satisfying $N \approx 2^{-(15-LogM)}$ (where the base of "LogM" is 2), by using the value (M) obtained by the second calculating step (a32).

46. A transmission rate control method as defined in any of claim 41, wherein the transmission rate control parameters correspond to a rate decrease factor.

47. A computer-readable recording medium which stores therein a program for causing a computer to execute the steps of:
  (a) calculating a value of a second transmission-rate control parameter on the basis of resource information of a network in accordance with a first transmission-rate control parameter which is set in an input management packet;
  (b) comparing the value of the second transmission-rate control parameter obtained by the calculating step (a), with the value of the first transmission-rate control parameter; and
  (c) rewriting said value of said first transmission-rate control parameter set in the input management packet, into said value of said second transmission-rate control parameter, when said value of said second transmission-rate control parameter has been decided smaller than said value of said first transmission-rate control parameter at the comparing step (b).

48. A computer-readable recording medium as defined in claim 47, wherein the stored program causes the computer to further execute the step of:
  (d) transmitting an output management packet obtained by the processing of the parameter rewriting step (c), in a forward direction.

49. A computer-readable recording medium as defined in claim 47, wherein the stored program causes the computer to further execute the step of:
  (e) transmitting an output management packet obtained by the processing of the parameter rewriting step (c), in a backward direction.

50. A computer-readable recording medium as defined in claim 47, wherein said calculating step (a) includes the steps of:
  (a11) comparing a value of a peak packet rate set for a connection along which said input management packet and an output management packet obtained by the processing of the parameter rewriting step (c) are transferred, with a value obtained in such a way that a physical line speed of an output line for the pertinent connection is divided by the total number of connections connected to the output line, and then obtaining a smaller one of the values; and
  (a12) comparing the smaller value obtained by the first calculating step (a11), with said value of said first transmission-rate control parameter, and then setting a larger one of the compared values as said value of said second transmission-rate control parameter.

51. A computer-readable recording medium as defined in claim 47, wherein said calculating step (a) includes the steps of:
  (a21) observing the total number of active connections being sending out packets within a unit time, among all connections connected to an output line to which an output management packet obtained by the processing of the parameter rewriting step (c) is to be sent out;
  (a22) comparing a value of a peak packet rate set for that one of the connections along which said input management packet and the output management packet are transferred, with a value obtained in such a way that a physical line speed of the output line is divided by said total number of active connections obtained by the observing step (a21), and then obtaining a smaller one of the values; and
  (a23) comparing the smaller value obtained by the first calculating step (a22), with said value of said first transmission-rate control parameter, and then setting a larger one of the compared values as said value of said second transmission-rate control parameter.

52. A computer-readable recording medium as defined in claim 47, wherein said calculating step (a) includes the steps of:
  (a31) finding a summation of peak packet rates set for all connections connected to an output line to which an output management packet obtained by the processing of the parameter rewriting step (c) is to be sent out, and then dividing the found summation by the total number of the connections connected to the output line;
  (a32) comparing a value of the peak packet rate set for that one of the connections along which said input management packet and the output management packet are transferred, with a value obtained by the division of the first calculating step (a31), and then obtaining a smaller one of the values; and
  (a33) comparing the smaller value obtained by the second calculating step (a32), with said value of said first transmission-rate control parameter, and then setting a larger one of the compared values as said value of said second transmission-rate control parameter.

53. A computer-readable recording medium as defined in claim 47, wherein said calculating step (a) includes the steps of:
  (a41) observing active connections being sending out packets within a unit time, among all connections connected to an output line to which an output management packet obtained by the processing of the parameter rewriting step (c) is to be sent out, and then calculating the total number of non-active connections not being sending out packets within the unit time, on the basis of a result of the observation;
  (a42) observing the number of packets flowing per second through the output line, and then calculating a traffic volume of said output line from said number of the flow rate packets;
  (a43) dividing a value by said total number of the non-active connections calculated by said step (a41), the value being obtained in such a way that the traffic volume of said output line calculated by said step (a42) is subtracted from a physical line speed of said output line; and
  (a44) comparing a value obtained by the division of said step (a43), with said value of said first transmission-rate control parameter, and then setting a larger one of the values as said value of said second transmission-rate control parameter.

54. A computer-readable recording medium as defined in claim 50, wherein the first and second transmission-rate control parameters correspond to an initial packet rate of a transmission terminal.

55. A computer-readable recording medium as defined in claim 47, wherein the recalculating step (a) finds said value (N) of said second transmission-rate control parameter as a value satisfying $N \approx 2^{-LogM}$ (where the base of "LogM" is 2), by using the total number (M) of connections connected to an output line to which an output management packet obtained by the processing of the parameter rewriting step (c) is to be sent out.

56. A computer-readable recording medium as defined in claim 47, wherein said calculating step (a) includes the steps of:
   (a51) observing the total number of active connections being sending out packets within a unit time, among all connections connected to an output line to which an output management packet obtained by the processing of the parameter rewriting step (c) is to be sent out; and
   (a52) finding said value (N) of said second transmission-rate control parameter as a value satisfying $N \approx 2^{-LogM}$ (where the base of "LogM" is 2), by using said total number (M) of the active connections obtained by the observing step (a51).

57. A computer-readable recording medium as defined in claim 47, wherein said calculating step (a) includes the steps of:
   (a61) calculating a summation of peak packet rates set for all connections connected to an output line to which an output management packet obtained by the processing of the parameter rewriting step (c) is to be sent out;
   (a62) dividing the value obtained by the first calculating step (a61), by the peak packet rate set for that one of the connections along which said input management packet and the output management packet are transferred; and
   (a63) finding said value (N) of said second transmission-rate control parameter as a value satisfying $N \approx 2^{-LogM}$ (where the base of "LogM" is 2), by using the value (M) obtained by the second calculating step (a62).

58. A computer-readable recording medium as defined in claim 57, wherein a predetermined number of connections the set peak packet rates of which are greater are selected from among all said connections connected to the output line, and the processing of each of said steps is executed for only the selected connections.

59. A computer-readable recording medium as defined in claim 47, wherein said calculating step (a) includes the steps of:
   (a71) observing the number of packets flowing per second through an output line to which an output management packet obtained by the processing of the parameter rewriting step (c) is to be sent out, and then calculating a traffic volume of the output line from said number of the flow rate packets;
   (a72) dividing the traffic volume of said output line obtained by the first calculating step (a71), by a value obtained in such a way that said traffic volume of said output line is subtracted from a physical line speed of said output line; and
   (a73) finding said value (N) of said second transmission-rate control parameter as a value satisfying $N \approx 2^{-(15-LogM)}$ (where the base of "LogM" is 2), by using the value (M) obtained by the second calculating step (a72).

60. A computer-readable recording medium as defined in any of claim 56, wherein the transmission rate control parameters correspond to a rate increase factor.

61. A computer-readable recording medium which stores therein a program for causing a computer to execute the steps of:
   (a) calculating a value of a second transmission-rate control parameter on the basis of resource information of a network in accordance with a first transmission-rate control parameter which is set in an input management packet;
   (b) comparing the value of the second transmission-rate control parameter obtained by the calculating step (a), with the value of the first transmission-rate control parameter; and
   (c) rewriting said value of said first transmission-rate control parameter set in the input management packet, into said value of said second transmission-rate control parameter, only when said value of said second transmission-rate control parameter has been decided larger than said value of said first transmission-rate control parameter at the comparing step (b).

62. A computer-readable recording medium as defined in claim 61, wherein the stored program causes the computer to further execute the step of.
   (d) transmitting an output management packet obtained by the processing of the parameter rewriting step (c), in a forward direction.

63. A computer-readable recording medium as defined in claim 61, wherein the stored program causes the computer to further execute the step of:
   (e) transmitting an output management packet obtained by the processing of the parameter rewriting step (c), in a backward direction.

64. A computer-readable recording medium as defined in claim 61, wherein said calculating step (a) finds said value (N) of said second transmission-rate control parameter as a value satisfying $N \approx 2^{-(15-LogM)}$ (where the base of "LogM" is 2), by using the total number (M) of connections connected to an output line to which an output management packet obtained by the processing of the parameter rewriting step (c) is to be sent out.

65. A computer-readable recording medium as defined in claim 61, wherein said calculating step (a) includes the steps of:
   (a11) observing the total number of active connections being sending out packets within a unit time, among all connections connected to an output line to which an output management packet obtained by the processing of the parameter rewriting step (c) is to be sent out; and
   (a12) finding said value (N) of said second transmission-rate control parameter as a value satisfying $N \approx 2^{-(15-LogM)}$ (where the base of "LogM" is 2), by using said total number (M) of the active connections obtained by the observing step (a11).

66. A computer-readable recording medium as defined in claim 61, wherein said calculating step (a) includes the steps of:
   (a11) calculating a summation of peak packet rates set for all connections connected to an output line to which an output management packet obtained by the processing of the parameter rewriting step (c) is to be sent out;
   (a12) dividing the value obtained by the first calculating step (a11), by the peak packet rate set for that one of the connections along which said input management packet and the output management packet are transferred; and
   (a13) finding said value (N) of said second transmission-rate control parameter as a value satisfying $N \approx 2^{-LogM}$ (where the base of "LogM" is 2), by using the value (M) obtained by the second calculating step (a12).

67. A computer-readable recording medium as defined in claim 66, wherein a predetermined number of connections the set peak packet rates of which are greater are selected from among all said connections connected to the output line, and the processing of each of said steps is executed for only the selected connections.

68. A computer-readable recording medium as defined in claim 61, wherein said calculating step (a) includes the steps of:
- (a21) observing the number of packets flowing per second through an output line to which an output management packet obtained by the processing of the parameter rewriting step (c) is to be sent out, and then calculating a traffic volume of the output line from said number of the flow rate packets;
- (a22) dividing the traffic volume of said output line obtained by the first calculating step (a21), by a value obtained in such a way that said traffic volume of said output line is subtracted from a physical line speed of said output line; and
- (a23) finding said value (N) of said second transmission-rate control parameter as a value satisfying $N \approx 2^{-(15-LogM)}$ (where the base of "LogM" is 2), by using the value (M) obtained by the second calculating step (a22).

69. A computer-readable recording medium as defined in any of claim 64, wherein the transmission rate control parameters correspond to a rate decrease factor.

* * * * *